US012769167B2

(12) United States Patent
Koito et al.

(10) Patent No.: US 12,769,167 B2
(45) Date of Patent: Oct. 20, 2026

(54) LIQUID CRYSTAL OPTICAL ELEMENT AND LIGHTING DEVICE

(71) Applicant: Japan Display Inc., Tokyo (JP)

(72) Inventors: Takeo Koito, Tokyo (JP); Kojiro Ikeda, Tokyo (JP)

(73) Assignee: Japan Display Inc., Tokyo (JP)

(*) Notice: Subject to any disclaimer, the term of this patent is extended or adjusted under 35 U.S.C. 154(b) by 432 days.

(21) Appl. No.: 18/506,842

(22) Filed: Nov. 10, 2023

(65) Prior Publication Data

US 2024/0077769 A1 Mar. 7, 2024

Related U.S. Application Data

(63) Continuation of application No. PCT/JP2022/019864, filed on May 10, 2022.

(30) Foreign Application Priority Data

Jun. 1, 2021 (JP) ................................. 2021-092627

(51) Int. Cl.
*G02F 1/1343* (2006.01)
*F21V 5/02* (2006.01)
(Continued)

(52) U.S. Cl.
CPC ............ *G02F 1/13439* (2013.01); *F21V 5/02* (2013.01); *F21V 5/045* (2013.01); *G02F 1/1336* (2013.01); *G02F 1/1347* (2013.01)

(58) Field of Classification Search
CPC .. G02F 1/13439; G02F 1/1336; G02F 1/1347; G02F 1/133526; G02F 1/133723; G02F 1/13378; G02F 2201/124; G02F 2201/58; G02F 2203/18; F21V 5/02; F21V 5/045
See application file for complete search history.

(56) References Cited

U.S. PATENT DOCUMENTS

2005/0243237 A1 11/2005 Sasuga
2007/0146910 A1* 6/2007 Duston .................. F24S 23/10 359/834
2010/0149444 A1* 6/2010 Hikmet ............. G02F 1/134363 349/122

FOREIGN PATENT DOCUMENTS

JP 2005317879 A 11/2005
JP 2008089782 A 4/2008
(Continued)

*Primary Examiner* — Michael H Caley
(74) *Attorney, Agent, or Firm* — K&L Gates LLP

(57) ABSTRACT

A liquid crystal optical element includes a first liquid crystal cell, a second liquid crystal cell and an optical element refracting light. Each of the first liquid crystal cell and the second liquid crystal cell includes a first and a second substrate and a liquid crystal layer arranged between the first and the second substrate. The first substrate includes a first electrode group arranged alternately in parallel to a first direction with a first and a second transparent electrode, and a second electrode group arranged alternately in parallel to the first direction with a fifth and a sixth transparent. The second substrate includes a third electrode group arranged alternately in parallel to a second direction with a third and a fourth transparent electrode, and a fourth electrode group arranged alternately in parallel to a second direction with a seventh and an eighth transparent.

17 Claims, 42 Drawing Sheets

(51) Int. Cl.
*F21V 5/04* (2006.01)
*G02F 1/13357* (2006.01)
*G02F 1/1347* (2006.01)

(56) References Cited

FOREIGN PATENT DOCUMENTS

| | | | |
|---|---|---|---|
| JP | 2010230887 | A | 10/2010 |
| JP | 2010276685 | A | 12/2010 |
| JP | 2014160277 | A | 9/2014 |

* cited by examiner

LIQUID CRYSTAL OPTICAL ELEMENT AND LIGHTING DEVICE

CROSS-REFERENCE TO RELATED APPLICATIONS

This application is a Continuation of International Patent Application No. PCT/JP2022/019864, filed on May 10, 2022, which claims the benefit of priority to Japanese Patent Application No. 2021-092627, filed on Jun. 1, 2021, the entire contents of which are incorporated herein by reference.

FIELD

An embodiment of the present invention relates to an optical element capable of controlling a light distribution with the optical characteristics of a liquid crystal, and a lighting device including an optical element capable of controlling a light distribution with the optical characteristics of a liquid crystal.

BACKGROUND

A liquid crystal lens is known as an optical element (liquid crystal optical element) using a liquid crystal that supplies a voltage to the liquid crystal, changes the refractive index of the liquid crystal, and electrically controls the focal length. For example, a lighting device for controlling the spread of light emitted from a light source by using a liquid crystal cell arranged with electrodes in a concentric circle shape is known (see, for example, Japanese laid-open patent publication No. 2005-317879, Japanese laid-open patent publication No. 2010-230887, or Japanese laid-open patent publication No. 2010-276685). For example, a method for manufacturing a liquid crystal lens is known (see, for example, Japanese laid-open patent publication No. 2008-089782). Furthermore, a beam shaping device pattern for controlling a light distribution by changing a shape of an electrode for supplying a voltage to a liquid crystal is known (see, for example, Japanese laid-open patent publication No. 2014-160277).

SUMMARY

A liquid crystal optical element includes a first liquid crystal cell, a second liquid crystal cell overlapping the first liquid crystal cell and an optical element overlapping the second liquid crystal cell and refracting light. Each of the first liquid crystal cell and the second liquid crystal cell includes a first substrate, a second substrate arranged to face the first substrate, and a liquid crystal layer arranged between the first substrate and the second substrate. The first substrate includes a first electrode group arranged alternately in parallel in a first direction with a first transparent electrode and a second transparent electrode, and a second electrode group arranged alternately in parallel in the first direction with a fifth transparent electrode and a sixth transparent electrode, and adjacent to the first electrode group. The second substrate includes a third electrode group arranged alternately in parallel in a second direction intersecting the first direction with a third transparent electrode and a fourth transparent, and arranged to face the first electrode group, and a fourth electrode group arranged alternately parallel in the second direction with a seventh transparent electrode and an eighth transparent electrode, adjacent to the third electrode group, and arranged to face the second electrode group.

A lighting device according to an embodiment of the present invention includes a light source and the liquid crystal optical element.

DESCRIPTION OF EMBODIMENTS

Hereinafter, embodiments of the present invention will be described with reference to the drawings and the like. However, the present invention can be implemented in many different aspects, and should not be construed as being limited to the description of the embodiments exemplified below. In order to make the description clearer, the drawings may be schematically represented with respect to the width, thickness, shape, and the like of each part as compared with the actual embodiment, but are merely examples, and do not limit the interpretation of the present invention. In addition, in the present specification and the drawings, elements similar to those described previously with respect to the above-mentioned figures are denoted by the same reference signs, letters such as a, b, A, and B after numbers, or a hyphen and a number after the numbers, and detailed description thereof may be omitted as appropriate. Furthermore, the terms “first” and “second” with respect to the respective elements are convenient signs used to distinguish the respective elements, and do not have any further meaning unless otherwise specified.

In the present specification, a member or region is “above (or below)” another member or region, including, without limitation, the case where it is directly above (or below) the other member or region, but also the case where it is above (or below) the other member or region, that is, the case where another component is included between above (or below) the other member or region.

In addition, in the present specification, in the case where a single film is processed to form a plurality of structures, each structure may have different functions and roles, and each structure may have different substrates on which it is formed. However, the plurality of structures is derived from films formed as the same layer in the same process, and have the same properties. Therefore, the plurality of films is defined as being present in the same layer.

Further, in the present specification, the phrase "α includes A, B, or C," "α includes any of A, B, or C," "α includes one selected from a group consisting of A, B, and C," and the like does not exclude cases where α includes a plurality of combinations of A to C unless otherwise indicated. Furthermore, these expressions do not exclude the case where α includes other elements.

First Embodiment

[1-1. Configuration of Liquid Crystal Optical Element 10]

Figure 1:
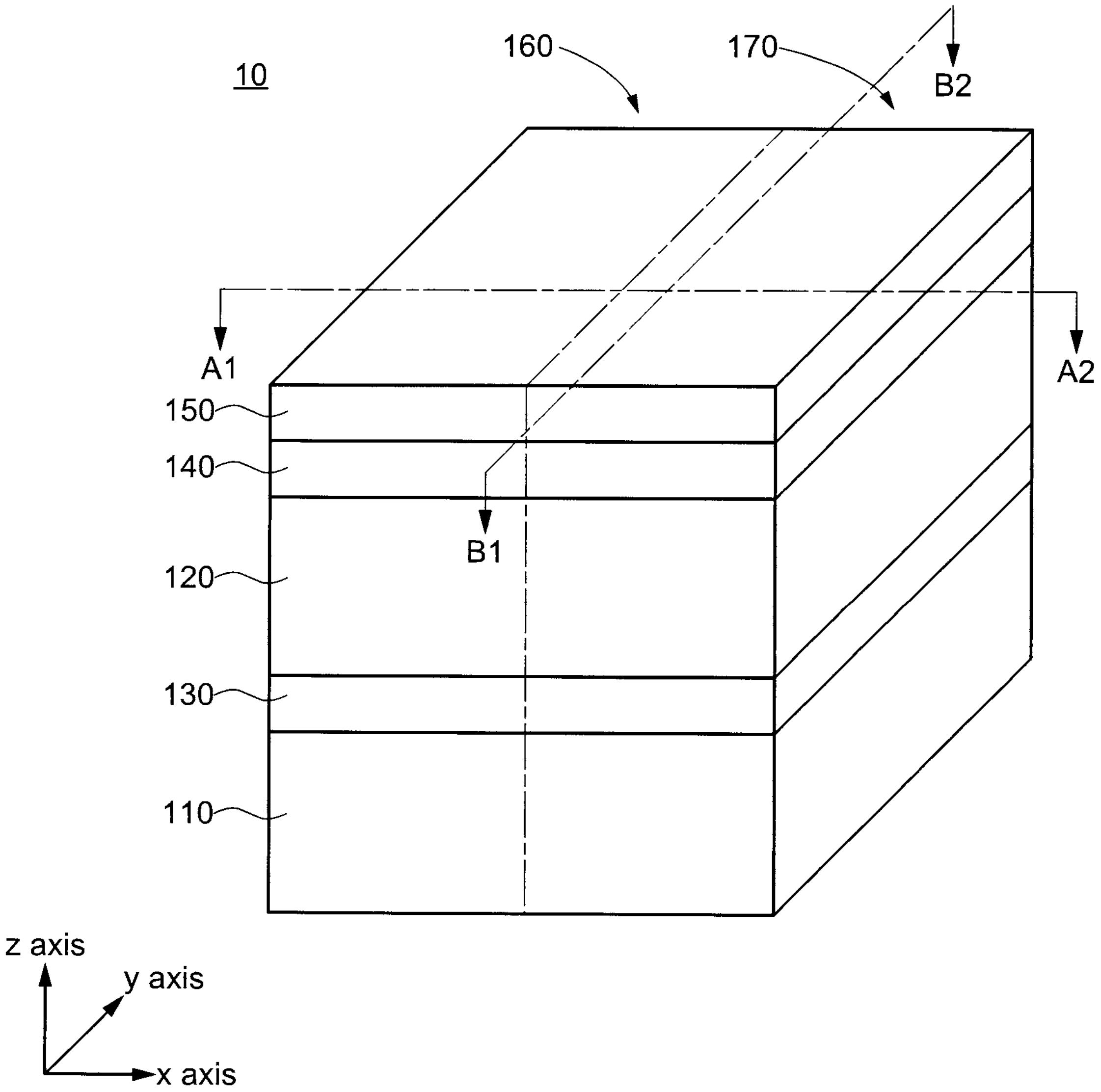
FIG. 1 is a perspective view of a liquid crystal optical element according to an embodiment of the present invention.

FIG. 1 is a schematic perspective view of a liquid crystal optical element 10 according to an embodiment of the present invention. As shown in FIG. 1, the liquid crystal optical element 10 includes a first liquid crystal cell 110, a second liquid crystal cell 120, a first transparent adhesive layer 130, a second transparent adhesive layer 140, and an optical element 150. The liquid crystal optical element 10 broadly includes a second region 170 and a first region 160. The first transparent adhesive layer 130 is arranged between the first liquid crystal cell 110 and the second liquid crystal cell 120. The second transparent adhesive layer 140 is arranged between the second liquid crystal cell 120 and the optical element 150. The first liquid crystal cell 110, the second liquid crystal cell 120, the first transparent adhesive layer 130, the second transparent adhesive layer 140 and the optical element 150 in the liquid crystal optical element 10 are stacked in a z-axis direction.

The first transparent adhesive layer 130 can bond and secure the first liquid crystal cell 110 and the second liquid crystal cell 120. Similar to the first transparent adhesive layer 130, the second transparent adhesive layer 140 can bond and secure the second liquid crystal cell 120 and the optical element 150.

An optically elastic resin can be used to form the first transparent adhesive layer 130 and the second transparent adhesive layer 140. For example, the optically elastic resin is an adhesive containing an acryl resin having light transmittance.

Figure 2:
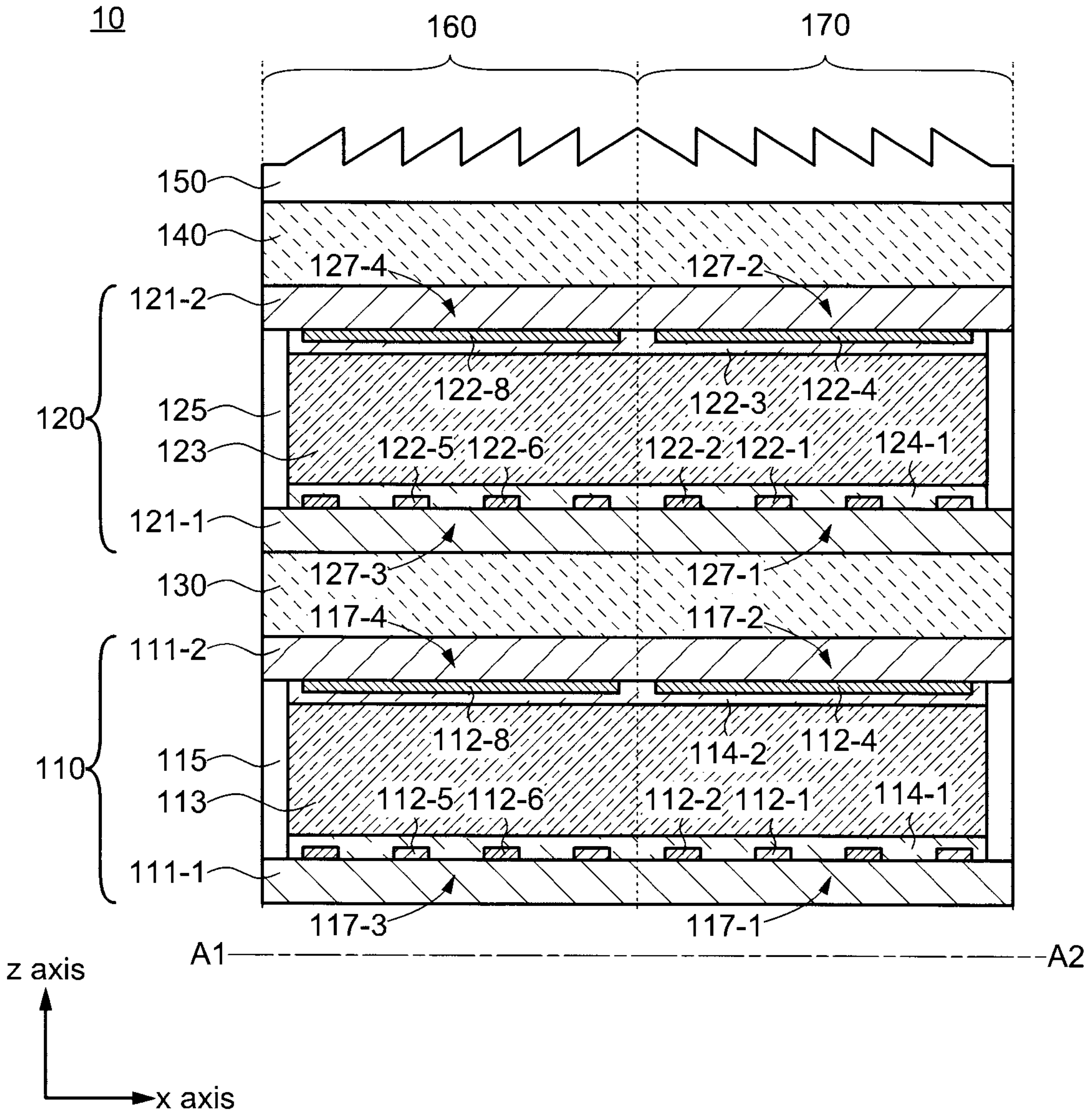
FIG. 2 is a cross-sectional view of a liquid crystal optical element according to an embodiment of the present invention.
Figure 3:
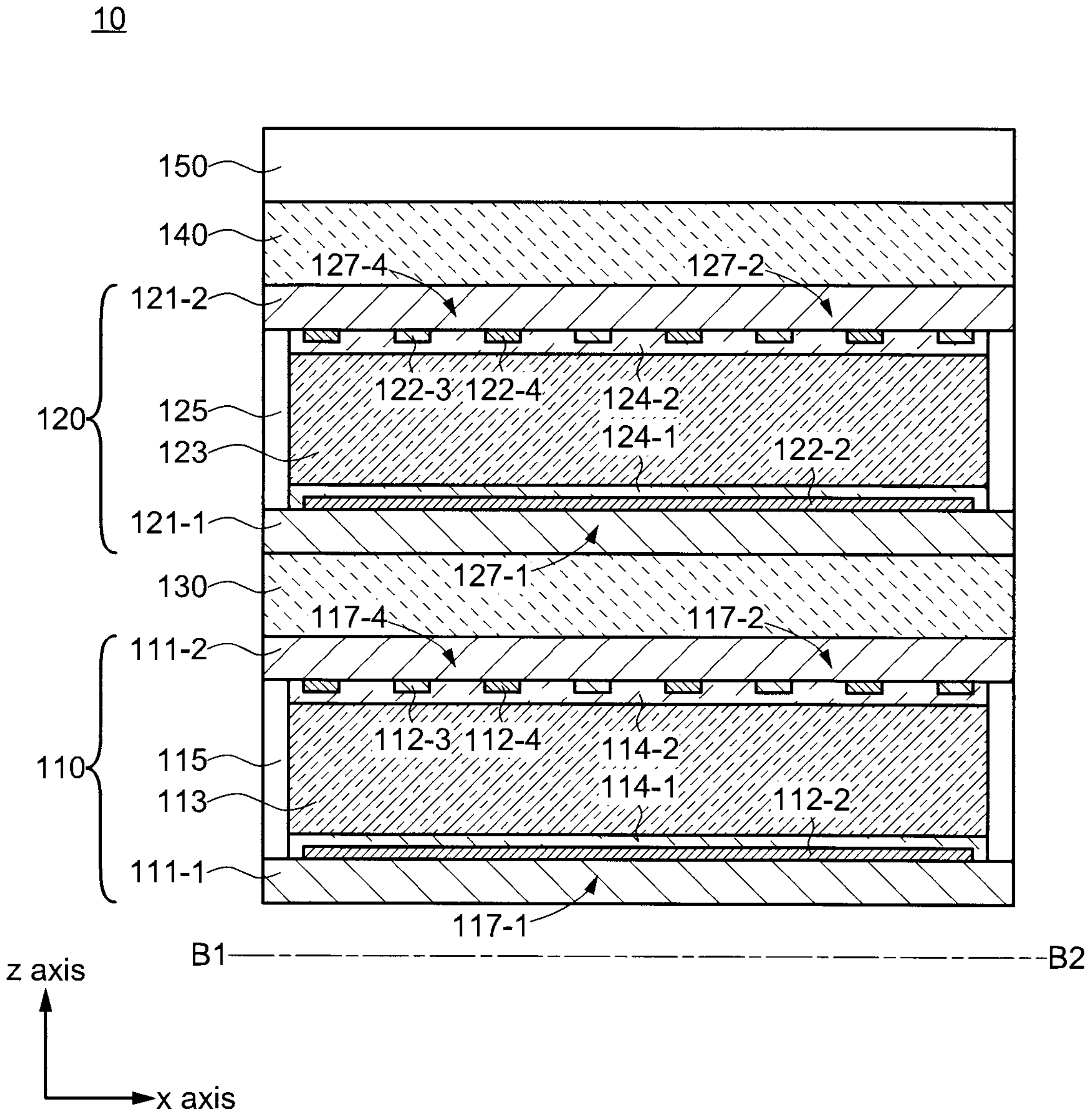
FIG. 3 is a cross-sectional view of a liquid crystal optical element according to an embodiment of the present invention.

FIG. 2 and FIG. 3 are schematic cross-sectional views of the liquid crystal optical element 10. Specifically, FIG. 2 is a schematic cross-sectional view in a zx plane cut along a line A1-A2 shown in FIG. 1, and FIG. 3 is a schematic cross-sectional view in a yz plane cut along a line B1-B2 shown in FIG. 1. An x-axis direction, a y-axis direction intersecting the x-axis direction, and the z-axis direction intersecting the x-axis direction and the y-axis direction may be respectively referred to as a first direction, a second direction and a third direction, in the present embodiment. In addition, the x-axis is perpendicular to the y-axis, and the z-axis is perpendicular to an xy plane (x-axis and y-axis).

The first liquid crystal cell 110 includes a first substrate 111-1, a second substrate 111-2, a first transparent electrode 112-1, a second transparent electrode 112-2, a third transparent electrode 112-3 (see FIG. 6), a fourth transparent electrode 112-4, a fifth transparent electrode 112-5, a sixth transparent electrode 112-6, a seventh transparent electrode 112-7 (see FIG. 6), an eighth transparent electrode 112-8, a liquid crystal layer 113, a first alignment film 114-1, a second alignment film 114-2, and a sealing material 115.

The second liquid crystal cell 120 includes a first substrate 121-1, a second substrate 121-2, a first transparent electrode 122-1, a second transparent electrode 122-2, a third transparent electrode 122-3 (see FIG. 6), a fourth transparent electrode 122-4, a fifth transparent electrode 122-5, a sixth transparent electrode 122-6, a seventh transparent electrode 122-7 (see FIG. 6), an eighth transparent electrode 122-8, a liquid crystal layer 123, a first alignment film 124-1, a second alignment film 124-2, and a sealing material 125.

Although details will be described later, the optical element 150 is a transparent body having two or more optical planes, and has at least one set of prisms in which the optical planes are not parallel. For example, the prism is configured using a triangular prism. For example, in the present embodiment, the optical element 150 has a plurality of triangular prisms arranged parallel or substantially parallel to the x-axis direction or parallel or substantially parallel to the y-axis direction.

The liquid crystal optical element 10 has two liquid crystal cells, but the configuration of the two liquid crystal cells is the same. The configuration of the first liquid crystal cell 110 will be mainly described in the following description, and the description of the configuration of the second liquid crystal cell 120 may be added in the following description.

The first transparent electrode 112-1, the second transparent electrode 112-2, the fifth transparent electrode 112-5, and the sixth transparent electrode 112-6 are arranged on the first substrate 111-1. The first alignment film 114-1 is arranged so as to cover surfaces and side surfaces of the first transparent electrode 112-1, the second transparent electrode 112-2, the fifth transparent electrode 112-5, the sixth transparent electrode 112-6, and the first substrate 111-1.

The third transparent electrode 112-3, the fourth transparent electrode 112-4, the seventh transparent electrode 112-7, and the eighth transparent electrode 112-8 are arranged on the second substrate 111-2. The second alignment film 114-2 is arranged so as to cover surfaces and side surfaces of the third transparent electrode 112-3, the fourth transparent electrode 112-4, the seventh transparent electrode 112-7, and the eighth transparent electrode 112-8.

Although details will be described later, the first transparent electrode 112-1, the second transparent electrode 112-2, the third transparent electrode 112-3, and the fourth transparent electrode 112-4 are arranged in the second region 170, and the fifth transparent electrode 112-5, the sixth transparent electrode 112-6, the seventh transparent electrode 112-7, and the eighth transparent electrode 112-8 are arranged in the first region 160.

In the first substrate 111-1 and the second substrate 111-2, the first transparent electrode 112-1, the second transparent electrode 112-2, the fifth transparent electrode 112-5, and the sixth transparent electrode 112-6 on the first substrate 111-1 and the third transparent electrode 112-3, the fourth transparent electrode 112-4, the seventh transparent electrode 112-7, and the eighth transparent electrode 112-8 on the second substrate 111-2 are arranged so as to face each other with the liquid crystal layer 113 interposed therebetween.

The sealing material 115 is arranged on each peripheral part of the first substrate 111-1 and the second substrate 111-2 to bond the first substrate 111-1 and the second substrate 111-2. The liquid crystal layer 113 containing a liquid crystal is arranged in a space surrounded by the first substrate 111-1 (more specifically, the first alignment film 114-1), the second substrate 111-2 (more specifically, the second alignment film 114-2), and the sealing material 115.

A rigid substrate having light transmittance, or a flexible substrate having light transmittance can be used as the first substrate 111-1 and the second substrate 111-2. For example, the first substrate 111-1 and the second substrate 111-2 are glass substrates, quartz substrates, sapphire substrates, polyimide resin substrates, acryl resin substrates, siloxane resin substrates, or fluororesin substrates.

For example, the first transparent electrode 112-1, the second transparent electrode 112-2, the third transparent electrode 112-3, the fourth transparent electrode 112-4, the fifth transparent electrode 122-5, the sixth transparent electrode 122-6, the seventh transparent electrode 112-7, and the eighth transparent electrode 112-8 function as electrodes for forming an electric field in the liquid crystal layer 113. A transparent conductive material such as indium-tin oxide (ITO) or indium-zinc oxide (IZO) can be used for the material forming the first transparent electrode 112-1, the second transparent electrode 112-2, the third transparent electrode 112-3, the fourth transparent electrode 112-4, the fifth transparent electrode 122-5, the sixth transparent electrode 122-6, the seventh transparent electrode 112-7, and the eighth transparent electrode 112-8.

The liquid crystal layer 113 can refract transmitted light or change the polarization state of the transmitted light depending on an orientation state of the liquid crystal molecules. For example, a twisted nematic liquid crystal can be used as the liquid crystal included in the liquid crystal layer 113. A positive-type twisted nematic liquid crystal is used as the liquid crystal, but a negative-type twisted nematic liquid crystal may be used as the liquid crystal by changing the initial orientation direction of liquid crystal molecules, as an example in the present embodiment. In addition, the liquid crystal preferably contains a chiral agent that imparts twist to the liquid crystal molecules.

For example, the first alignment film 114-1 and the second alignment film 114-2 have a function of arranging the liquid crystal molecules in the liquid crystal layer 113 in a predetermined orientation. Polyimide may be used as the material for forming the first alignment film 114-1 and the second alignment film 114-2. The first alignment film 114-1 and the second alignment film 114-2 may be given alignment characteristics by an alignment treatment. For example, a rubbing method or an optical alignment method may be used as the alignment treatment. The rubbing method is a method of rubbing an alignment film in one direction. The optical alignment method is a method of irradiating an alignment film with linearly polarized ultraviolet rays.

For example, the sealing material 115 may be an epoxy resin adhesive or an acrylic resin adhesive. The adhesive material may be ultraviolet curable or thermosetting.

Although details will be described later, the liquid crystal optical element 10 includes two liquid crystal cells (the first liquid crystal cell 110 and the second liquid crystal cell 120), so that the light distribution of unpolarized light can be controlled and a light distribution pattern can be formed. Therefore, outer surfaces of the first substrate 111-1 and the second substrate 121-2 do not need to be arranged with a pair of polarization plates such as those arranged on the front and back surfaces of the liquid crystal display element.

[1-2. Configuration of Optical Element 150]

Figure 4:
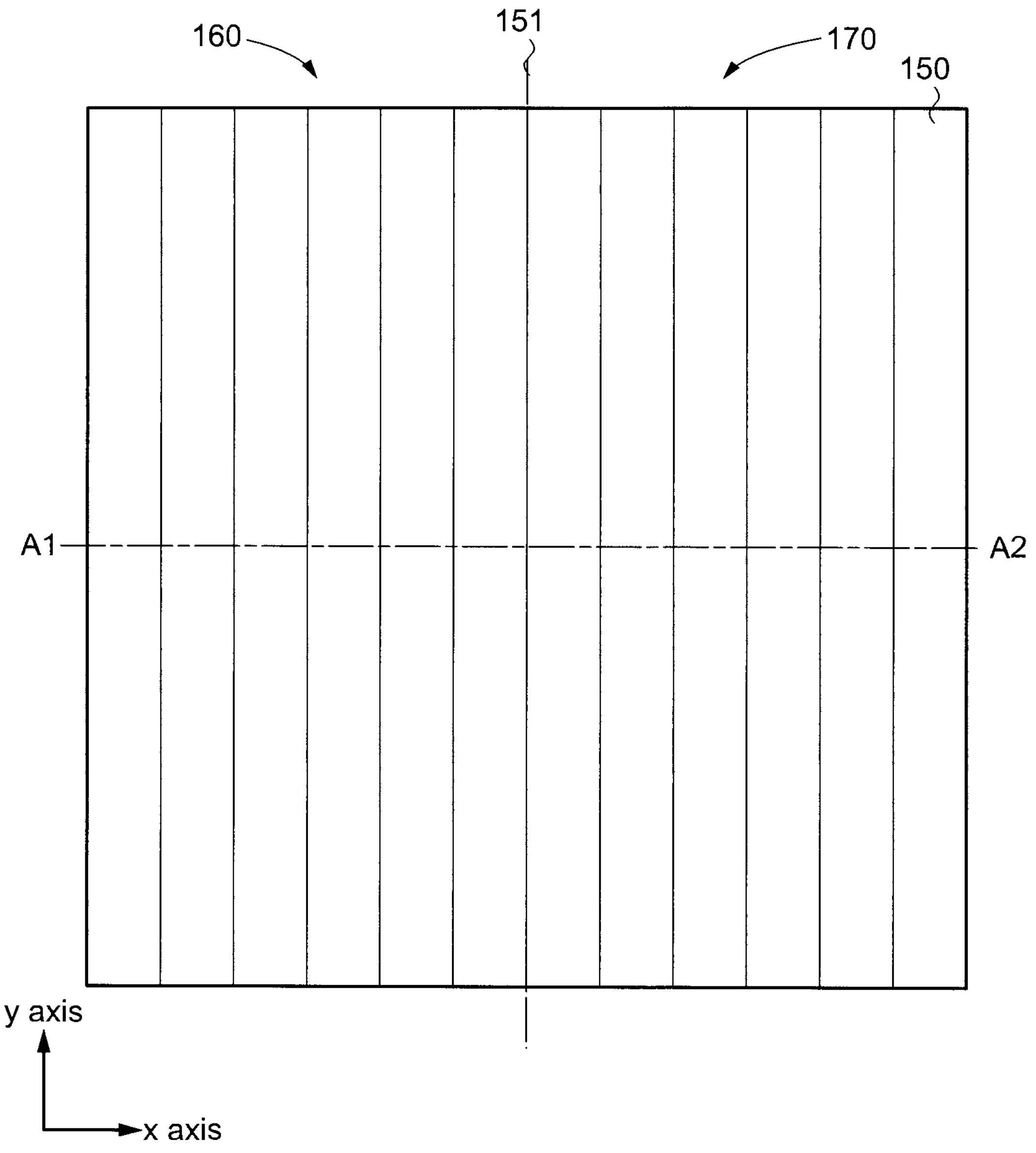
FIG. 4 is a plan view of prisms on a second liquid crystal cell in a liquid crystal optical element according to an embodiment of the present invention.

FIG. 4 is a plan view of the optical element 150 on the second liquid crystal cell 120 in the liquid crystal optical element 10. A schematic cross-sectional view in the zx plane of the optical element 150 cut along a line A1-A2 shown in FIG. 4 is a cross-sectional view of the optical element 150 shown in FIG. 2 and FIG. 3.

For example, the optical element 150 has a plurality of triangular prisms arranged parallel or substantially parallel to the x-axis direction or parallel or substantially parallel to the y-axis direction. Solid lines parallel to the y-axis direction shown in FIG. 4 are portions corresponding to apex angles of the triangular prisms.

The optical element 150 bends, disperses, or totally reflects the incident light. That is, the optical element 150 emits incident light in a direction different from the incident direction. For example, the optical element 150 refracts (incident) light. The prism arranged in the second region 170 and the prism arranged in the first region 160 are symmetrical or substantially symmetrical with respect to a line 151 connecting the centers of sides parallel to the x-axis direction. As a result, the lights incident on each of the prism arranged in the second region 170 and the prism arranged in the first region 160 can be independently bent, dispersed, or totally reflected.

For example, an organic resin such as an acrylic resin or a polycarbonate resin can be used as a material for forming the optical element 150.

The apex angle of the optical element 150 can be changed depending on the application, so that the bending, dispersion, or total reflection of the incident light can be changed depending on the application. Light incident on the prism arranged in the second region 170 can be bent, dispersed, or totally reflected depending on the voltage supplied to the first transparent electrode 112-1 and the second transparent electrode 112-2 arranged in the second region 170 in the present embodiment, and light incident on the prism arranged in the first region 160 can be bent, dispersed, or totally reflected depending on the voltage supplied to the fifth transparent electrode 112-5 and the sixth transparent electrode 112-6 arranged in the first region 160 in the present embodiment.

In the present embodiment, in the optical element 150, the prism arranged in the second region 170 may be referred to as a first optical conversion part, and the prism arranged in the first region 160 may be referred to as a second optical conversion part.

[1-3. Arrangement of Transparent Electrodes]

Figure 5:
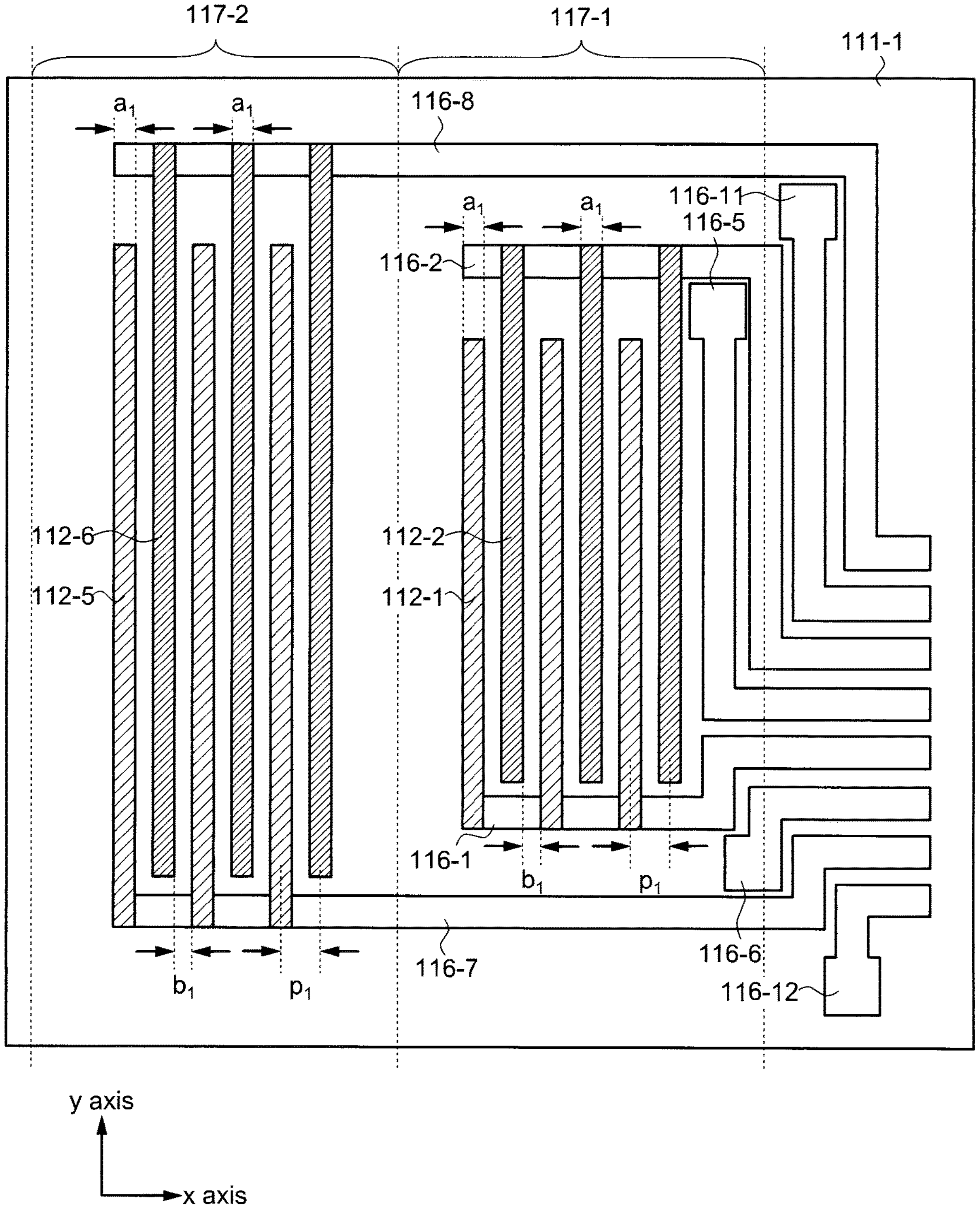
FIG. 5 is a plan view showing an arrangement of a first transparent electrode, a second transparent electrode, a fifth transparent electrode, and a sixth transparent electrode on a first substrate in a liquid crystal optical element according to an embodiment of the present invention.
Figure 6:
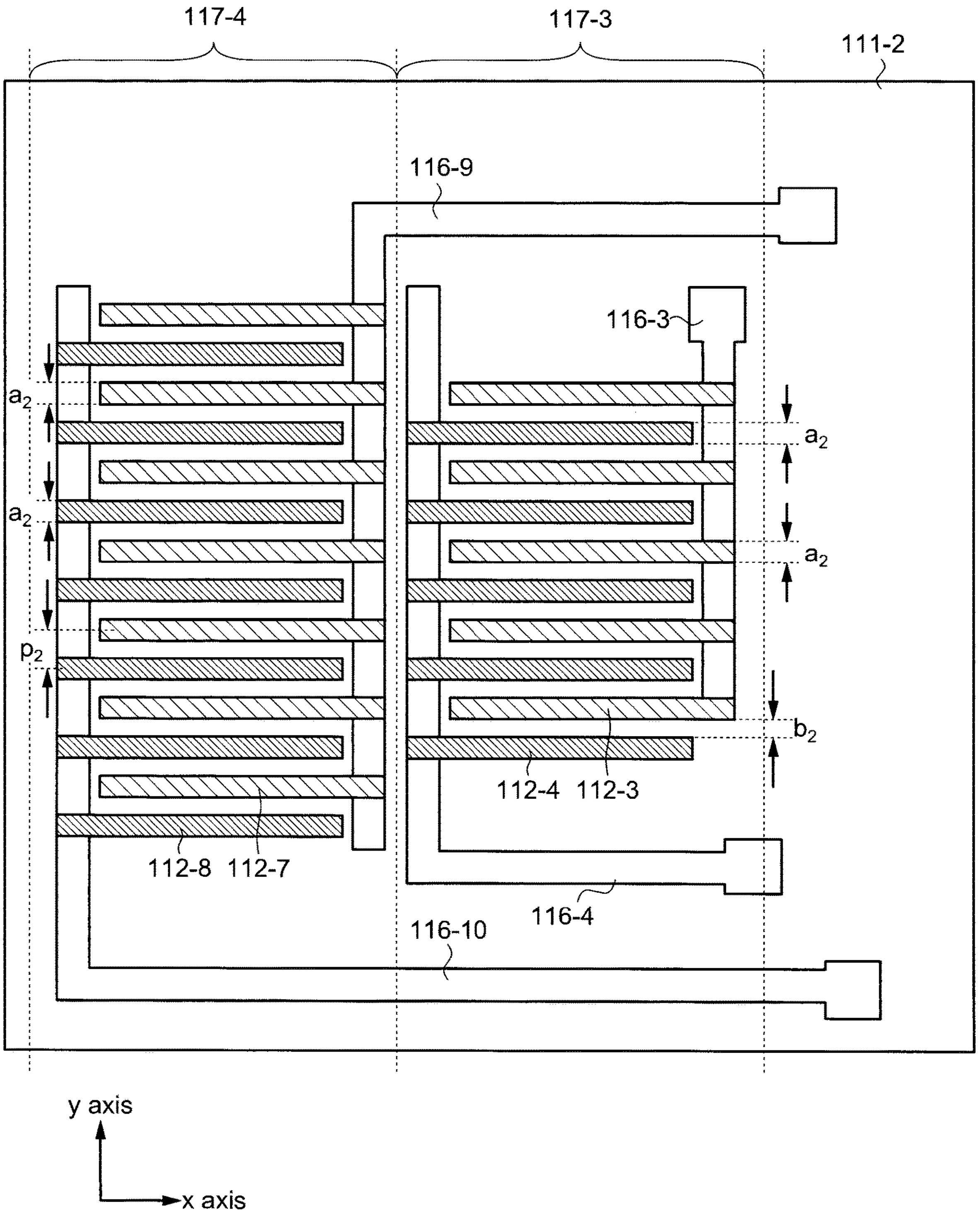
FIG. 6 is a plan view showing an arrangement of a third transparent electrode, a fourth transparent electrode, a seventh transparent electrode, and an eighth transparent electrode on a second substrate in a liquid crystal optical element according to an embodiment of the present invention.

FIG. 5 is a plan view showing an arrangement of the first transparent electrode 112-1, the second transparent electrode 112-2, the fifth transparent electrode 112-5, and the sixth transparent electrode 112-6 on the first substrate 111-1 in the liquid crystal optical element 10. FIG. 6 is a schematic plan view showing an arrangement of the third transparent electrode 112-3, the fourth transparent electrode 112-4, the seventh transparent electrode 112-7, and the eighth transparent electrode 112-8 on the second substrate 111-2 in the liquid crystal optical element 10. In addition, although FIG. 5 and FIG. 6 show a transparent electrode or the like included in the first liquid crystal cell 110, the second liquid crystal cell 120 can be described by replacing the transparent electrode 112 and the first substrate 111 in the first liquid crystal cell 110 with the transparent electrode 122 and the second substrate 121.

As shown in FIG. 5, a first electrode group 117-1 arranged in the second region 170 includes the first transparent electrode 112-1 and the second transparent electrode 112-2. The first transparent electrode 112-1 and the second transparent electrode 112-2 are alternately arranged in the x-axis direction and extend in the y-axis direction. A width of the first transparent electrode 112-1 and a width of the second transparent electrode 112-2 are a first width $a_1$ in the x-axis direction. An inter-electrode distance (electrode interval) between the first transparent electrode 112-1 and the second transparent electrode 112-2 in the x-axis direction is a first inter-electrode distance $b_1$. A pitch between the first transparent electrode 112-1 and the second transparent electrode 112-2 is a first pitch $p_1$, and the first pitch $p_1$ satisfies $p_1=a_1+b_1$. In addition, the first transparent electrode 112-1 and the second transparent electrode 112-2 are electrically connected to a first wiring 116-1 and a second wiring 116-2 formed on the first substrate 111-1, respectively. The first wiring 116-1 may be formed below the first transparent electrode 112-1 and may be formed on the first transparent electrode 112-1. In addition, the first wiring 116-1 may be formed in the same layer as the first transparent electrode 112-1. The configuration of the second wiring 116-2 is the same as the configuration of the first wiring 116-1.

As shown in FIG. 5, a second electrode group 117-2 arranged in the first region 160 includes the fifth transparent electrode 112-5 and the sixth transparent electrode 112-6. A width of the fifth transparent electrode 112-5, a width of the sixth transparent electrode 112-6, an inter-electrode distance of the fifth transparent electrode 112-5 and the sixth transparent electrode 112-6 in the x-axis direction (electrode interval), and a pitch between the fifth transparent electrode 112-5 and the sixth transparent electrode 112-6 are the same as the width of the first transparent electrode 112-1, the width of the second transparent electrode 112-2, the inter-electrode distance of the first transparent electrode 112-1 and the second transparent electrode 112-2 in the x-axis direction (electrode interval), and the pitch between the first transparent electrode 112-1 and the second transparent electrode 112-2. In addition, the fifth transparent electrode 112-5 and the sixth transparent electrode 112-6 are electrically connected to a seventh wiring 116-7 and an eighth wiring 116-8 formed on the first substrate 111-1, respectively. The seventh wiring 116-7 may be formed below the fifth transparent electrode 112-5 and may be formed on the fifth transparent electrode 112-5. In addition, the seventh wiring 116-7 may be formed in the same layers as the fifth transparent electrode 112-5. The configuration of the eighth wiring 116-8 is the same as the configuration of the seventh wiring 116-7.

The first alignment film 114-1 is subjected to an alignment treatment in the x-axis direction. In this case, among the liquid crystal molecules constituting the liquid crystal layer 113, the long axis of the liquid crystal molecule on the first substrate 111-1 side is aligned along the x-axis direction. That is, an orientation direction (x-axis direction) of the first alignment film 114-1 is perpendicular to an extending direction (y-axis direction) of the first transparent electrode 112-1, the second transparent electrode 112-2, the fifth transparent electrode 112-5, and the sixth transparent electrode 112-6.

As shown in FIG. 6, a third electrode group 117-3 arranged in the second region 170 includes the third transparent electrode 112-3 and the fourth transparent electrode 112-4. The third transparent electrode 112-3 and the fourth transparent electrode 112-4 are arranged alternately in the y-axis direction and extend in the x-axis direction. A width of the third transparent electrode 112-3 and a width of the fourth transparent electrode 112-4 are a second width $a_2$ in the y-axis direction. An inter-electrode distance (electrode interval) between the third transparent electrode 112-3 and the fourth transparent electrode 112-4 in the x-axis direction is a second inter-electrode distance $b_2$. A pitch between the third transparent electrode 112-3 and the fourth transparent electrode 112-4 is the second pitch $p_2$, and the second pitch $p_2$ satisfies $p_2=a_2+b_2$. In addition, the third transparent electrode 112-3 and the fourth transparent electrode 112-4 are electrically connected to a third wiring 116-3 and a fourth wiring 116-4 formed on the second substrate 111-2, respectively. The third wiring 116-3 may be formed below the third transparent electrode 112-3 and may be formed on the third transparent electrode 112-3. In addition, the third wiring 116-3 may be formed in the same layer as the third transparent electrode 112-3. The configuration of the fourth wiring 116-4 is the same as the configuration of the third wiring 116-3.

As shown in FIG. 6, a fourth electrode group 117-4 arranged in the first region 160 includes the seventh transparent electrode 112-7 and the eighth transparent electrode 112-8. A width of the seventh transparent electrode 112-7, a width of the eighth transparent electrode 112-8, an inter-electrode distance of the seventh transparent electrode 112-7 and the eighth transparent electrode 112-8 in the y-axis direction (electrode interval), and a pitch between the seventh transparent electrode 112-7 and the eighth transparent electrode 112-8 are the same as the width of the third transparent electrode 112-3, the width of the fourth transparent electrode 112-4, the inter-electrode distance (electrode interval) between the third transparent electrode 112-3 and the fourth transparent electrode 112-4 in the y-axis direction, and the pitch between the third transparent electrode 112-3 and the fourth transparent electrode 112-4. In addition, the seventh transparent electrode 112-7 and the eighth transparent electrode 112-8 are electrically connected to a ninth wiring 116-9 and a tenth wiring 116-10 formed on the second substrate 111-2, respectively. The ninth wiring 116-9 may be formed below the seventh transparent electrode 112-7 and may be formed on the seventh transparent electrode 112-7. In addition, the ninth wiring 116-9 may be formed in the same layer as the seventh transparent electrode 112-7. The configuration of the tenth wiring 116-10 is the same as the configuration of the ninth wiring 116-9.

The second alignment film 114-2 is subjected to an alignment treatment in the y-axis direction. In this case, among the liquid crystal molecules constituting the liquid crystal layer 113, the long axis of the liquid crystal molecule on the second substrate 111-2 side is aligned along the y-axis direction. That is, the orientation direction (y-axis direction) of the second alignment film 114-2 is perpendicular to an extending direction (x-axis direction) of the third transparent electrode 112-3, the fourth transparent electrode 112-4, the seventh transparent electrode 112-7, and the eighth transparent electrode 112-8.

The first transparent electrode 112-1 and the second transparent electrode 112-2 can be said to be formed on the first substrate 111-1 in a comb-tooth pattern having the first pitch $p_1$, and the fifth transparent electrode 112-5 and the sixth transparent electrode 112-6 can be said to be formed on the first substrate 111-1 in a comb-tooth pattern having the first pitch $p_1$. Similarly, the third transparent electrode 112-3 and the fourth transparent electrode 112-4 can be said to be formed on the second substrate 111-2 in a comb-tooth pattern having the second pitch $p_2$, and the seventh transparent electrode 112-7 and the eighth transparent electrode 112-8 can be said to be formed on the second substrate 111-2 in a comb-tooth pattern having the second pitch $p_2$.

In the first liquid crystal cell 110, the first transparent electrode 112-1 and the second transparent electrode 112-2 face the third transparent electrode 112-3 and the fourth transparent electrode 112-4 with the liquid crystal layer 113 interposed therebetween, and the fifth transparent electrode 112-5 and the sixth transparent electrode 112-6 face the seventh transparent electrode 112-7 and the eighth transparent electrode 112-8 with the liquid crystal layer 113 interposed therebetween.

In this case, the direction (y-axis direction) in which the first transparent electrode 112-1, the second transparent electrode 112-2, the fifth transparent electrode 112-5, and the sixth transparent electrode 112-6 extend is orthogonal to the direction (x-axis direction) in which the third transparent electrode 112-3, the fourth transparent electrode 112-4, the seventh transparent electrode 112-7, and the eighth transparent electrode 112-8 extend. In other words, the comb-shaped electrode pattern formed on the first substrate 111-1 and the comb-shaped electrode pattern formed on the second substrate are perpendicular to each other in a plan view.

In addition, a fifth wiring 116-5, a sixth wiring 116-6, an eleventh wiring 116-11, and a 12th wiring 116-12 are formed in the first substrate 111-1. When the first substrate 111-1 is bonded to the second substrate 111-2, the third wiring 116-3 and the fourth wiring 116-4 are electrically connected to the fifth wiring 116-5 and the sixth wiring 116-6 arranged in the first substrate 111-1, respectively. Similarly, the ninth wiring 116-9 and the tenth wiring 116-10 are electrically connected to the eleventh wiring 116-11 and the 12th wiring 116-12 arranged in the first substrate 111-1, respectively.

For example, the third wiring 116-3 and the fifth wiring 116-5, the fourth wiring 116-4 and the sixth wiring 116-6, the ninth wiring 116-9 and the eleventh wiring 116-11, and the tenth wiring 116-10 and the 12th wiring 116-12 may be electrically connected using silver paste or conductive particles. In addition, the conductive particles include metal-coated particles.

In the present embodiment, the first direction in which the first transparent electrode 112-1 and the second transparent electrode 112-2 are alternately arranged are orthogonal to the second direction in which the third transparent electrode 112-3 and the fourth transparent electrode 112-4 are alternately arranged, but they may be slightly deviated from each other and intersect with each other, and these may be crossed. Similarly, in the present embodiment, the first direction in which the fifth transparent electrode 112-5 and the sixth transparent electrode 112-6 are alternately arranged are orthogonal to the second direction in which the seventh transparent electrode 112-7 and the eighth transparent electrode 112-8 are alternately arranged, but they may be slightly deviated from each other and intersect with each other, and these may be crossed. In addition, the orthogonal angle or the slightly offset intersecting angle may be 0 degrees, and may be 80 degrees or more and 100 degrees or less (90±10 degrees).

Although details will be described later, the first transparent electrode 112-1 and the second transparent electrode 112-2 of the first substrate 111-1 arranged in the second region 170 intersect with the third transparent electrode 112-3 and the fourth transparent electrode 112-4 of the second substrate, so that the alignment of the liquid crystal of the liquid crystal layer 113 can be controlled by controlling the voltages supplied to each transparent electrode.

In addition, in the present embodiment, the fifth transparent electrode 112-5 and the sixth transparent electrode 112-6 of the first substrate 111-1 arranged in the first region 160 intersect with the seventh transparent electrode 112-7 and the eighth transparent electrode 112-8 of the second substrate, so that the orientation of the liquid crystal of the liquid crystal layer 113 can be controlled by controlling the voltages supplied to each transparent electrode.

As a result, the light distribution or the light distribution pattern of the first region 160 and the second region 170 in the liquid crystal optical element 10 is independently controlled.

A photo spacer for holding an interval between the first substrate 111-1 and the second substrate 111-2 is formed (not shown) on a side of the first substrate 111-1 opposite to the second substrate 111-2 or on a side of the second substrate 111-2 opposite to the first substrate 111-1.

The material forming the first wiring 116-1, the second wiring 116-2, the third wiring 116-3, the fourth wiring 116-4, the fifth wiring 116-5, the sixth wiring 116-6, the seventh wiring 116-7, the eighth wiring 116-8, the ninth wiring 116-9, the tenth wiring 116-10, the eleventh wiring 116-11, and the 12th wiring 116-12 may be a metal material or a transparent conductive material. For example, the metal material or the transparent conductive material is aluminum, molybdenum, indium-tin oxide (ITO), or indium-zinc oxide (IZO). In addition, terminals for connecting to an external device may be arranged in the first wiring 116-1, the second wiring 116-2, the third wiring 116-3, the fourth wiring 116-4, the fifth wiring 116-5, the sixth wiring 116-6, the seventh wiring 116-7, the eighth wiring 116-8, the ninth wiring 116-9, the tenth wiring 116-10, the eleventh wiring 116-11, and the twelfth wiring 116-12, and the first wiring 116-1, the second wiring 116-2, the third wiring 116-3, the fourth wiring 116-4, the fifth wiring 116-5, the sixth wiring 116-6, the seventh wiring 116-7, the eighth wiring 116-8, the ninth wiring 116-9, the tenth wiring 116-10, the eleventh wiring 116-11, and the twelfth wiring 116-12 may be the terminals for connecting to an external device.

The first wiring 116-1, the second wiring 116-2, the fifth wiring 116-5 (or the third wiring 116-3), the sixth wiring 116-6 (or the fourth wiring 116-4), the seventh wiring 116-7, the eighth wiring 116-8, the eleventh wiring 116-11 (or the ninth wiring 116-9), and the 12th wiring 116-12 (or the tenth wiring 116-10) are electrically insulated from each other. Therefore, in the first liquid crystal cell 110, different voltages can be supplied to each of the first transparent electrode 112-1, the second transparent electrode 112-2, the third transparent electrode 112-3, the fourth transparent electrode 112-4, the fifth transparent electrode 112-5, the sixth transparent electrode 112-6, the seventh transparent electrode 112-7, and the eighth transparent electrode 112-8. As a result, the orientation of liquid crystal molecules of the liquid crystal layer 113 can be controlled using each transparent electrode.

[1-4. Control of Light Distribution by Liquid Crystal Optical Element 10]

Figure 7:
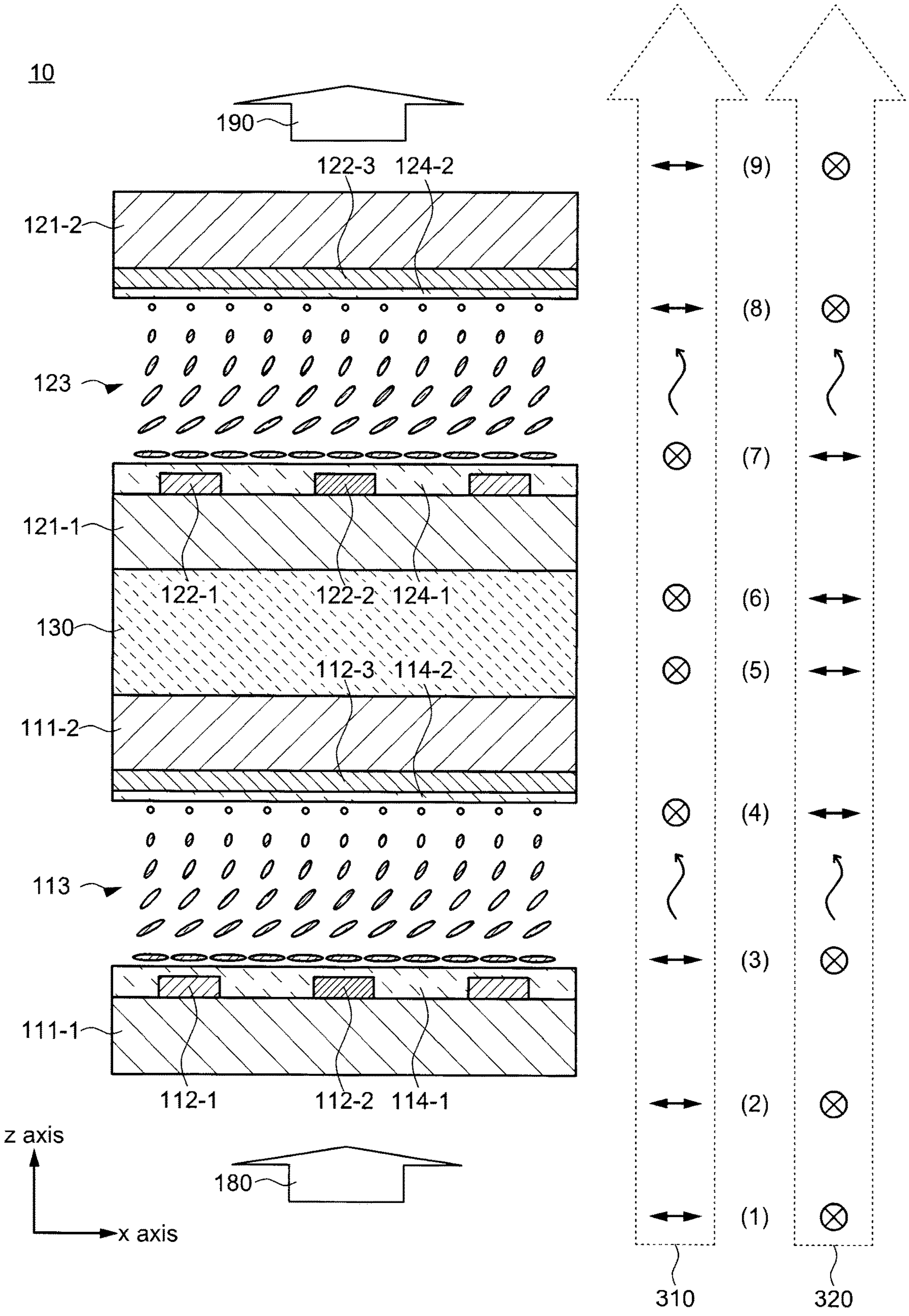
FIG. 7 is a cross-sectional view showing an orientation of a liquid crystal of a liquid crystal layer in a liquid crystal optical element according to an embodiment of the present invention.
Figure 8:
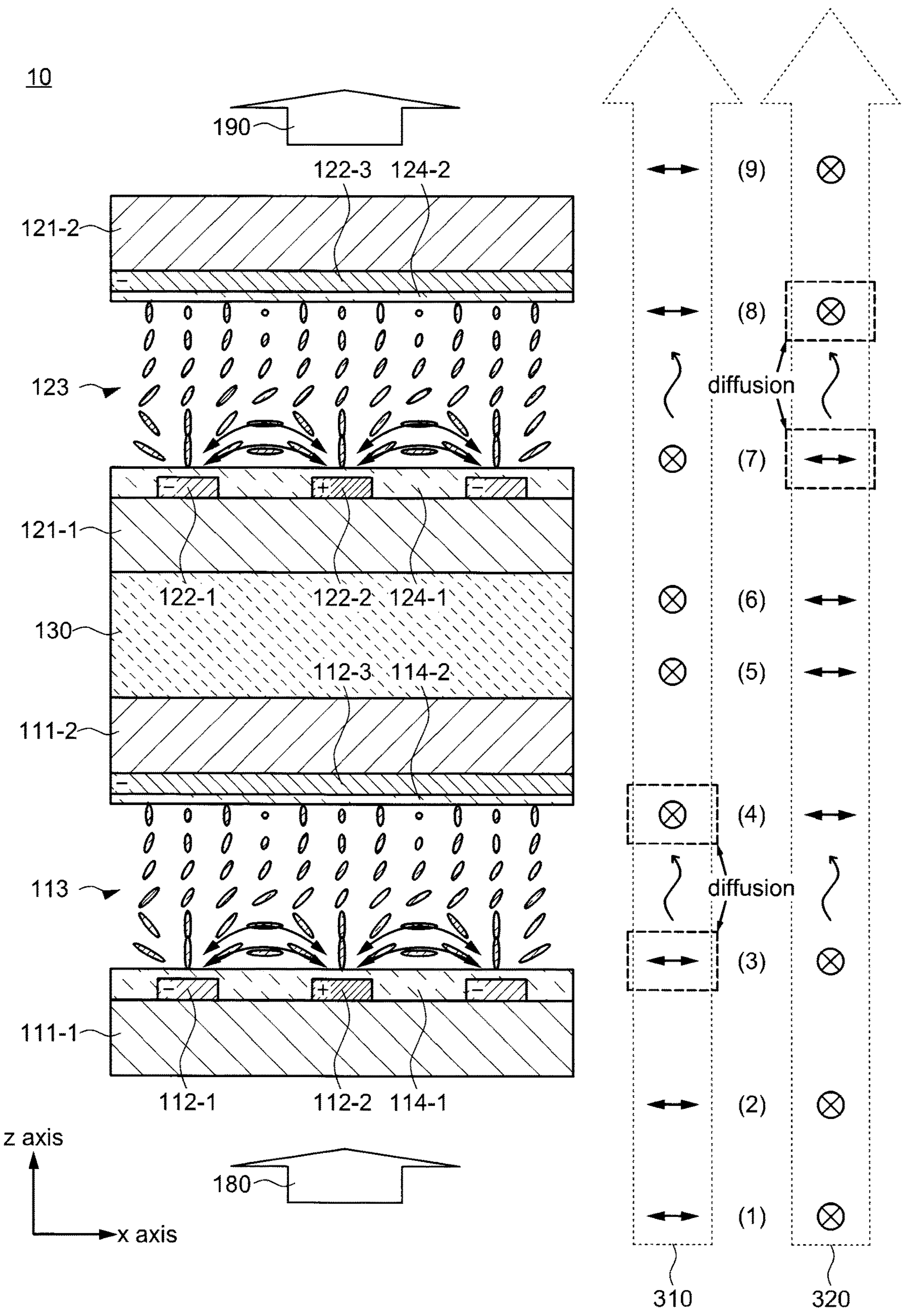
FIG. 8 is a cross-sectional view showing an orientation of a liquid crystal of a liquid crystal layer in a liquid crystal optical element according to an embodiment of the present invention.

FIG. 7 and FIG. 8 are schematic cross-sectional views showing the orientation of the liquid crystal molecules of the liquid crystal layer 113 in the liquid crystal optical element 10. FIG. 7 and FIG. 8 correspond to portions of a cross-sectional view of the first liquid crystal cell 110 included in the second region 170 shown in FIG. 2 and FIG. 3, respectively. The second region 170 and the first region 160 have the same configuration. The configuration of the first liquid crystal cell 110 or the second liquid crystal cell 120 included in the second region 170 will be mainly described in the following description, and the description of the configuration of the first liquid crystal cell 110 or the second liquid crystal cell 120 included in the first region 160 will be omitted in the following description.

In FIG. 7, the liquid crystal optical element 10 is shown in a state where no voltage is supplied to the first transparent electrode 112-1, the second transparent electrode 112-2, the third transparent electrode 112-3, the first transparent electrode 122-1, the second transparent electrode 122-2, and the third transparent electrode 122-3. The liquid crystal optical element 10 in FIG. 8 is shown in a state where voltages are supplied to the first transparent electrode 112-1, the second transparent electrode 112-2, the third transparent electrode 112-3, the first transparent electrode 122-1, the second transparent electrode 122-2, and the third transparent electrode 122-3. Specifically, a Low potential is supplied to the first transparent electrode 112-1 and the third transparent electrode 112-3 of the first liquid crystal cell 110, and a High potential is supplied to the second transparent electrode 112-2 and the fourth transparent electrode 112-4 (not shown). Similarly, the Low potential is supplied to the first transparent electrode 122-1 and the third transparent electrode 122-3 of the second liquid crystal cell 120, and the High potential is supplied to the second transparent electrode 122-2 and the fourth transparent electrode 122-4 (not shown). For convenience in FIG. 8, the Low potential and the High potential are illustrated using symbols "−" and "+", respectively. An electric field generated between adjacent transparent electrodes in the present embodiment may be referred to as a transverse electric field.

The first alignment film 114-1 is subjected to an alignment treatment in the x-axis direction. The long axis of the liquid crystal molecule on the first substrate 111-1 side of the liquid crystal layer 113 is aligned in the x-axis direction as shown in FIG. 7. That is, the orientation direction of liquid crystal molecules on the first substrate 111-1 side is a direction perpendicular to an extending direction (y-axis direction) of the first transparent electrode 112-1 and the second transparent electrode 112-2. In addition, the second alignment film 114-2 is subjected to an alignment treatment in the y-axis direction. Further, the long axis of the liquid crystal molecule on the second substrate 111-2 side of the liquid crystal layer 113 is aligned in the y-axis direction. That is, the orientation direction of the liquid crystal molecule on the second substrate 111-2 side of the liquid crystal layer 113 is a direction perpendicular to the extending direction (x-axis direction) of the third transparent electrode 112-3 and the fourth transparent electrode 112-4 (see FIG. 6). Therefore, the liquid crystal molecules of the liquid crystal layer 113 gradually change the orientation of the long axis from the x-axis direction to the y-axis direction from the first substrate 111-1 toward the second substrate 111-2, and are oriented with a 90-degree twist.

When a potential is supplied to the transparent electrode 112, the orientation direction of the liquid crystal molecule changes as shown in FIG. 8. Due to the effect of the transverse electric field between the first transparent electrode 112-1 and the second transparent electrode 112-2 of the liquid crystal layer 113, the liquid crystal molecules on the first substrate 111-1-side of the liquid crystal layer 113 generally align in an arc convex in the x-axis direction with respect to the first substrate 111-1. Similarly, due to the effect of the transverse electric field between the third transparent electrode 112-3 and the fourth transparent electrode 112-4 of the liquid crystal layer 113, the liquid crystal molecules on the second substrate 111-2 side of the liquid crystal layer 113 generally align in an arc convex in the y-axis direction with respect to the second substrate 111-2. The liquid crystal molecules of the liquid crystal layer 113 positioned substantially in the center between the first transparent electrode 112-1 and the second transparent electrode 112-2 hardly change their orientation due to any transverse electric field. Therefore, the light incident on the liquid crystal layer 113 is diffused in the x-axis direction according to the refractive index distribution of the liquid crystal molecule aligned in an arc convex in the x-axis direction on the first substrate 111-1 side and is diffused in the y-axis direction according to the refractive index distribution of the liquid crystal molecule aligned in an arc convex in the y-axis direction.

In addition, since the first substrate 111-1 and the second substrate 111-2 have a sufficiently large distance between substrates, the transverse electric field between the first transparent electrode 112-1 of the first substrate 111-1 and the second transparent electrode 112-2 has no or negligible effect on the orientation of the liquid crystal molecules on the second substrate 111-2 side. Similarly, the transverse electric field between the third transparent electrode 112-3 and the fourth transparent electrode 112-4 of the second substrate 111-2 has no or negligible effect on the orientation of the liquid crystal molecules on the first substrate 111-1 side.

Since the liquid crystal molecules of the liquid crystal layer 123 in the case where a potential is supplied to the first transparent electrode 122-1 to the fourth transparent electrode 122-4 are similar to the liquid crystal molecules of the liquid crystal layer 113, the explanation thereof will be omitted here.

Next, the light distribution of the light transmitted through the liquid crystal optical element 10 will be described. Although the light emitted from a light source has a polarized component (P-polarized component) in the x-axis direction and a polarized component (S-polarized component) in the y-axis direction, the light is divided into the P-polarized component and the S-polarized component for convenience. That is, the light emitted from the light source (see (1) in FIG. 7 and FIG. 8) includes a first polarized light 310 having the P-polarized component and a second polarized light 320 having the S-polarized component. In addition, a symbol indicated by an arrow and a symbol indicated by a circle with a cross in FIG. 7 and FIG. 8 represent the P-polarized light component and the S-polarized light component, respectively. Further, the light emitted from the light source is light (an incident light 180) that is incident on the liquid crystal optical element 10.

The first polarized light 310 is incident on the first substrate 111-1 and then changes from the P-polarized light component to the S-polarized light component according to the twist of the orientation of the liquid crystal molecules toward the second substrate 111-2 (see (2) to (4) in FIG. 7 and FIG. 8). More specifically, the first polarized light 310 has a polarization axis in the x-axis direction on the first substrate 111-1 side, but gradually changes its polarization axis while passing through the liquid crystal layer 113 in a thickness direction. In addition, the first polarized light 310 has a polarization axis in the y-axis direction on the second substrate 111-2 side, and is then emitted from the second substrate 111-2 side (see (5) in FIG. 7 and FIG. 8).

In this case, when the transverse electric field is generated between the first transparent electrode 112-1 and the second transparent electrode 112-2, the liquid crystal molecules on the first substrate 111-1 side are aligned in an arc convex in the x-axis direction due to the effect of the transverse electric field, and the refractive index distribution changes. Therefore, the first polarized light 310 diffuses in the x-axis direction according to the refractive index distribution of the liquid crystal molecules. In addition, when the transverse electric field is generated between the third transparent electrode 112-3 and the fourth transparent electrode 112-4, the liquid crystal molecules on the second substrate 111-2 side are aligned in an arc convex in the y-axis direction due to the effect of the transverse electric field, and the refractive index distribution changes. Therefore, the first polarized light 310 diffuses in the y-axis direction according to the change in the refractive index distribution of the liquid crystal molecules.

Therefore, in the case where no transverse electric field is generated (see FIG. 7), the polarized component of the first polarized light 310 transmitted through a first liquid crystal cell 110-1 changes from the P-polarized light component to the S-polarized light component. On the other hand, in the case where a transverse electric field is generated (see FIG. 8), the polarized component of the first polarized light 310 transmitted through the first liquid crystal cell changes from the P-polarized light component to the S-polarized light component and diffuses in the x-axis direction and the y-axis direction.

The second polarized light 320 is incident on the first substrate 111-1 and then changes from the S-polarized light component to the P-polarized light component according to the twist of the orientation of the liquid crystal molecules toward the second substrate 111-2 (see (2) to (4) in FIG. 7 and FIG. 8). More specifically, the second polarized light 320 has a polarization axis in the y-axis direction on the first substrate 111-1 side, but gradually changes its polarization axis while passing thorough the liquid crystal layer 113 in the thickness direction. In addition, the second polarized light 320 has a polarization axis in the x-axis direction on the second substrate 111-2 side, and is then emitted from the second substrate 111-2 side (see (5) in FIG. 7 and FIG. 8).

In this case, when the transverse electric field is generated between the first transparent electrode 112-1 and the second transparent electrode 112-2, the liquid crystal molecules on the first substrate 111-1 side are aligned in an arc convex in the x-axis direction due to the effect of the transverse electric field, and the refractive index distribution changes. However, the polarization axis of the second polarized light 320 is not affected by the refractive index distribution of the liquid crystal molecules and passes without being diffused because it is perpendicular to the orientation of the liquid crystal molecules on the first substrate 111-1 side. In addition, when the transverse electric field is generated between the third transparent electrode 112-3 and the fourth transparent electrode 112-4, the liquid crystal molecules on the second substrate 111-2 side are aligned in an arc convex in the y-axis direction due to the effect of the transverse electric field, and the refractive index distribution changes. However, the polarization axis of the second polarization 320 is not affected by the refractive index distribution of the liquid crystal molecules and passes without being diffused because it is perpendicular to the orientation of the liquid crystal molecules on the second substrate 111-2 side.

Therefore, not only the case where the transverse electric field is not generated (see FIG. 7), but also the case where the transverse electric field is generated (see FIG. 8), the polarized component of the second polarized light 320 transmitted through the first liquid crystal cell 110-1 changes from the S-polarized light component to the P-polarized light component, but does not diffuse.

The liquid crystal molecules of the liquid crystal layer 123 of the second liquid crystal cell 120 also has a refractive index distribution similar to the liquid crystal molecules of the liquid crystal layer 113 of the first liquid crystal cell 110-1. However, since the polarization axes of the first polarized light 310 and the second polarized light 320 are changed by being transmitted through the first liquid crystal cell 110-1, the polarization influenced by the refractive index distribution of the liquid crystal molecules of the liquid crystal layer 123 is reversed. That is, not only the case where the transverse electric field is not generated (see FIG. 7), but also the case where the transverse electric field is generated (see FIG. 8), the polarized component of the first polarized light 310 transmitted through the second liquid crystal cell 120 changes from the S-polarized light component to the P-polarized light component, but does not diffuse (see (6) to (8) in FIG. 7 and FIG. 8). On the other hand, in the case where the transverse electric field is not generated (see FIG. 7), the polarized component of the second polarized light 320 transmitted through the second liquid crystal cell 120 only changes from the P-polarized component to the S-polarized component, but in the case where the transverse electric field is generated (see FIG. 8), the polarized component of the second polarized light 320 transmitted through the second liquid crystal cell 120 changes from the P-polarized component to the S-polarized component and diffuses in the x-axis direction and the y-axis direction.

As can be seen from the above liquid crystal optical element 10, the polarized component of the light incident on the liquid crystal optical element 10 changes two times by stacking two liquid crystal cells (the first liquid crystal cell 110 and the second liquid crystal cell 120) having the same structure. As a result, the polarized component before incidence in the liquid crystal optical element 10 does not change from the polarized component after incidence in the liquid crystal optical element (see (1) and (9) in FIG. 7 and FIG. 8). That is, the polarized component of the incident light 180 in the liquid crystal optical element 10 does not change from the polarized component of an emitted light 190 in the liquid crystal optical element 10.

In addition, the liquid crystal optical element 10 is capable of supplying a potential to the transparent electrode 112, changing the refractive index distribution of the liquid crystal molecules of the liquid crystal layer 113 of the first liquid crystal cell 110, and refracting the light transmitted through the first liquid crystal cell 110. Specifically, the first liquid crystal cell 110-1 can diffuse the light of the first polarized light 310 (P-polarized component) in the x-axis direction, the y-axis direction, or both the x-axis and the y-axis directions, and the second liquid crystal cell 120 can diffuse the light of the second polarized light 320 (S-polarized component) in the x-axis direction, the y-axis direction, or both the x-axis and the y-axis directions.

[1-5. Method for Controlling Emission Direction of Emitted Light by Liquid Crystal Optical Device 10]

The liquid crystal optical element 10 can control the light emitted from a light source 210 (see FIG. 11) by a control signal transmitted to each transparent electrode. Some of the light distribution patterns of the light controlled using the liquid crystal optical element 10 will be exemplified with reference to FIG. 9 to FIG. 17 in the following description. However, the light distribution pattern of the light controlled by the liquid crystal optical element 10 is not limited to the example shown here. A control signal $V_{11}$ transmitted to the first transparent electrode 112-1, a control signal $V_{12}$ transmitted to the second transparent electrode 112-2, a control signal $V_{15}$ transmitted to the fifth transparent electrode 112-5, a control signal $V_{16}$ transmitted to the sixth transparent electrode 112-6, a control signal $V_{13}$ transmitted to the third transparent electrode 112-3, a control signal $V_{14}$ transmitted to the sixth transparent electrode 112-4, a control signal $V_{17}$ transmitted to the seventh transparent electrode 112-7, a control signal $V_{18}$ transmitted to the eighth transparent electrode 112-8 (so far belonging to the first liquid crystal cell), a control signal $V_{21}$ transmitted to the first transparent electrode 122-1, a control signal $V_{22}$ transmitted to the second transparent electrode 122-2, a control signal $V_{25}$ transmitted to the fifth transparent electrode 122-5, a control signal $V_{26}$ transmitted to the sixth transparent electrode 122-6, a control signal $V_{23}$ transmitted to the third transparent electrode 122-3, a control signal $V_{24}$ transmitted to the fourth transparent electrode 122-4, a control signal $V_{27}$ transmitted to the seventh transparent electrode 122-7, a control signal $V_{28}$ transmitted to the eighth transparent electrode 122-8 (so far belonging to the second liquid crystal cell) shown in Table 1 correspond to the control signals shown in FIG. 10, FIG. 12, FIG. 16, and FIG. 18.

TABLE 1

| | | | | |
|---|---|---|---|---|
| First liquid crystal cell 110 | First substrate 111-1 | First electrode group 117-1 | First transparent electrode 112-1 | $V_{11}$ |
| | | | Second transparent electrode 112-2 | $V_{12}$ |
| | | Second electrode group 117-2 | Fifth transparent electrode 112-5 | $V_{15}$ |
| | | | Sixth transparent electrode 112-6 | $V_{16}$ |
| | Second substrate 111-2 | Third electrode group 117-3 | Third transparent electrode 112-3 | $V_{13}$ |
| | | | Fourth transparent electrode 112-4 | $V_{14}$ |
| | | Fourth electrode group 117-4 | Seventh transparent electrode 112-7 | $V_{17}$ |
| | | | Eighth transparent electrode 112-8 | $V_{18}$ |
| Second liquid crystal cell 120 | First substrate 121-1 | First electrode group 127-1 | First transparent electrode 122-1 | $V_{21}$ |
| | | | Second transparent electrode 122-2 | $V_{22}$ |
| | | Second electrode group 127-2 | Fifth transparent electrode 122-5 | $V_{25}$ |
| | | | Sixth transparent electrode 122-6 | $V_{26}$ |
| | Second substrate 121-2 | Third electrode group 12-3 | Third transparent electrode 122-3 | $V_{23}$ |
| | | | Fourth transparent electrode 122-4 | $V_{24}$ |
| | | Fourth electrode group 127-4 | Seventh transparent electrode 122-7 | $V_{27}$ |
| | | | Eighth transparent electrode 122-8 | $V_{28}$ |

In addition, the voltage supplied to each transparent electrode is described as a first potential, a second potential whose phase is inverted from the first potential, and a third potential in the following description, for convenience. For example, the first potential and the second potential vary, the Low potential is 0 V, and the High potential is 30 V. For example, the third potential is an intermediate potential and is 15 V. In addition, the third potential is a potential between the Low potential and the High potential, and may be a fixed potential or may be a variable potential. However, the light distribution pattern of the light controlled by the liquid crystal optical element 10 is not limited to the example shown here. Further, the values of the voltages supplied to the transparent electrodes are not limited to 0 V, 12 V, 15 V, 18 V and 30 V described in FIG. 10, FIG. 13, FIG. 17, FIG. 20, and FIG. 38.

[1-5-1. Regarding Case Where Emission Direction of Emitted light is Center Direction]

Figure 9:
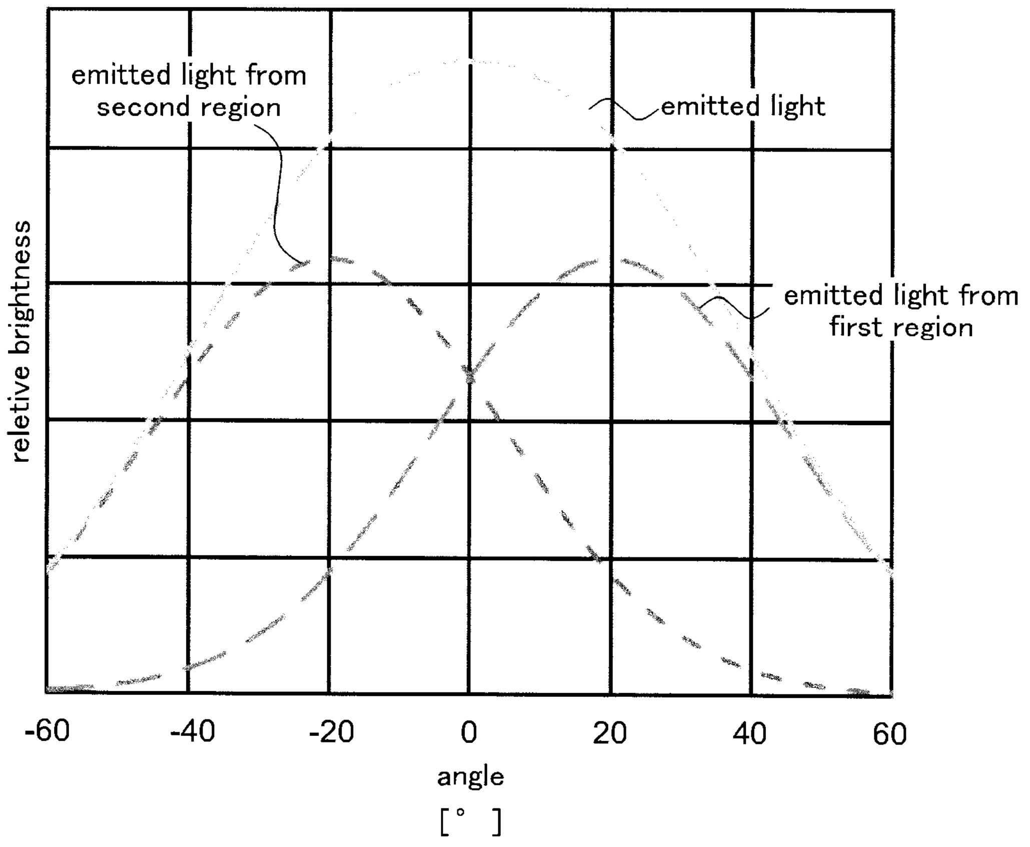
FIG. 9 is a graph showing a relationship between the relative brightness and the polar angle in emitted light from a liquid crystal optical element according to an embodiment of the present invention.
Figure 10:
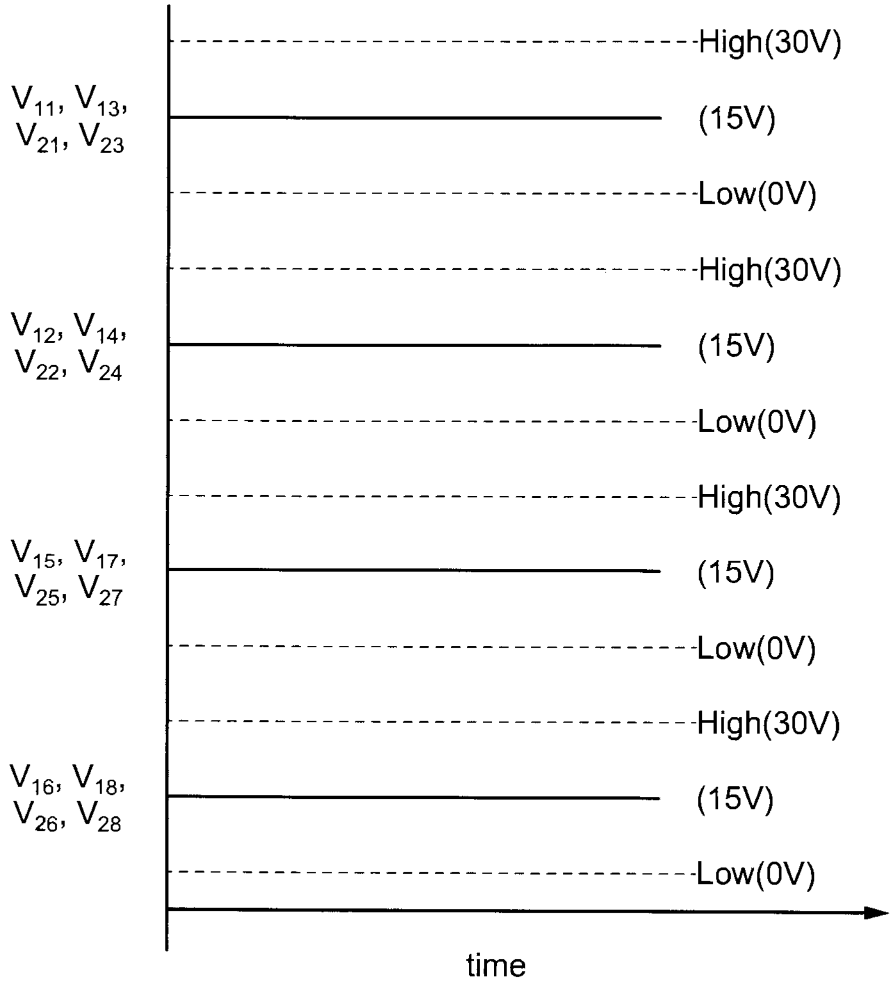
FIG. 10 is a timing chart showing voltages supplied to each transparent electrode included in a liquid crystal optical element according to an embodiment of the present invention.
Figure 11:
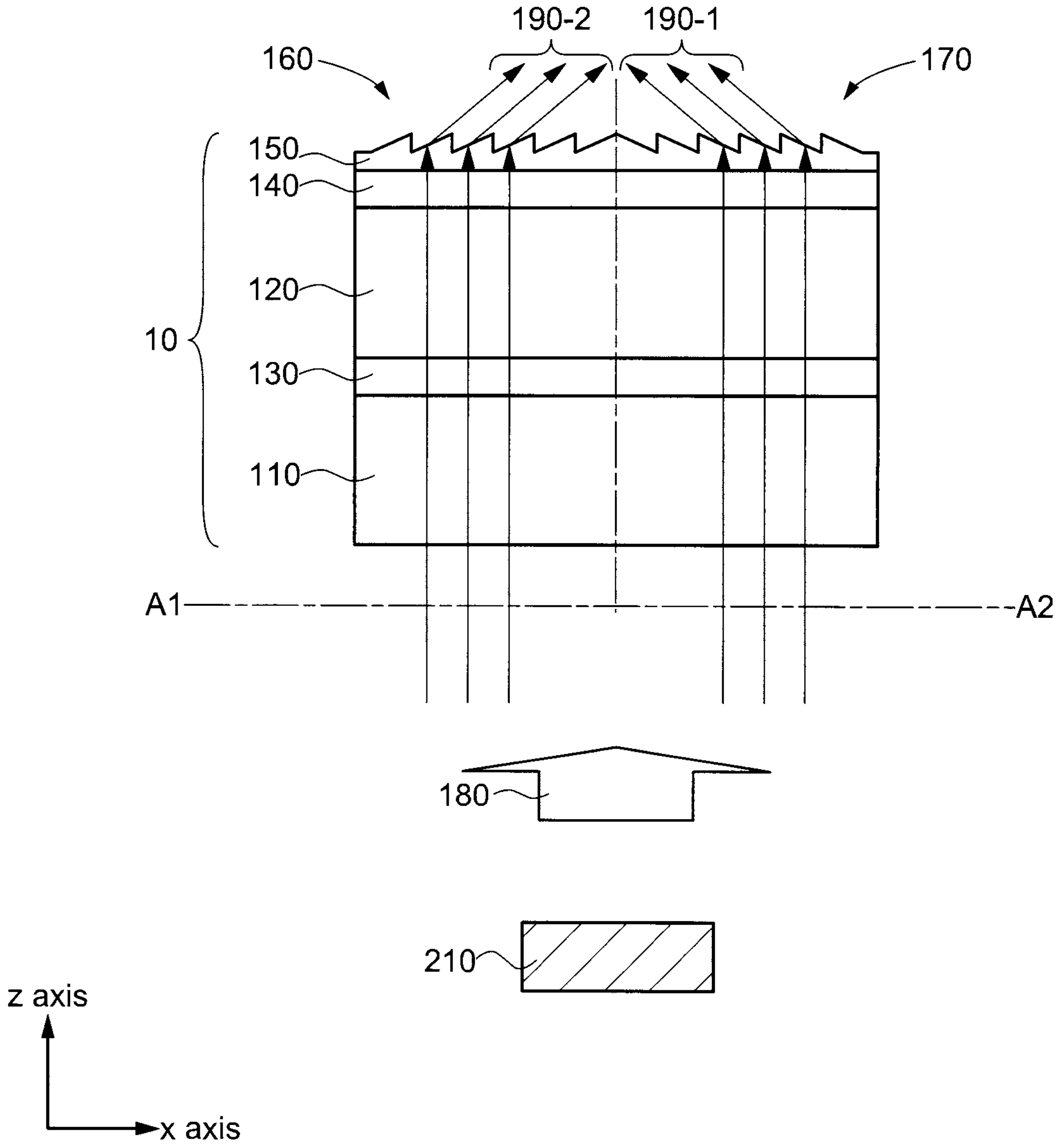
FIG. 11 is a cross-sectional view for explaining an example of a lighting device including a liquid crystal optical element according to an embodiment of the present invention and shows an example of emitted light from the liquid crystal optical element.

An example of controlling the light emitted from the light source 210 (the incident light 180 (see FIG. 11)) to be emitted toward the center with respect to the liquid crystal optical element 10 will be described with reference to FIG. 9 to FIG. 11. FIG. 9 is a graph showing a relationship between the relative brightness and the polar angle when the emission direction of the emitted light is the center direction in the liquid crystal optical element 10. FIG. 10 is a timing chart showing voltages supplied to each transparent electrode when the emission direction of the emitted light is the center direction in the liquid crystal optical element 10. FIG. 11 is a cross-sectional view for explaining an example of a lighting device including the liquid crystal optical element 10 and an example of the emitted light from the liquid crystal optical element 10.

As shown in FIG. 10, the third potential is supplied to the first transparent electrode 112-1 and the second transparent electrode 112-2 arranged in the second region 170 in the first liquid crystal cell 110. The third potential is supplied to the third transparent electrode 112-3 and the fourth transparent electrode 112-4 arranged in the second region 170 in the first liquid crystal cell 110. The third potential is supplied to the fifth transparent electrode 112-5 and the sixth transparent electrode 112-6 arranged in the first region 160 in the first liquid crystal cell 110. The third potential is supplied to the seventh transparent electrode 112-7 and the eighth transparent electrode 112-8 arranged in the first region 160 in the first liquid crystal cell 110.

Therefore, there is no potential difference between the electrodes. In addition, since no electric field is generated in the liquid crystal layer 113 (see FIG. 2 and FIG. 3) in the first liquid crystal cell 110 and in the liquid crystal layer 123 (see FIG. 2 and FIG. 3) in the second liquid crystal cell 120, the orientation state of the liquid crystal molecules of the liquid crystal layer 113 and the liquid crystal layer 123 does not change from the initial orientation. Therefore, the light (the incident light 180 (see FIG. 11)) emitted from the light source 210 (see FIG. 11) is incident on the first region 160 (see FIG. 11) and the second region 170 (see FIG. 11), and in the light transmitted through the first liquid crystal cell 110, the first transparent adhesive layer 130, the second liquid crystal cell 120, and the second transparent adhesive layer 140, the polarized component passing through the liquid crystal layer 113 and the liquid crystal layer 123 passes without being diffused.

As a result, as shown in FIG. 11, the incident light 180 incident on the first region 160 is incident on the prism in the first region 160 of the optical element 150 and becomes refracted light (emitted light 190-2). Similar to the light incident on the prism of the first region 160 of the optical element 150, the incident light 180 incident on the second region 170 is incident on the prism in the second region 170 of the optical element 150 and becomes light refracted from the second region 170 to the first region 160 (an emitted light 190-1).

That is, the incident light 180 incident on the first region 160 transmits through the liquid crystal layer 113 and the liquid crystal layer 123 and is incident on the prism in the first region 160 of the optical element 150. For this reason, the emitted light from the first region 160 becomes refracted light as the "emitted light from the first region" indicated by a long dashed line in FIG. 9. For example, the refracted light is light refracted from the left direction to the right direction (the emitted light 190-2 (see FIG. 11)). In addition, the incident light 180 incident on the second region 170 transmits through the liquid crystal layer 113 and the liquid crystal layer 123 and is incident on the prism on the second region 170 side of the optical element 150. Therefore, the emitted light from the second region 170 becomes refracted light (the emitted light 190-1) as the "emitted light from the second region" indicated by a short dashed line in FIG. 9. For example, the refracted light is light refracted from the right direction to the left direction (the emitted light 190-1 (see FIG. 11)). As a result, the liquid crystal optical element 10 can emit light obtained by combining the "emitted light from the second region" and the "emitted light from the first region", that is, emitted light indicated by a solid line in FIG. 9, from the center or the approximate center of the liquid crystal optical element 10.

[1-5-2. Regarding Case Where Emission Direction of Emitted Light is Rightward]

Figure 12:
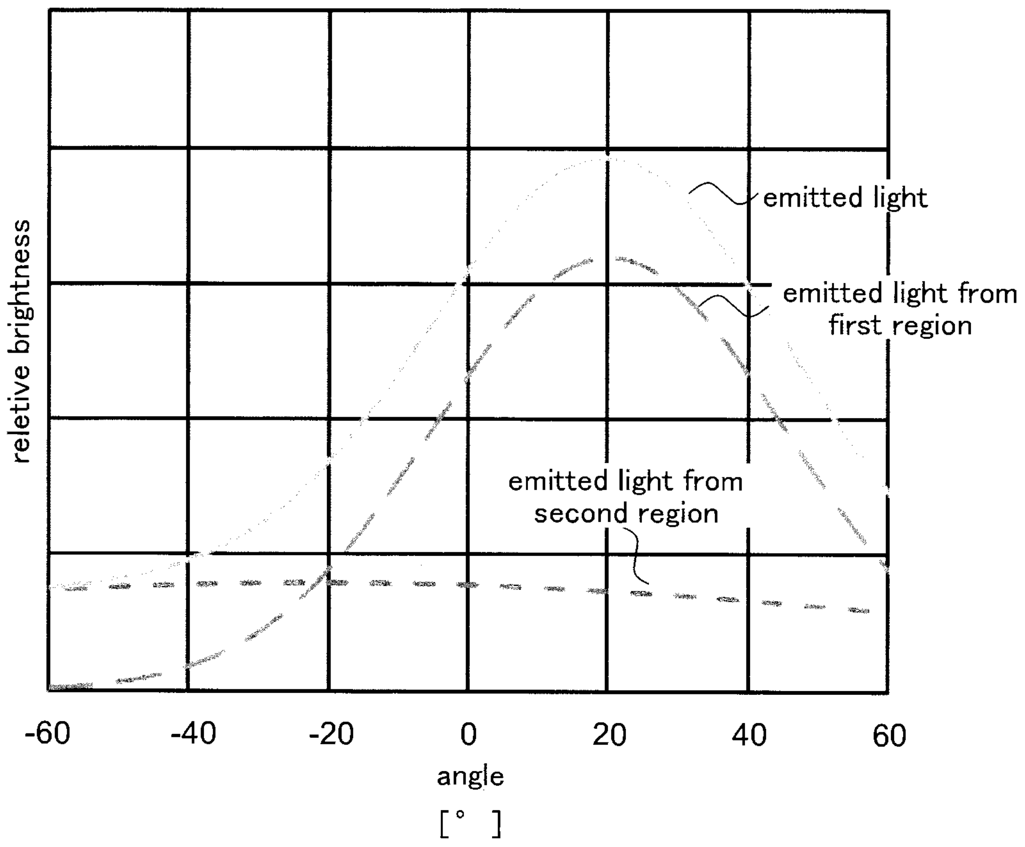
FIG. 12 is a graph showing a relationship between the relative brightness and the polar angle in emitted light from a liquid crystal optical element according to an embodiment of the present invention.
Figure 13:
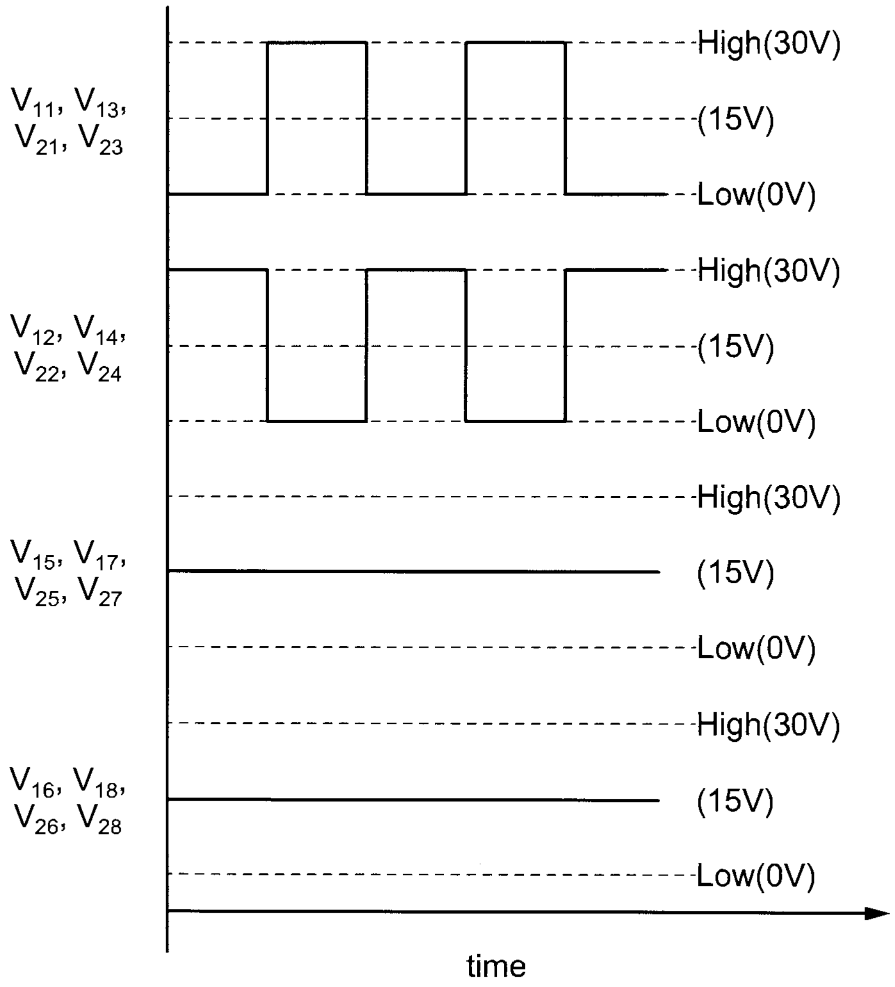
FIG. 13 is a timing chart showing voltages supplied to each transparent electrode included in a liquid crystal optical element according to an embodiment of the present invention.
Figure 14:
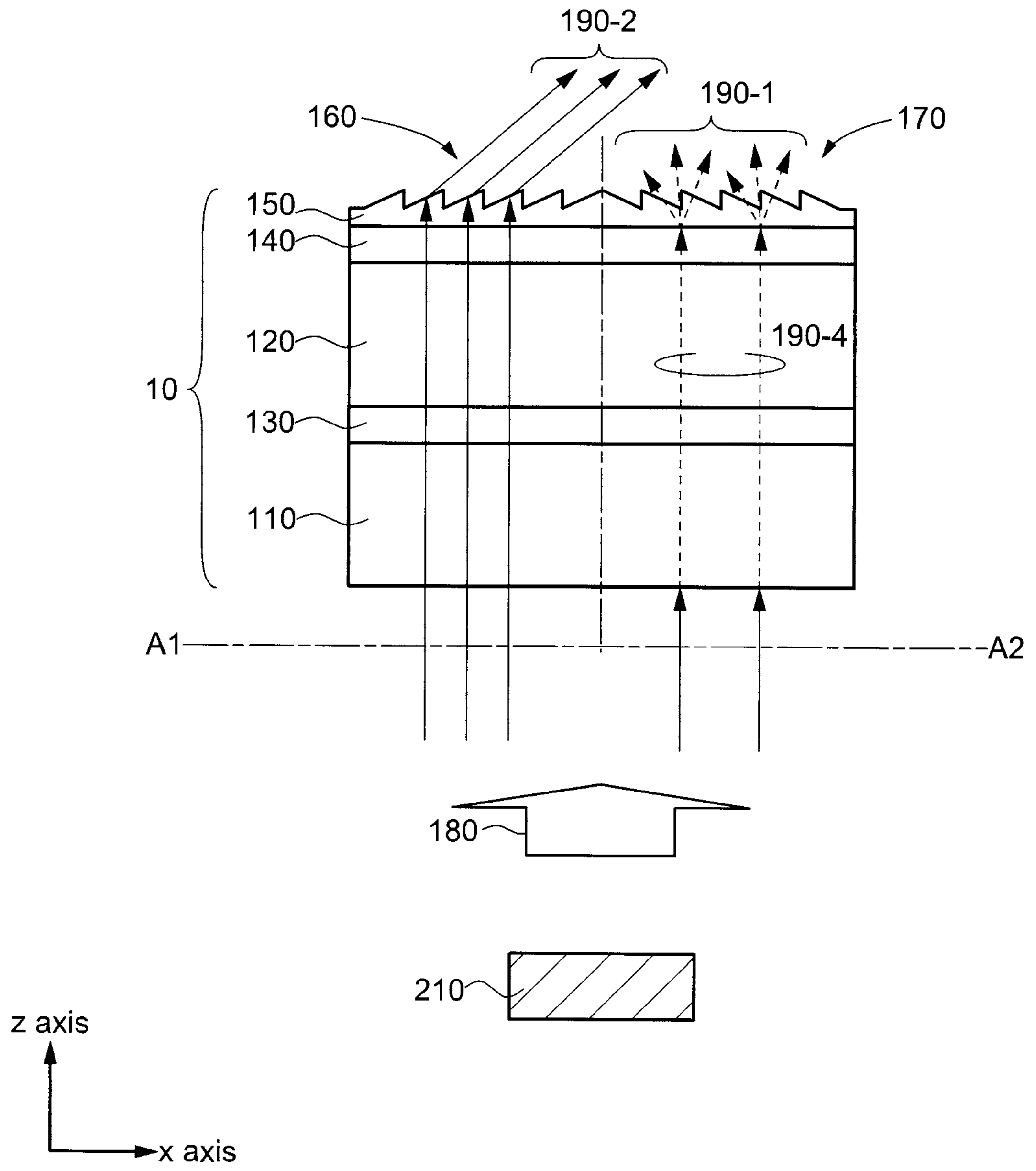
FIG. 14 is a cross-sectional view for explaining an example of a lighting device including a liquid crystal optical element according to an embodiment of the present invention and shows an example of emitted light from the liquid crystal optical element.
Figure 15:
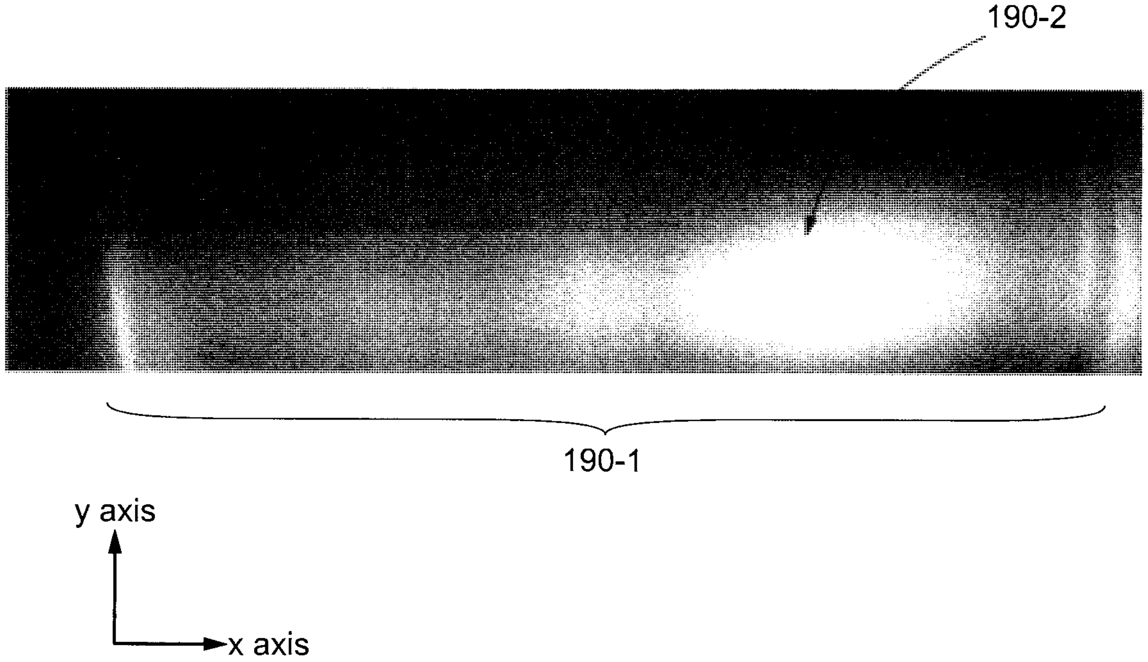
FIG. 15 is a photograph of a light distribution pattern of light obtained by supplying a voltage shown in FIG. 13 to each transparent electrode in a liquid crystal optical element according to an embodiment of the present invention.

An example of controlling the light emitted from the light source 210 (the incident light 180 (see FIG. 14)) to be emitted in the right direction with respect to the liquid crystal optical element 10 will be described with reference to FIG. 12 to FIG. 15. FIG. 12 is a graph showing a relationship between the relative brightness and the polar angle when the emission direction of the emitted light is rightward in the liquid crystal optical element 10. FIG. 13 is a timing chart showing voltages supplied to the transparent electrodes of the liquid crystal optical element 10 when the emission direction of the emitted light is rightward. FIG. 14 is a cross-sectional view for explaining an example of a lighting device including the liquid crystal optical element 10 and an example of emitted light from the liquid crystal optical element 10. FIG. 15 is a photograph of a light distribution pattern of light obtained by supplying a voltage shown in FIG. 13 to each transparent electrode in the liquid crystal optical element 10.

As shown in FIG. 13, the third potential is supplied to the fifth transparent electrode 112-5 and the sixth transparent electrode 112-6 arranged in the first region 160, and the seventh transparent electrode 112-7 and the eighth transparent electrode 112-8 in the first liquid crystal cell 110. The first potential or the second potential is supplied to the first transparent electrode 112-1 and the second transparent electrode 112-2 arranged in the second region 170 in the first liquid crystal cell 110, and the third transparent electrode 112-3 and the fourth transparent electrode 112-4 arranged in the second region 170 in the first liquid crystal cell 110.

There is no potential difference between the fifth transparent electrode 112-5 and the sixth transparent electrode 112-6 arranged in the first region 160, and between the seventh transparent electrode 112-7 and the eighth transparent electrode 112-8 arranged in the first region 160. Since no electric field is generated in the liquid crystal layer 113 (see FIG. 2 and FIG. 3) in the first liquid crystal cell 110 and the liquid crystal layer 123 (see FIG. 2 and FIG. 3) in the second liquid crystal cell 120 in the first region 160, the orientation state of the liquid crystal molecules of the liquid crystal layer 113 in the first liquid crystal cell 110 and the liquid crystal layer 123 in the second liquid crystal cell 120 does not change from the initial orientation. Therefore, the light (the incident light 180 (see FIG. 14)) emitted from the light source 210 (see FIG. 14) is incident on the first region 160 (see FIG. 14), and the polarized component passing through the liquid crystal layer 113 and the liquid crystal layer 123 among the light passing through the first liquid crystal cell 110, the first transparent adhesive layer 130, the second liquid crystal cell 120 and the second transparent adhesive layer 140 passes through without being diffused in the first region 160.

On the other hand, as shown in FIG. 13, in the first liquid crystal cell 110, the first potential or the second potential is supplied to the first transparent electrode 112-1 and the second transparent electrode 112-2 arranged in the second region 170, and the third transparent electrode 112-3 and the fourth transparent electrode 112-4. The first potential supplied to the first transparent electrode 112-1 and the third transparent electrode 112-3 and the second potential supplied to the second transparent electrode 112-2 and the fourth transparent electrode 112-4 are reversed in phase. In addition, the second potential supplied to the first transparent electrode 112-1 and the third transparent electrode 112-3 and the first potential supplied to the second transparent electrode 112-2 and the fourth transparent electrode 112-4 are reversed in phase.

Therefore, a potential difference (for example, +30 V or −30 V) is generated between the first transparent electrode 112-1 and the second transparent electrode 112-2 arranged in the second region 170 and between the third transparent electrode 112-3 and the fourth transparent electrode 112-4 arranged in the second region 170. Therefore, the orientation states of the liquid crystal molecules of the liquid crystal layer 113 in the first liquid crystal cell 110 in the second region 170 and the liquid crystal layer 123 in the second liquid crystal cell 120 in the second region 170 change from the initial orientation, and the light (the incident light 180 (see FIG. 14)) emitted from the light source 210 (see FIG. 14) passes through the first liquid crystal cell 110, the first transparent adhesive layer 130, the second liquid crystal cell 120 and the second transparent adhesive layer 140. As a result, among the light 190-4 passing through the first liquid crystal cell 110, the first transparent adhesive layer 130, the second liquid crystal cell 120, and the second transparent adhesive layer 140, the polarized components passing through the liquid crystal layer 113 and the liquid crystal layer 123 diffuse.

As a result, as shown in FIG. 14, the incident light 180 incident on the first region 160 is incident on the prism in the first region 160 of the optical element 150 and becomes refracted light (the emitted light 190-2). The incident light 180 incident on the second region 170 is diffused in the liquid crystal layer 113 and the liquid crystal layer 123, incident on the prism on the second region 170 side of the optical element 150, and becomes diffused light (the emitted light 190-1).

That is, the incident light 180 incident on the first region 160 is transmitted through the liquid crystal layer 113 and the liquid crystal layer 123, incident on the prism in the first region 160 of the optical element 150, and becomes refracted light (the emitted light 190-2). For example, the liquid crystal optical element 10 emits light having a polar angle of 20 degrees, such as the "emitted light from the first region" indicated by a long dashed line in FIG. 12. For example, the refracted light (the emitted light 190-2) is light refracted from the left direction to the right direction (the emitted light 190-2 (see FIG. 14)). In addition, the incident light 180 incident on the second region 170 is sufficiently diffused in the liquid crystal layer 113 and the liquid crystal layer 123, and in that state, it is incident on the prism on the second region 170 side of the optical element 150. For this reason, the emitted light from the second region 170 becomes light diffused widely from the left direction to the right direction (the emitted light 190-1 (see FIG. 14)), such as the "emitted light from the second region" indicated by a short dashed line in FIG. 12. As a result, the liquid crystal optical element 10 can emit light obtained by combining the "emitted light from the first region" and the "emitted light from the second region", that is, emitted light indicated by a solid line in FIG. 12, from the right side or substantially the right side of the liquid crystal optical element 10. For example, as shown in FIG. 15, using the liquid crystal optical element 10 makes it possible to form a light distribution pattern in which the light diffusing in the transverse direction (mainly the emitted light 190-2) and light concentrated on the right or almost on the right (mainly an emitted light 190-1) are combined.

[1-5-3. Regarding Case Where Emission direction of Emitted light is Leftward]

Figure 16:
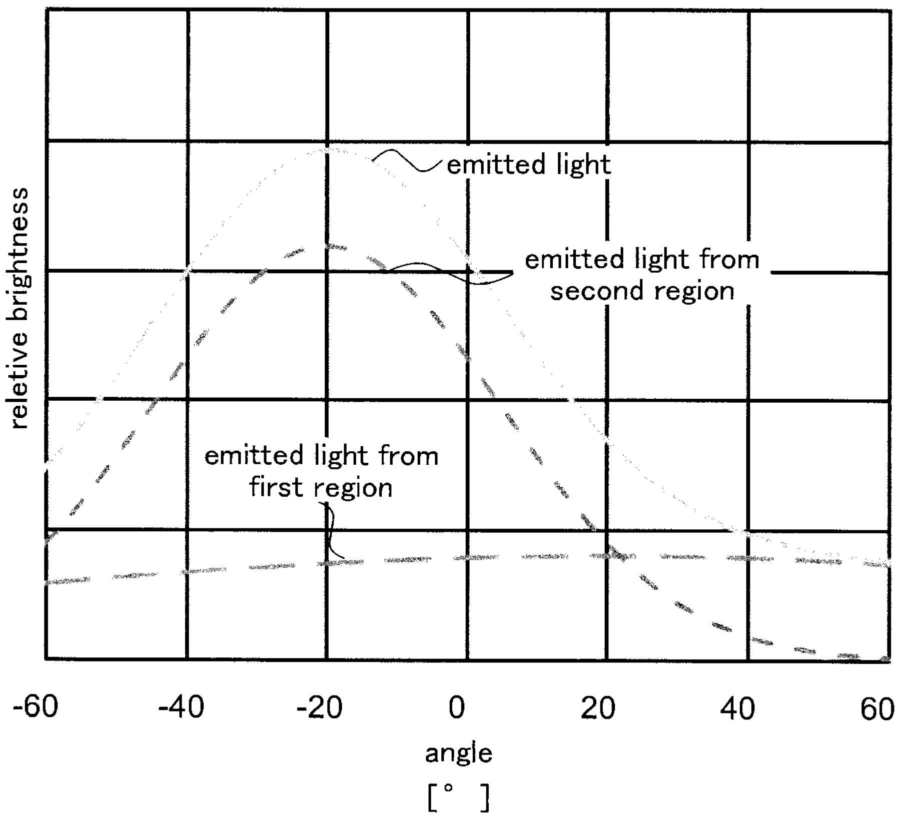
FIG. 16 is a graph showing a relationship between the relative brightness and the polar angle in emitted light from a liquid crystal optical element according to an embodiment of the present invention.
Figure 17:
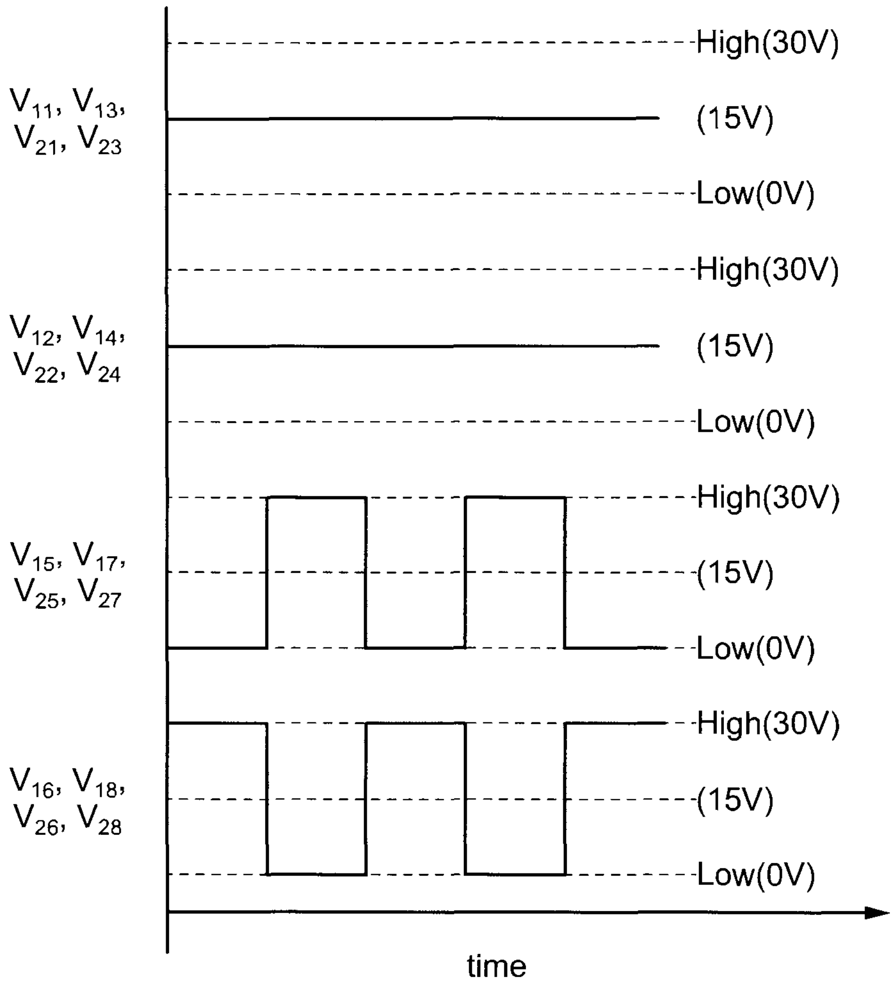
FIG. 17 is a timing chart showing voltages supplied to each transparent electrode included in a liquid crystal optical element according to an embodiment of the present invention.
Figure 18:
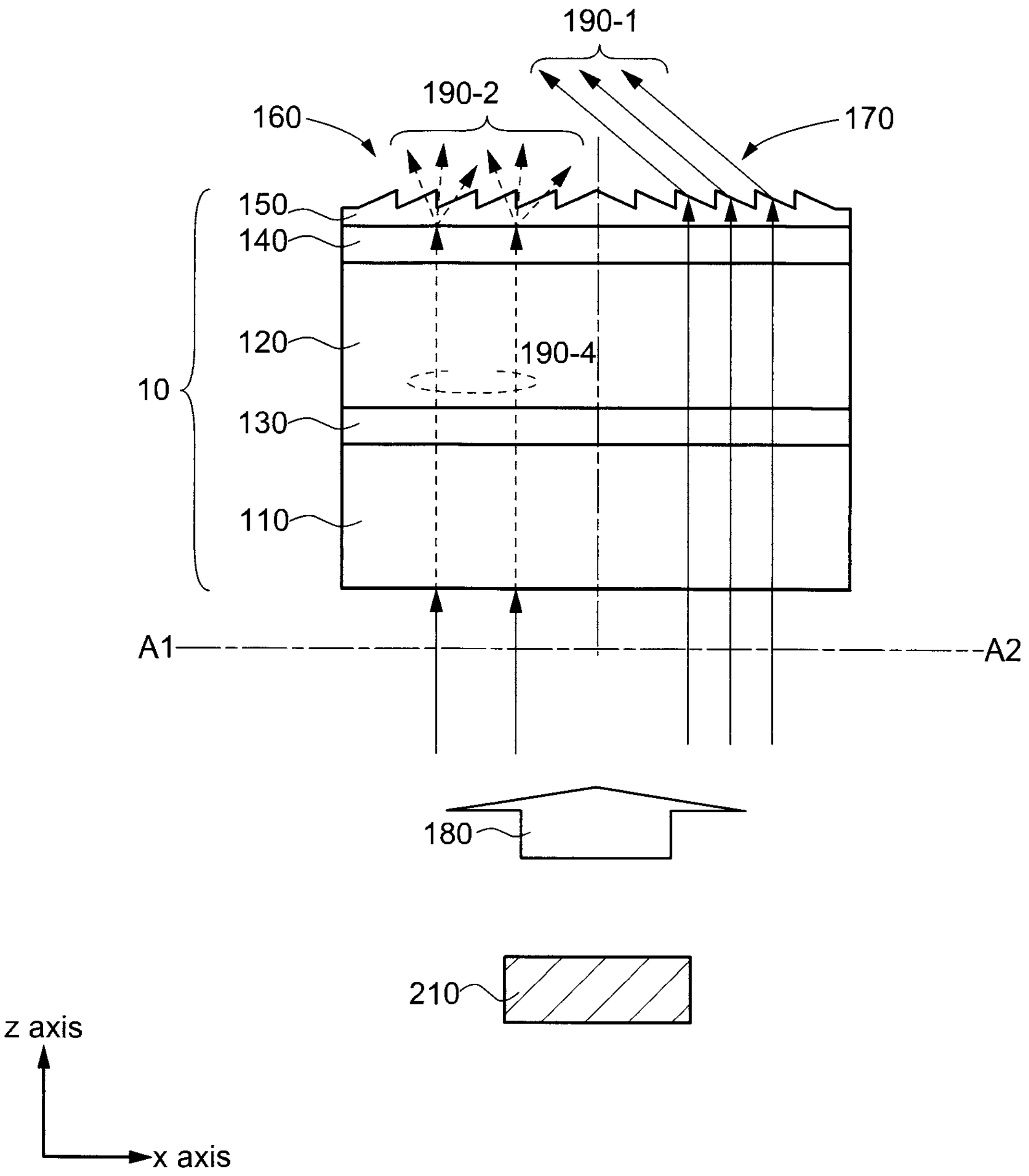
FIG. 18 is a cross-sectional view for explaining an example of a lighting device including a liquid crystal optical element according to an embodiment of the present invention and shows an example of emitted light from the liquid crystal optical element.

An example of controlling the light emitted from the light source 210 (the incident light 180 (see FIG. 18)) to be emitted in the left direction with respect to the liquid crystal optical element 10 will be described with reference to FIG. 16 to FIG. 18. FIG. 16 is a graph showing a relationship between the relative brightness and the polar angle when the emission direction of the emitted light is leftward in the liquid crystal optical element 10. FIG. 17 is a timing chart showing voltages supplied to the transparent electrodes of the liquid crystal optical element 10 when the emission direction of the emitted light is leftward. FIG. 18 is a cross-sectional view for explaining an example of a lighting device including the liquid crystal optical element 10 and an example of the emitted light from the liquid crystal optical element 10.

As shown in FIG. 17, in the first liquid crystal cell 110, the first potential or the second potential is supplied to the fifth transparent electrode 112-5 and the sixth transparent electrode 112-6 arranged in the first region 160, and the seventh transparent electrode 112-7 and the eighth transparent electrode 112-8 arranged in the first region 160. The first potential supplied to the fifth transparent electrode 112-5 and the seventh transparent electrode 112-7 and the second potential supplied to the sixth transparent electrode 112-6 and the eighth transparent electrode 112-8 are reversed in phase. In addition, the second potential supplied to the fifth transparent electrode 112-5 and the seventh transparent electrode 112-7 and the first potential supplied to the sixth transparent electrode 112-6 and the eighth transparent electrode 112-8 are reversed in phase.

Therefore, a potential difference (for example, +30V or −30V) is generated between the fifth transparent electrode 112-5 and the sixth transparent electrode 112-6 arranged in the first region 160 and between the seventh transparent electrode 112-7 and the eighth transparent electrode 112-8 arranged in the first region 160. Therefore the orientation states of the liquid crystal molecules of the liquid crystal layer 113 in the first liquid crystal cell 110 in the first region 160 and of the liquid crystal layer 123 in the second liquid crystal cell 120 in the first region 160 change from the initial orientation, and the light (the incident light 180 (see FIG. 18)) emitted from the light source 210 (see FIG. 18) passes through the first liquid crystal cell 110, the first transparent adhesive layer 130, the second liquid crystal cell 120, and the second transparent adhesive layer 140. As a result, among the light 190-4 passing through the first liquid crystal cell 110, the first transparent adhesive layer 130, the second liquid crystal cell 120, and the second transparent adhesive layer 140, the polarized components passing through the liquid crystal layer 113 and the liquid crystal layer 123 diffuse.

On the other hand, there is no potential difference between the first transparent electrode 112-1 and the second transparent electrode 112-2 arranged in the second region 170, and between the third transparent electrode 112-3 and the fourth transparent electrode 112-4. since no electric field is generated in the liquid crystal layer 113 (see FIG. 2 and FIG. 3) in the first liquid crystal cell 110 and the liquid crystal layer 123 (see FIG. 2 and FIG. 3) in the second liquid crystal cell 120 in the second region 170, the orientation state of the liquid crystal molecules of the liquid crystal layer 113 in the first liquid crystal cell 110 and the liquid crystal layer 123 in the second liquid crystal cell 120 do not change from the initial orientation in the second region 170. Therefore, the light (the incident light 180 (see FIG. 18)) emitted from the light source 210 (see FIG. 18) is incident on the second region 170 (see FIG. 18), and the polarized component passing through the liquid crystal layer 113 and the liquid crystal layer 123 among the light passing through the first liquid crystal cell 110, the first transparent adhesive layer 130, the second liquid crystal cell 120 and the second transparent adhesive layer 140 passes through without being diffused in the second region 170.

As a result, as shown in FIG. 18, the incident light 180 incident on the first region 160 is diffused in the liquid crystal layer 113 and the liquid crystal layer 123, is incident on the prism in the first region 160 of the optical element 150, and becomes diffused light (the emitted light 190-2). The incident light 180 incident on the second region 170 is incident on the prism of the optical element 150 and becomes refracted light (the emitted light 190-1).

That is, the incident light 180 incident on the first region 160 is sufficiently diffused in the liquid crystal layer 113 and the liquid crystal layer 123, and in that state, it is incident on the prism on the first region 160 side of the optical element 150. For this reason, the emitted light from the first region 160 becomes the light diffused widely from the left direction to the right direction (the emitted light 190-2 (see FIG. 18)), such as the "emitted light from the first region" indicated by a long broken line in FIG. 16. The incident light 180 incident on the second region 170 is transmitted through the liquid crystal layer 113 and the liquid crystal layer 123, incident on the prism in the second region 170 of the optical element 150, and becomes refracted light. For example, the liquid crystal optical element 10 emits light having a polar angle of −20 degrees as a peak, such as the "emitted light from the second region" indicated by a short dashed line in FIG. 16. For example, the light refracted from the second region 170 to the first region 160 is the light refracted from the right direction to the left direction (the emitted light 190-1 (see FIG. 18)).

As a result, the liquid crystal optical element 10 can emit light obtained by combining the "emitted light from the first region" and the "emitted light from the second region", that is, the emitted light indicated by a solid line in FIG. 16, from the left side or substantially the left side of the liquid crystal optical element 10. For example, although not shown, using the liquid crystal optical element 10 makes it possible to form a light distribution pattern in which the light diffusing in the transverse direction (mainly the emitted light 190-1) and the light concentrated on the left or almost on the left (mainly emitted light 190-2) are combined.

[1-5-4. Regarding Case Where Exit Direction of Emitted light is Slightly Left of Center]

Figure 19:
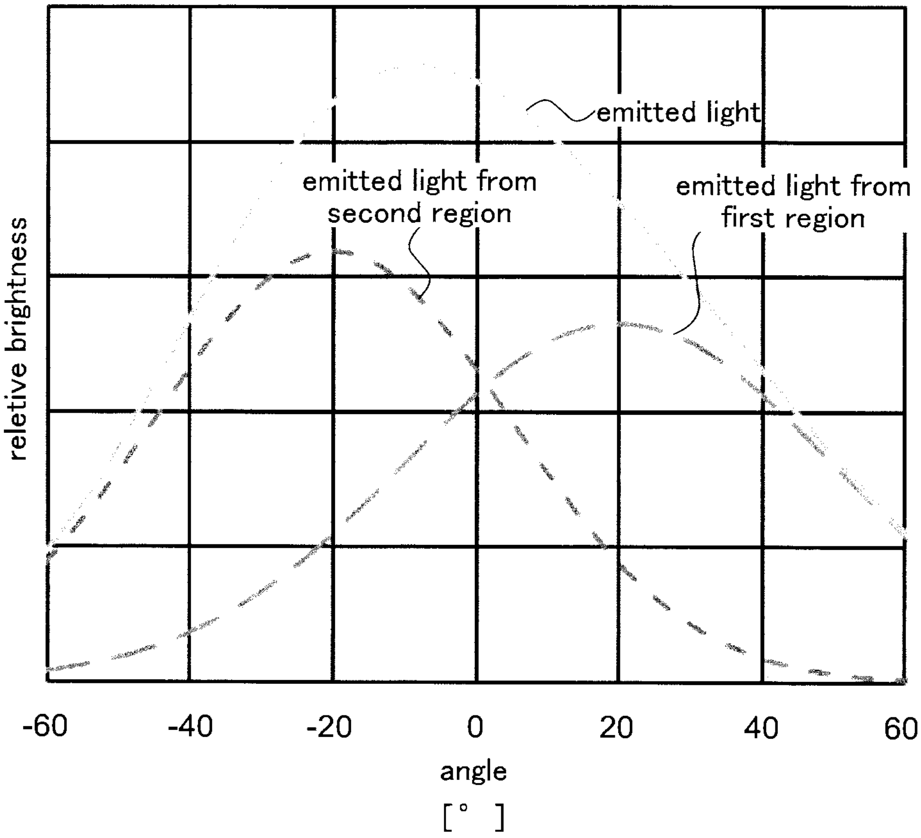
FIG. 19 is a graph showing a relationship between the relative brightness and the polar angle in emitted light from a liquid crystal optical element according to an embodiment of the present invention.
Figure 20:
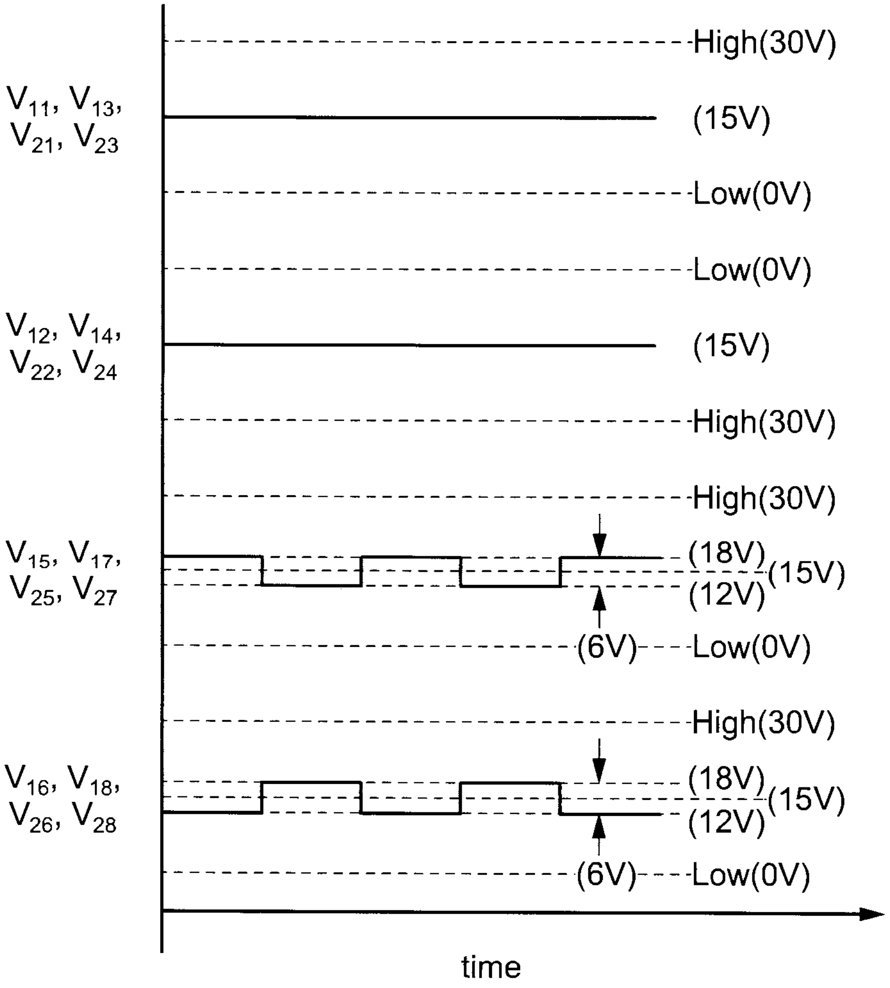
FIG. 20 is a timing chart showing voltages supplied to each transparent electrode included in a liquid crystal optical element according to an embodiment of the present invention.

An example of controlling the light emitted from the light source 210 (the incident light 180 (see FIG. 20)) to be emitted slightly left of the center with respect to the liquid crystal optical element 10 is described with reference to FIG. 19 and FIG. 20. FIG. 19 is a graph showing a relationship between the relative brightness and the polar angle of the liquid crystal optical element 10 when the emission direction of the emitted light is slightly left of the center. FIG. 20 is a timing chart showing voltages supplied to the transparent electrodes of the liquid crystal optical element 10 when the emission direction of the emitted light is slightly left of the center.

The graph shown in FIG. 19 is different from the graph shown in FIG. 16 in that the emission direction of the emitted light is slightly left of the center. The Low potential of the first potential and the second potential (variable potential) in the timing chart shown in FIG. 20 is 12 V, and the High potential in the timing chart shown in FIG. 20 is 18

V, that is, the potential difference in the timing chart shown in FIG. 20 is 6 V compared with the timing chart shown in FIG. 17. The phase of the second potential is different in that it is inverted with respect to the phase of the first potential. Since the other points are the same as the figures shown in FIG. 19 and FIG. 20, the differences from FIG. 19 and FIG. 20 will be mainly described here.

By comparing the graphs shown in FIG. 19 and FIG. 16, it can be understood that the relative intensity of light with respect to the polar angle can be controlled by changing the potential supplied to each transparent electrode in the liquid crystal optical element 10. That is, the emission direction and the degree of diffusion of light can be changed by changing the potential supplied to each transparent electrode, in the liquid crystal optical element 10.

For example, when supplying the potential shown in FIG. 20 to the liquid crystal optical element 10, the incident light 180 incident on the first region 160 is transmitted in the liquid crystal layer 113 and the liquid crystal layer 123 while being affected by the potential supplied to the transparent electrode of the second region 170, and in that state, it is incident on the prism on the first region 160 side of the optical element 150. For this reason, the emitted light from the first region 160 has a low relative intensity peak at a polar angle of 20 degrees, such as the "emitted light from the first region" indicated by a long dashed line in FIG. 19, and becomes light diffused in a wide range from the left direction to the right direction. In addition, since the potential supplied to the transparent electrodes in the second region 170 is small, the incident light 180 incident on the second region 170 has a small diffusion degree in the liquid crystal layer 113 and the liquid crystal layer 123, which is smaller than the diffusion degree shown in FIG. 16, and in that state, it is incident on the prism on the first region 160 side of the optical element 150. Therefore, the emitted light from the second region 170 has a higher relative intensity peak than the emitted light from the "first region at the polar angle of −20 degrees", such as the "emitted light from the second region" indicated by a short dashed line in FIG. 19, and becomes light diffused in a wide range from the left direction to the right direction.

As a result, the liquid crystal optical element 10 can emit light obtained by combining the "emitted light from the first region" and the "emitted light from the second region", that is, the emitted light indicated by a solid line in FIG. 19, slightly left of the center of the liquid crystal optical element 10.

[1-6. First Modification of Transparent Electrode]

Figure 21:
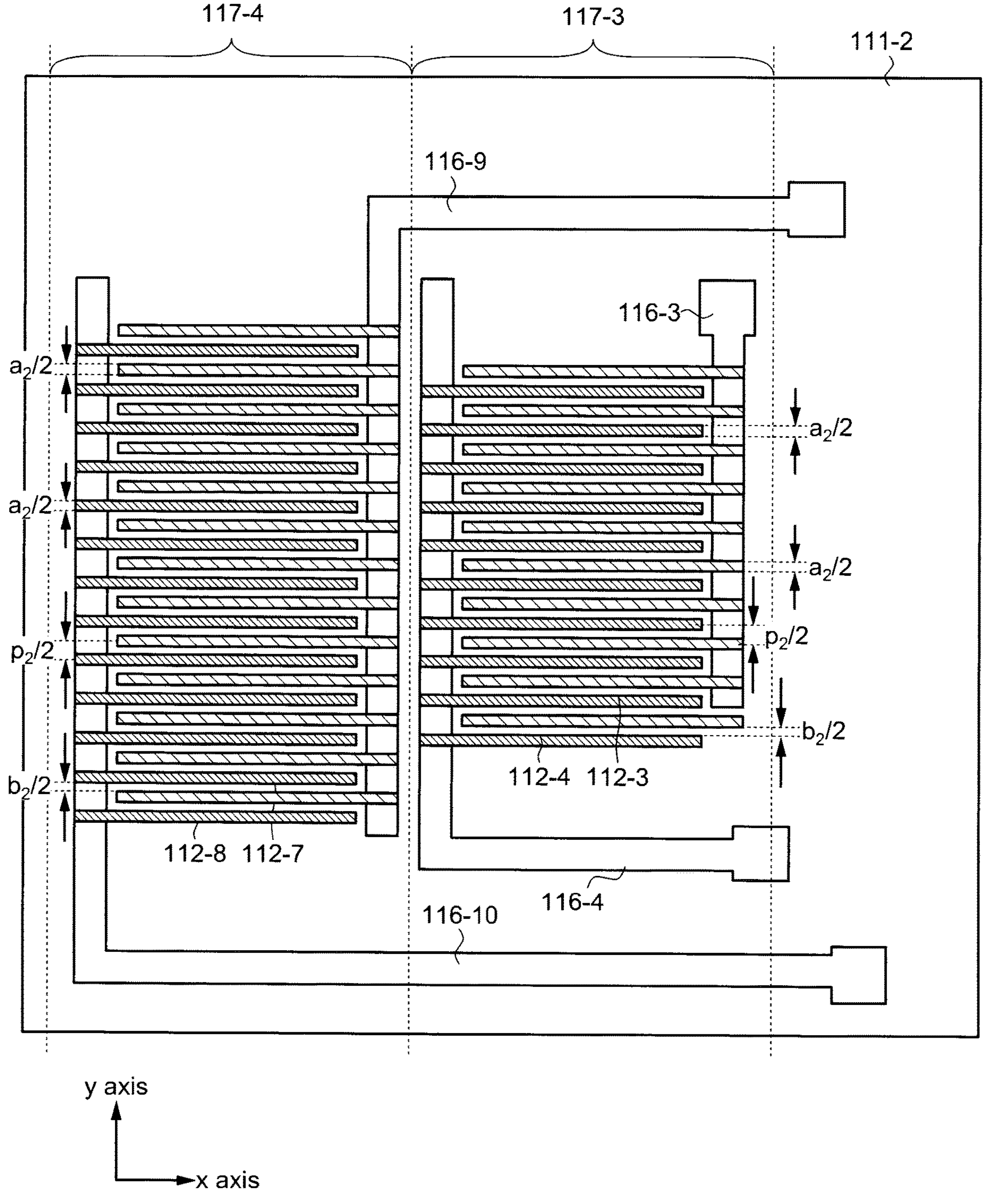
FIG. 21 is a plan view showing an arrangement of a third transparent electrode, a fourth transparent electrode, a seventh transparent electrode, and an eighth transparent electrode on a second substrate in a liquid crystal optical element according to an embodiment of the present invention.

FIG. 21 is a plan view showing an arrangement of the third transparent electrode 112-3, the fourth transparent electrode 112-4, the seventh transparent electrode 112-7, and the eighth transparent electrode 112-8 on the second substrate 111-2 in the liquid crystal optical element 10. Each transparent electrode shown in FIG. 21 is different from each transparent electrode shown in FIG. 6 in the line-width of the electrode, the inter-electrode distance (electrode interval), and the pitch between the electrodes. Since the other points are the same as those shown in FIG. 6, the differences from FIG. 6 will be mainly described here. The configuration on the first substrate side in the first modification is the same as that of the first embodiment.

As shown in FIG. 21, the width of the third transparent electrode 112-3 and the width of the fourth transparent electrode 112-4 are a second width $a_2/2$ in the y-axis direction. The inter-electrode distance (electrode interval) between the third transparent electrode 112-3 and the fourth transparent electrode 112-4 in the x-axis direction is a second inter-electrode distance $b_2/2$. A pitch between the third transparent electrode 112-3 and the fourth transparent electrode 112-4 is a second pitch $p_2/2$, and the second pitch $p_2$ satisfies $p_2/2=a_2/2+b_2/2$. In addition, the width of the seventh transparent electrode 112-7, the width of the eighth transparent electrode 112-8, the inter-electrode distance (electrode interval) between the seventh transparent electrode 112-7 and the eighth transparent electrode 112-8 in the y-axis direction, and the pitch between the seventh transparent electrode 112-7 and the eighth transparent electrode 112-8 are the same as the width of the third transparent electrode 112-3, the width of the fourth transparent electrode 112-4, the inter-electrode distance (electrode interval) between the third transparent electrode 112-3 and the fourth transparent electrode 112-4 in the y-axis direction, and the pitch between the third transparent electrode 112-3 and the fourth transparent electrode 112-4.

It can be said that the third transparent electrode 112-3 and the fourth transparent electrode 112-4 are formed on the second substrate 111-2 in a comb-tooth pattern having the second pitch $p_2/2$, and that the seventh transparent electrode 112-7 and the eighth transparent electrode 112-8 are formed on the second substrate 111-2 in a comb-tooth pattern having the second pitch $p_2/2$.

In the first modification, the width, the inter-electrode distance, and the pitch between the electrodes of the third transparent electrode 112-3 and the fourth transparent electrode 112-4 on the second substrate 111-2 are narrower than the width, the inter-electrode distance, and the pitch between the electrodes of the first transparent electrode 112-1 and the second transparent electrode 112-2 on the first substrate 111-1. In addition, the width, the inter-electrode distance, and the pitch between the electrodes of the seventh transparent electrode 112-7 and the eighth transparent electrode 112-8 on the second substrate 111-2 are narrower than the width, the inter-electrode distance, and the pitch between the electrodes of the fifth transparent electrode 112-5 and the sixth transparent electrode 112-6 on the first substrate 111-1.

Narrowing the width, the inter-electrode distance, and the pitch between the electrodes makes it possible to control the orientation of the liquid crystal within a narrow range when a potential is supplied to the transparent electrode. That is, light can be more diffused in the x-axis direction or the y-axis direction. The first liquid crystal cell 110 and the second liquid crystal cell 120 having the same transparent electrode arrangement can be stacked in the present embodiment, to further diffuse the light in the x-axis direction and the y-axis direction.

[1-7. Second Modification of Transparent Electrode]

Figure 22:
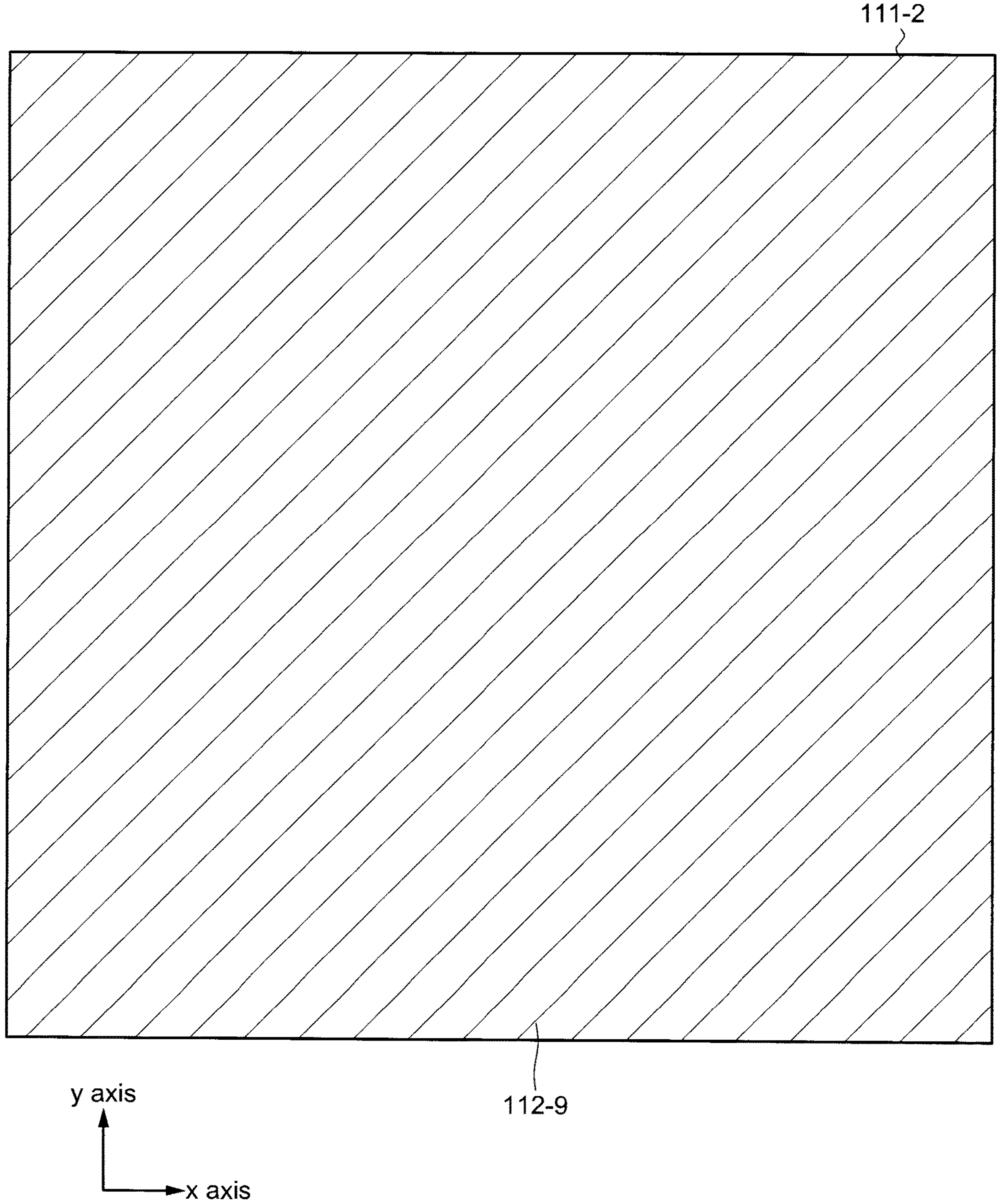
FIG. 22 is a plan view showing an arrangement of a ninth transparent electrode on a second substrate in a liquid crystal optical element according to an embodiment of the present invention.

FIG. 22 is a plan view showing an arrangement of a ninth transparent electrode 112-9 on the second substrate 111-2 in the liquid crystal optical element 10. The ninth transparent electrode 112-9 shown in FIG. 22 is formed over the second substrate 111-2 as compared with each transparent electrode shown in FIG. 6 and FIG. 21. Since other points are the same as the figures shown in FIG. 6 and FIG. 21, differences from FIG. 6 and FIG. 21 will be mainly described here.

In the case where the ninth transparent electrode 112-9 is used, a potential can be supplied to the ninth transparent electrode 112-9 using the timing chart shown in FIG. 10 or FIG. 17. For example, the ninth transparent electrode 112-9 is supplied with 15 V in the same manner as the control signal $V_{13}$ transmitted to the third transparent electrode 112-3 and the control signal $V_{14}$ transmitted to the fourth transparent electrode 112-4.

The second modification in which the ninth transparent electrode is formed over the second substrate 111-2 need not form a plurality of transparent electrodes as compared with the example in which the plurality of transparent electrodes is formed over the second substrate 111-2. Therefore, for example, in the second modification, the manufacturing process related to the patterning of the transparent electrode formation can be reduced, and the manufacturing cost of the liquid crystal cell can be reduced by using the second modification.

The liquid crystal optical element 10 has been described with reference to FIG. 1 to FIG. 22. The forms shown in FIG. 1 to FIG. 22 are examples, and the form of the liquid crystal optical element 10 is not limited to the forms shown in FIG. 1 to FIG. 22.

The potential supplied to the transparent electrode in the first region 160 and the transparent electrode in the second region 170 can be changed by using the liquid crystal optical element 10. As a result, the irradiation direction of the light can be changed with respect to the object to be irradiated with light. For example, a reading light or a spotlight individually arranged for a seat in a transportation means such as a car, an airplane, or a train can be replaced with one liquid crystal optical element 10 having a plurality of regions. The irradiation direction of the light can be changed according to the seat by using the liquid crystal optical element 10, so that the power consumption can be reduced and the light can be efficiently irradiated individually rather than individually arranging the reading light for the seat.

Second Embodiment

Figure 23:
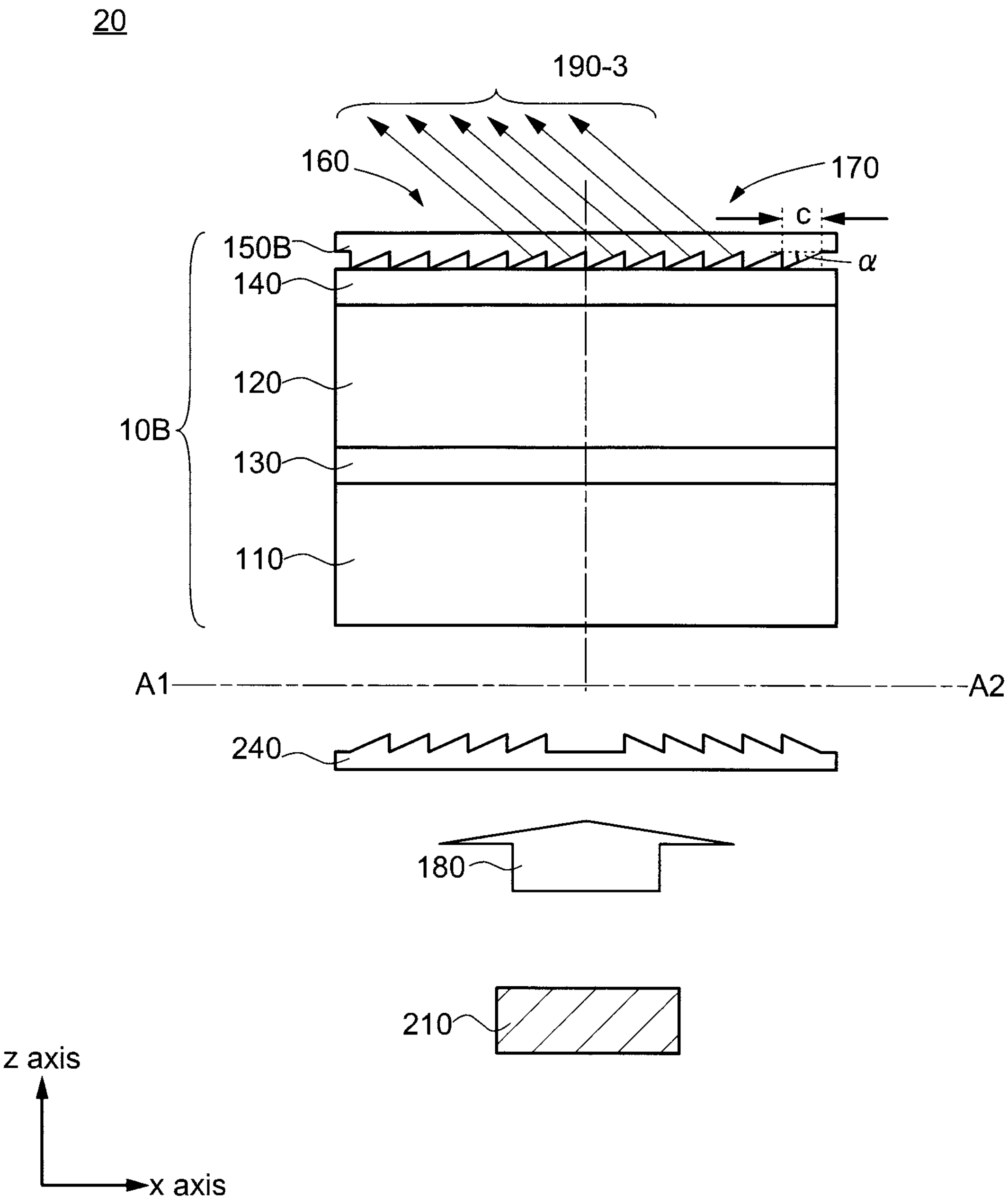
FIG. 23 is a cross-sectional view showing an example of a lighting device including a liquid crystal optical element according to a second embodiment of the present invention.
Figure 24A:
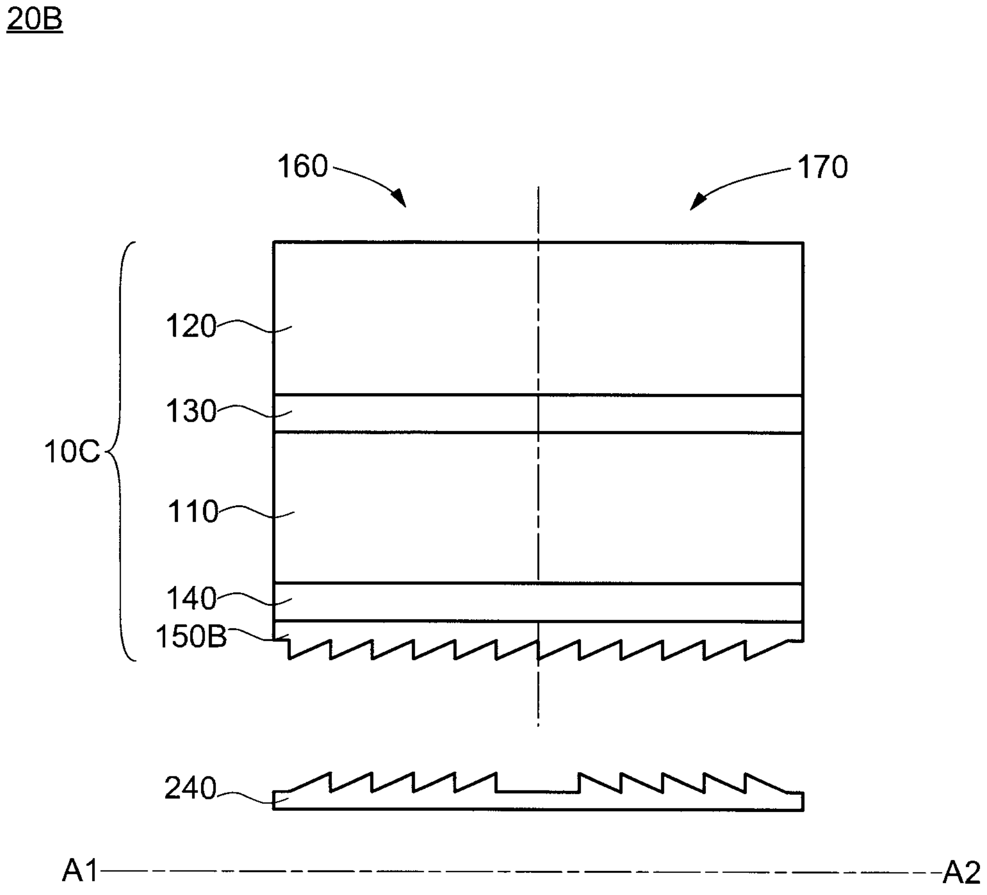
FIG. 24A is a cross-sectional view showing an example of a lighting device including a liquid crystal optical element according to the second embodiment of the present invention.
Figure 24B:
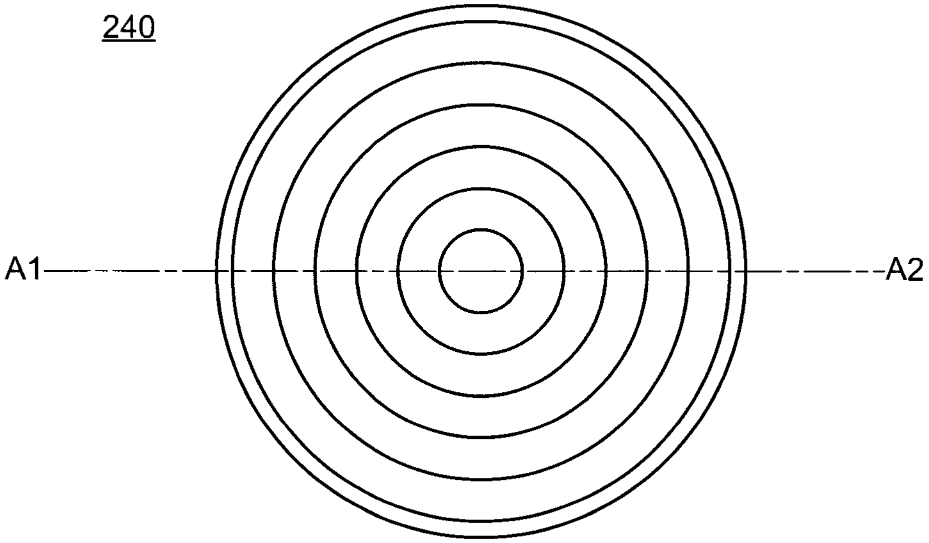
FIG. 24B is a plan view showing a Fresnel lens included in a lighting device according to the second embodiment of the present invention.
Figure 25:
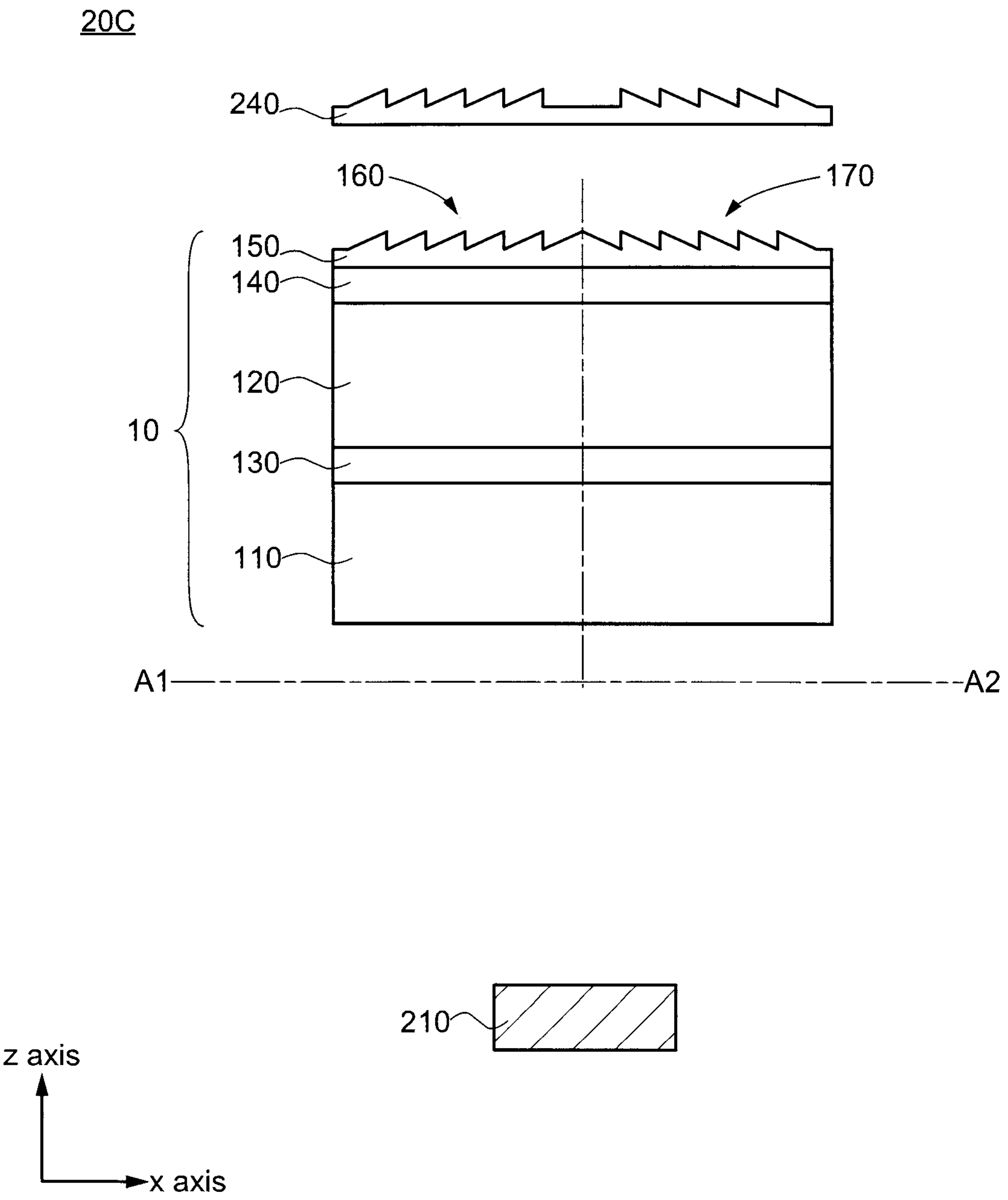
FIG. 25 is a cross-sectional view showing an example of a lighting device including a liquid crystal optical element according to the second embodiment of the present invention.

In the second embodiment, a lighting device 20 including a liquid crystal optical element 10B will be described. FIG. 23 is a cross-sectional view showing an example of the lighting device 20 including the liquid crystal optical element 10B according to a second embodiment of the present invention. FIG. 24A is a cross-sectional view showing an example of a lighting device 20B including a liquid crystal optical element 10C. FIG. 24B is a plan view showing a Fresnel lens 240 included in the lighting device 20B. FIG. 25 is a cross-sectional view showing an example of a lighting device 20C including the liquid crystal optical element 10. The embodiments shown in FIG. 23 to FIG. 25 are examples, and the embodiment of the lighting device according to the second embodiment is not limited to the embodiments shown in FIG. 23 to FIG. 25. The same description as in the first embodiment may be omitted, in the description of the second embodiment.

The lighting device 20 in the embodiment shown in FIG. 23 includes the light source 210, the Fresnel lens 240 and the liquid crystal optical element 10B.

The light source 210 can irradiate light on the liquid crystal optical element 10B. For example, a light bulb, a fluorescent lamp, a cold-cathode tube, a light-emitting diode (LED), a laser diode (LD), or the like can be used as the light source 210. Preferably, the light source 210 of the lighting device 20 is an LED. The lighting device 20 using an LED with high luminous efficiency as the light source 210 has high brightness and low power consumption. The LED and the LD respectively include an organic light-emitting diode (OLED) and an organic laser diode (OLD).

The Fresnel lens 240 is arranged between the liquid crystal optical element 10B and the light source 210. For example, the Fresnel lens 240 is a lens having a saw-shaped cross section as shown in FIG. 23, and is a lens obtained by dividing a lens into concentric circle shaped regions by engraving a concentric circle shaped groove in a lens formed of resin as shown in FIG. 24B. The Fresnel lens 240 may collect light emitted from the light source 210. Therefore, the collected light can be made to enter the liquid crystal optical element 10B by using the Fresnel lens 240. Therefore, the lighting device 20 using the Fresnel lens 240 makes it possible to reduce the loss of light entering the liquid crystal optical element 10B from the light source 210.

The configuration of the liquid crystal optical element 10B is a configuration in which the optical element 150 is replaced with an optical element 150B with respect to the configuration of the liquid crystal optical element 10. Since the other configurations are the same as those of the liquid crystal optical element 10, descriptions thereof will be omitted.

The optical element 150B is bonded and secured to the second liquid crystal cell 120 using the second transparent adhesive layer 140. The optical element 150B has a configuration in which a plurality of prisms is arranged in the same direction with respect to the x-axis direction as compared with the optical element 150.

In a cross-sectional view, a length of one side of a triangle of the prism of the optical element 150B is a length C, and an angle with respect to a plane on which the prism is stacked is an angle $\alpha$. Changing the length C and the angle $\alpha$ makes it possible to form the optical element 150B according to the specifications or applications of the lighting device 20. For example, in the second embodiment, the length C is 0.9 mm and the angle $\alpha$ is 40 degrees.

The incident light 180 from the light source 210 is collected by the Fresnel lens 240, and the collected light is incident on the liquid crystal optical element 10B in the lighting device 20. The light incident on the liquid crystal optical element 10B passes through the first liquid crystal cell 110, the first transparent adhesive layer 130, the second liquid crystal cell 120, and the second transparent adhesive layer 140, is refracted by the optical element 1501B, and is emitted as an emitted light 190-3. The light incident on each of the prisms arranged in the first region 160 and the second region 170 can be bent, dispersed, or totally reflected in a similar manner, in the lighting device 20. In addition, adjusting the potential supplied to each transparent electrode of the first liquid crystal cell 110 and the second liquid crystal cell 120 makes it possible to change the irradiation direction of light with respect to the object to be irradiated with light, in the embodiment shown in FIG. 23.

A lighting device 20B shown in FIG. 24A is different from the lighting device 20 shown in FIG. 23 in that the optical element 150B is arranged between the Fresnel lens 240 and the first liquid crystal cell 110. The incident light 180 from the light source 210 is collected by the Fresnel lens 240, and the collected light is refracted at the optical element 150B and transmitted through the second transparent adhesive layer 140, the first liquid crystal cell 110, the first transparent adhesive layer 130 and the second liquid crystal cell 120, in the lighting device 20B. Adjusting the potentials supplied to the transparent electrodes of the first liquid crystal cell 110 and the second liquid crystal cell 120 in the lighting device 20B makes it possible to change the irradiation direction of light with respect to the object to be irradiated with light.

The lighting device 20C shown in FIG. 25 is different from the lighting device 20 shown in FIG. 23 in that the liquid crystal optical element 10B is replaced with the liquid crystal optical element 10, and the Fresnel lens 240 is arranged above the optical element 150 in the z-axis direction. The incident light 180 from the light source 210 is incident on the liquid crystal optical element 10 in the lighting device 20C. The incident light passes through the first liquid crystal cell 110, the first transparent adhesive layer 130, the second liquid crystal cell 120 and the second transparent adhesive layer 140, and is refracted by the prism of the first region 160 and the prism of the second region 170 in the lighting device 20C, and the refracted light is collected and emitted by the Fresnel lens 240 in the lighting device 20C. Adjusting the potential supplied to each transparent electrode of the first liquid crystal cell 110 and the second liquid crystal cell 120 in the lighting device 20C makes it possible to change the irradiation direction of light with respect to the object to be irradiated with light.

Third Embodiment

Figure 26:
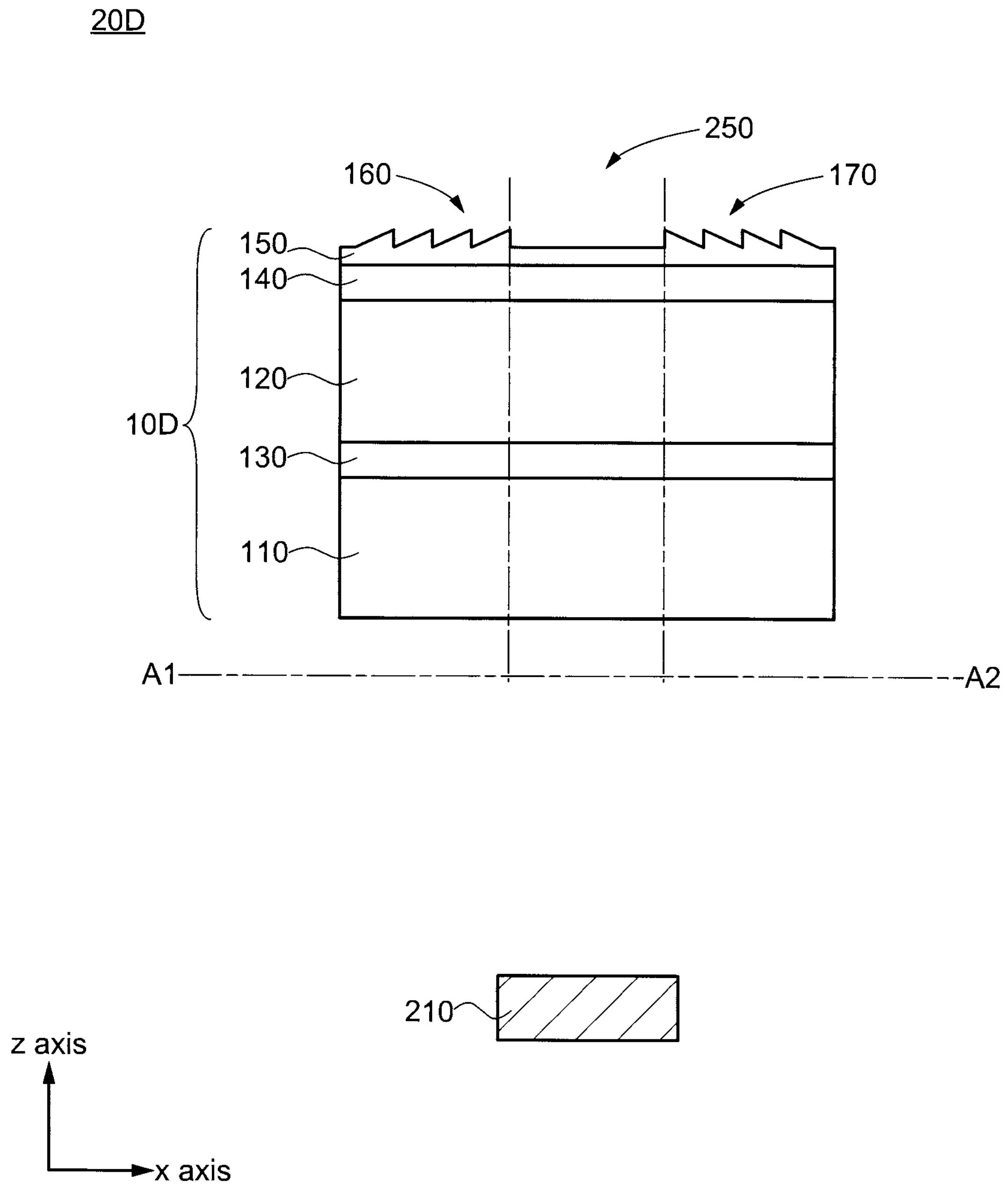
FIG. 26 is a cross-sectional view showing an example of a lighting device including a liquid crystal optical element according to a third embodiment of the present invention.
Figure 27:
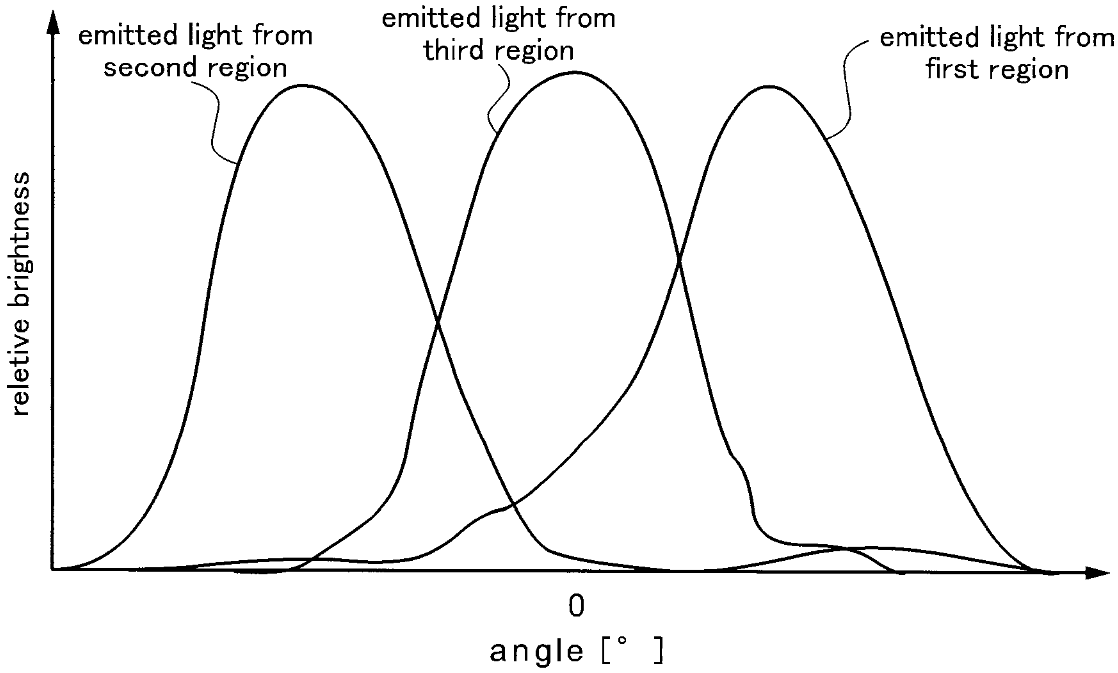
FIG. 27 is a graph showing a relationship between the relative brightness and the polar angle in emitted light from a liquid crystal optical element according to the third embodiment of the present invention.
Figure 28:
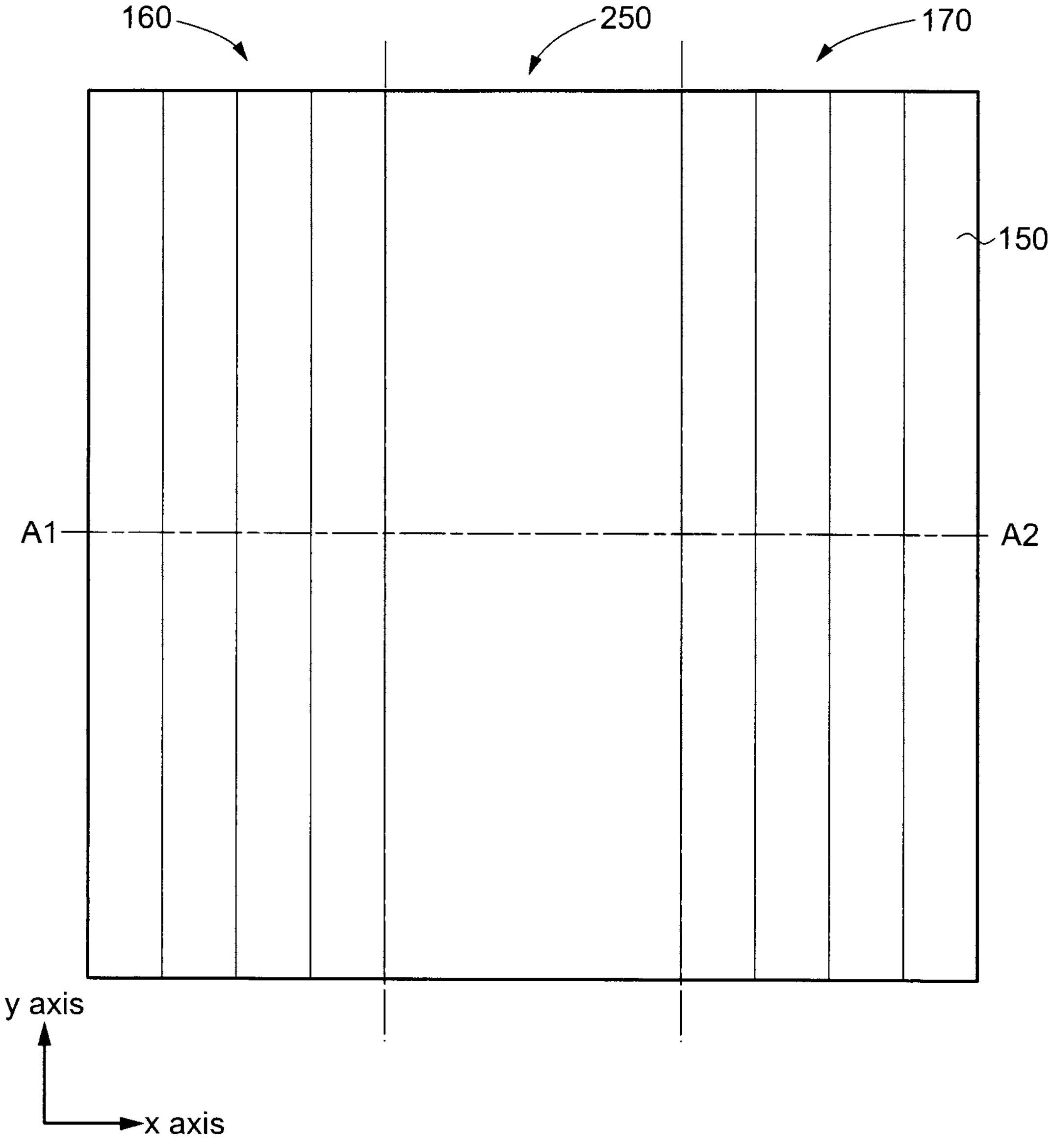
FIG. 28 is a plan view showing prisms on a second liquid crystal cell in a liquid crystal optical element according to the third embodiment of the present invention.

In the third embodiment, a lighting device 20D including a liquid crystal optical element 10D will be described. FIG. 26 is a cross-sectional view showing an example of the lighting device 20D including the liquid crystal optical element 10D according to a third embodiment of the present invention. FIG. 27 is a schematic diagram showing a relationship between the relative brightness and the polar angle in emitted light from the liquid crystal optical element 10D. FIG. 28 is a plan view showing prisms of the optical element 150 on the second liquid crystal cell 120 in the liquid crystal optical element 10D. The embodiments shown in FIG. 26 to FIG. 28 are examples, and the embodiment of the lighting device according to the third embodiment is not limited to the embodiments shown in FIG. 26 to FIG. 28. The same description as in the first embodiment and the second embodiment may be omitted in the description of the third embodiment.

The lighting device 20D in the embodiment shown in FIG. 26 includes the light source 210 and the liquid crystal optical element 10D. The lighting device 20D is different from the first embodiment shown in FIG. 11 in that it includes the liquid crystal optical element 10D. In addition, the liquid crystal optical element 10 in the first embodiment has two regions of the first region 160 and the second region 170, whereas the liquid crystal optical element 10D in the third embodiment has three regions with a third region 250 between the first region 160 and the second region 170.

A configuration of a transparent electrode in the third region 250 in the first liquid crystal cell 110 similar to that of the first electrode group 117-1 and the second electrode group 117-2 or a configuration of a transparent electrode similar to that of the third electrode group 117-3 and the fourth electrode group 117-4 can be used. A configuration of a transparent electrode in the second liquid crystal cell 120 similar to that of the first liquid crystal cell 110 can be used.

The first region 160 and the second region 170 in the optical element 150 have a plurality of prisms and have a saw shape in a cross-sectional view, while the third region 250 has a flat surface in a cross-sectional view. For example, the optical element 150 has a plane as shown in FIG. 28.

A potential may be independently supplied to each transparent electrode in the first region 160, the second region 170, or the third region 250 in the liquid crystal optical element 10D. For example, the second region 170 and the third region 250 in the lighting device 20D may be controlled to emit diffused light, and controlling the potential of the transparent electrode in the first region 160 makes it possible to emit light obtained by adjusting the right-side emitted light as shown in the "emitted light from the first region" of FIG. 27 from the liquid crystal optical element 10D. In addition, the first region 160 and the third region 250 in the lighting device 20D are controlled to emit diffused light, and controlling the potential of the transparent electrode in the second region 170 makes it possible to emit light obtained by adjusting the left-side emitted light as shown in the "emitted light from the second region" of FIG. 27 from the liquid crystal optical element 10D. Further, the first region 160 and the second region 170 in the lighting device 20D are controlled to emit diffused light, and controlling the potential of the transparent electrode in the third region 250 makes it possible to emit light obtained by adjusting the left-side emitted light as shown in the "emitted light from the third region" of FIG. 27 from the liquid crystal optical element 10D.

In addition, in the liquid crystal optical element of the present invention, two regions of the first region 160 and the second region 170 shown in the first embodiment and three regions having the third region 250 between the first region 160 and the second region 170 shown in the third embodiment are examples, and the configuration of the liquid crystal optical element is not limited to the configuration of the first embodiment and the configuration of the third embodiment. For example, the configuration of the liquid crystal optical element may have four regions and may have five or more regions. The liquid crystal optical element of the present invention includes a plurality of regions, whereby the potential supplied to the transparent electrode can be controlled in a narrow range. As a result, the orientation of the liquid crystal can be controlled in a narrower range, so that the peak of the relative brightness can be controlled in a narrower range, and the irradiation direction of light can be finely controlled with respect to the object to be irradiated with light.

Fourth Embodiment

Figure 29:
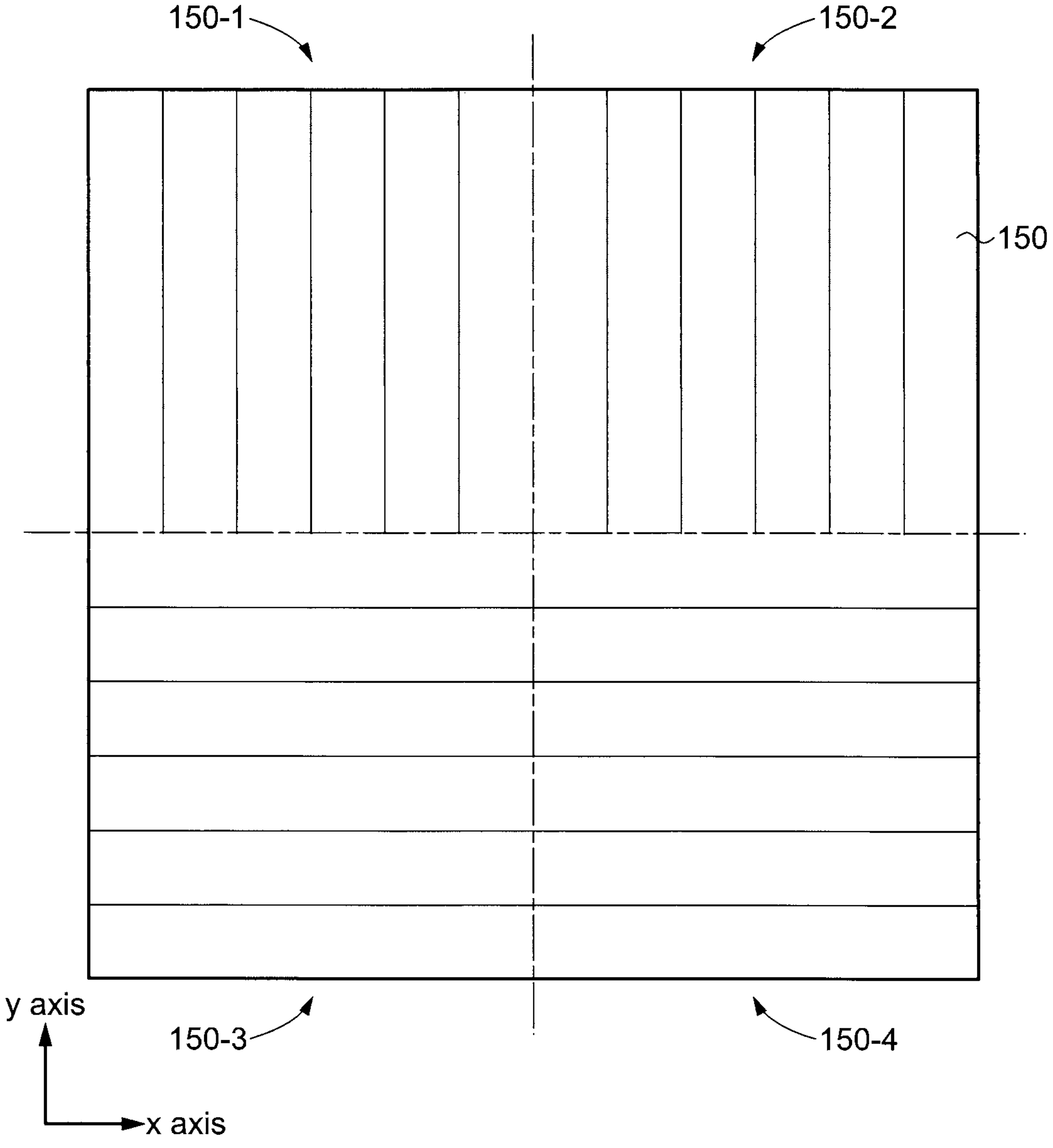
FIG. 29 is a plan view showing prisms in a liquid crystal optical element according to a fourth embodiment of the present invention.
Figure 30:
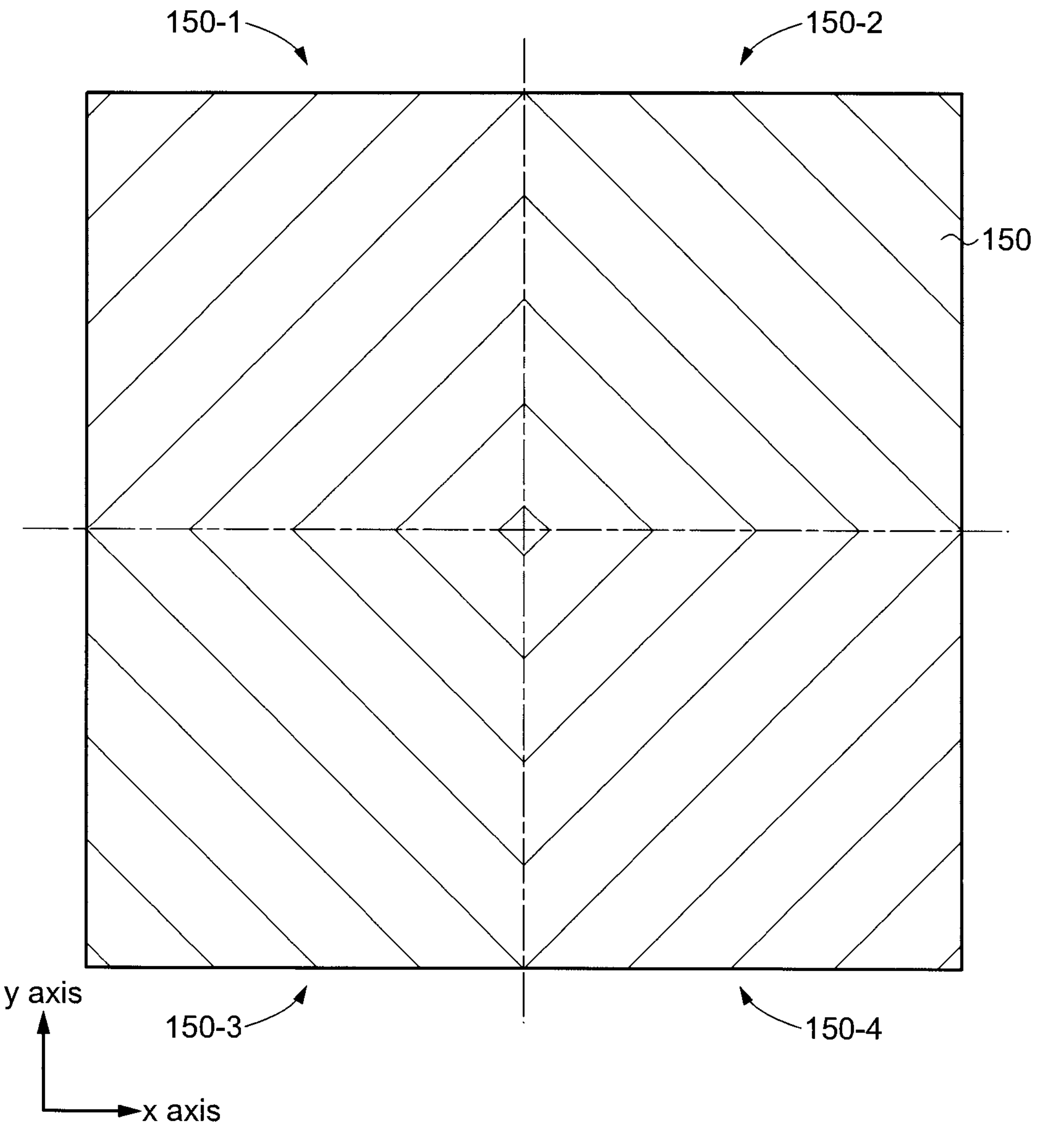
FIG. 30 is a plan view showing prisms in a liquid crystal optical element according to the fourth embodiment of the present invention.

In a fourth embodiment, a configuration in which the optical element 150 includes a plurality of optical elements will be described. FIG. 29 and FIG. 30 show plan views including a plurality of prisms that is different in orientation in the liquid crystal optical element 10 according to the fourth embodiment of the present invention. The embodiments shown in FIG. 29 and FIG. 30 are examples, and the embodiment of the optical element 150 is not limited to the embodiments shown in FIG. 29 and FIG. 30. Descriptions similar to those of the first to third embodiments may be omitted in the description of the fourth embodiment.

The optical element 150 in the embodiment shown in FIG. 29, includes a first optical element 150-1 having a plurality of prisms arranged parallel to the y-axis direction, a second optical element 150-2 having a plurality of prisms arranged parallel to the y-axis direction, a third optical element 150-3 having a plurality of prisms arranged parallel to the x-axis direction, and a fourth optical element 150-4 having a plurality of prisms arranged parallel to the x-axis direction.

The optical element 150 in the embodiment shown in FIG. 30 includes the first optical element 150-1, the second optical element 150-2, the third optical element 150-3, and the fourth optical element 150-4 having a plurality of prisms arranged parallel to a direction inclined by 45 degrees or approximately 45 degrees in a plane including the x-axis and the y-axis.

In the liquid crystal optical element 10 including the optical element 150 according to the fourth embodiment, a peak angle can be adjusted by changing the relative brightness by adjusting the potential supplied to each of the transparent electrodes of the first liquid crystal cell 110 and the second liquid crystal cell 120, so that the irradiation direction of the light can be changed with respect to the object to be irradiated with light.

Fifth Embodiment

Figure 31:
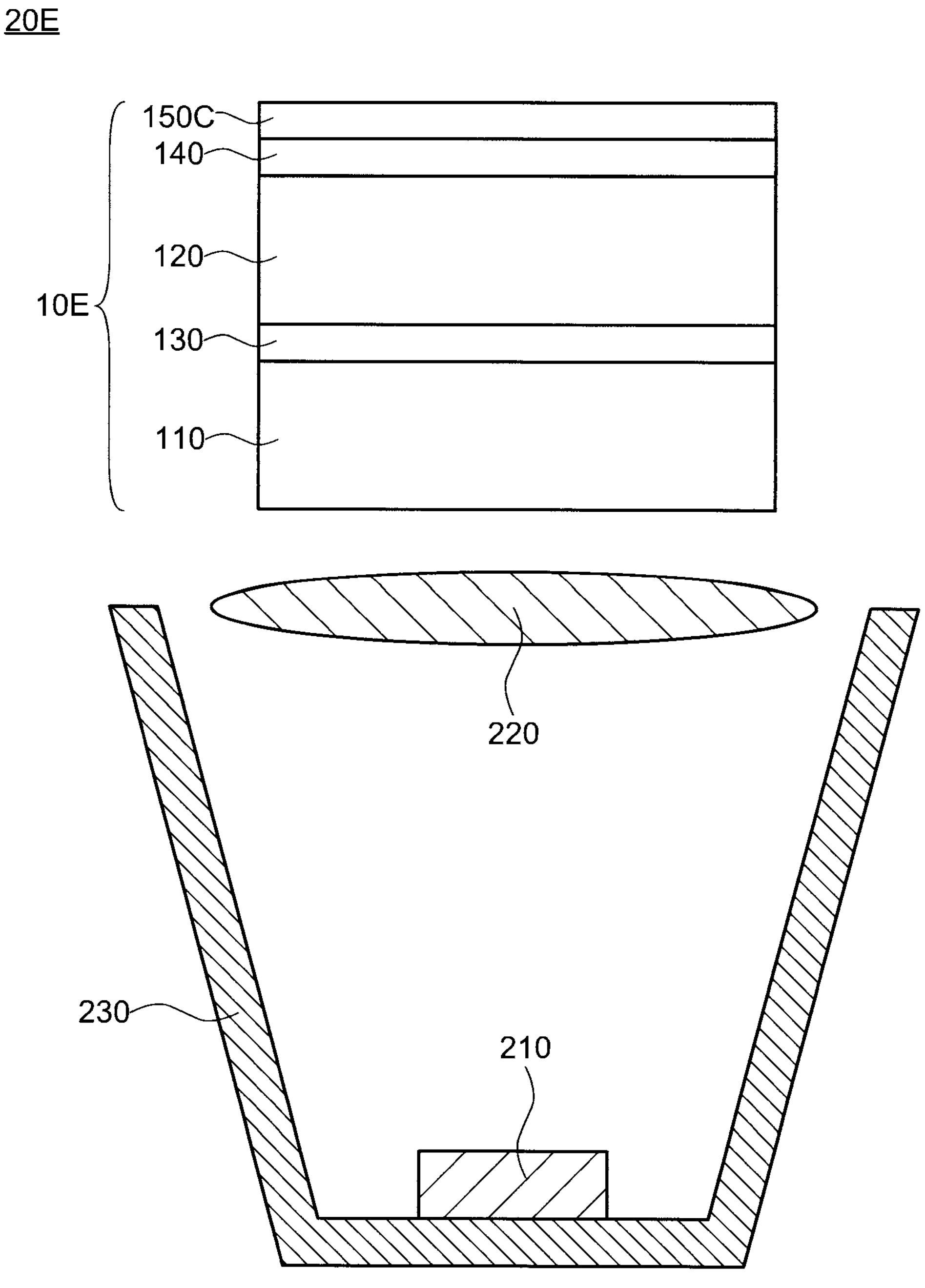
FIG. 31 is a cross-sectional view showing an example of a lighting device including a liquid crystal optical element according to a fifth embodiment of the present invention.
Figure 32A:
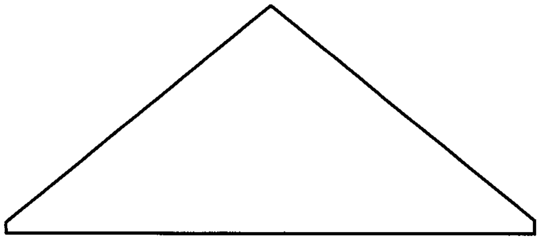
FIG. 32A is a diagram showing an example in which a shape of a liquid crystal lens included in a liquid crystal optical element according to the fifth embodiment of the present invention is triangular in a cross-section.
Figure 32B:
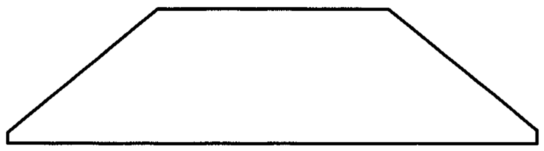
FIG. 32B is a diagram showing an example in which a shape of a liquid crystal lens included in a liquid crystal optical element according to the fifth embodiment is trapezoidal in a cross-section.
Figure 32C:
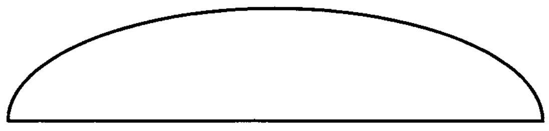
FIG. 32C is a diagram showing an example in which a shape of a liquid crystal lens included in a liquid crystal optical element according to the fifth embodiment is convex in a cross-section.

In a fifth embodiment, an embodiment in which an optical element 150C is formed using an organic resin material or an inorganic material such as glass will be described. FIG. 31 is a cross-sectional view showing an example of a lighting device 20E including a liquid crystal optical element 10E according to the fifth embodiment of the present invention. FIG. 32A is a diagram showing an example in which the shape of the optical element 150C included in the liquid crystal optical element 10E is triangular in a cross-section, FIG. 32B is a diagram showing an example in which the shape of the optical element 150C included in the liquid crystal optical element 10E is trapezoidal in a cross-section, and FIG. 32C is a diagram showing an example in which the shape of the optical element 150C included in the liquid crystal optical element 10E is a convex arc shape in a cross-section. The embodiments shown in FIG. 31 to FIG. 32C are examples, and the embodiment of the lighting device 20E according to the fifth embodiment is not limited to the embodiments shown in FIG. 31 to FIG. 32C. The same description as in the first to fourth embodiments may be omitted in the description of the fifth embodiment.

As shown in FIG. 31, the lighting device 20E includes the liquid crystal optical element 10E, the light source 210, a convex lens 220, and a reflector 230. The convex lens 220 is arranged between the liquid crystal optical element 10 and the light source 210. In addition, the reflector 230 is arranged to surround a space between the light source 210 and the convex lens 220. The same light source as in the second embodiment can be used as the light source 210.

The convex lens 220 condenses the light emitted from the light source 210 and allows the collected light to be incident on the liquid crystal optical element 10.

The reflector 230 may reflect the light emitted from the light source 210 and cause the reflected light to be incident on the convex lens. For example, the shape of the reflector 230 is approximately conical but is not limited to this. In addition, a surface of the reflector 230 may be flat or curved.

Further, the lighting device 20E may include a control unit for controlling the voltage supplied to the transparent electrode, so that various light distribution patterns can be formed.

The lighting device 20E according to the fifth embodiment includes the optical element 150C formed using an inorganic material such as an organic resin material or an inorganic material such as glass shown in FIG. 32A, FIG. 32B and FIG. 32C. The lighting device 20E can adjust the peak angle by adjusting the potential supplied to each transparent electrode of the first liquid crystal cell 110 and the second liquid crystal cell 120 in the same manner as the embodiment including the optical element 150 having the prism according to the first embodiment. As a result, the lighting device 20E can change the irradiation direction of light with respect to the object irradiated with light.

Sixth Embodiment

Figure 33:
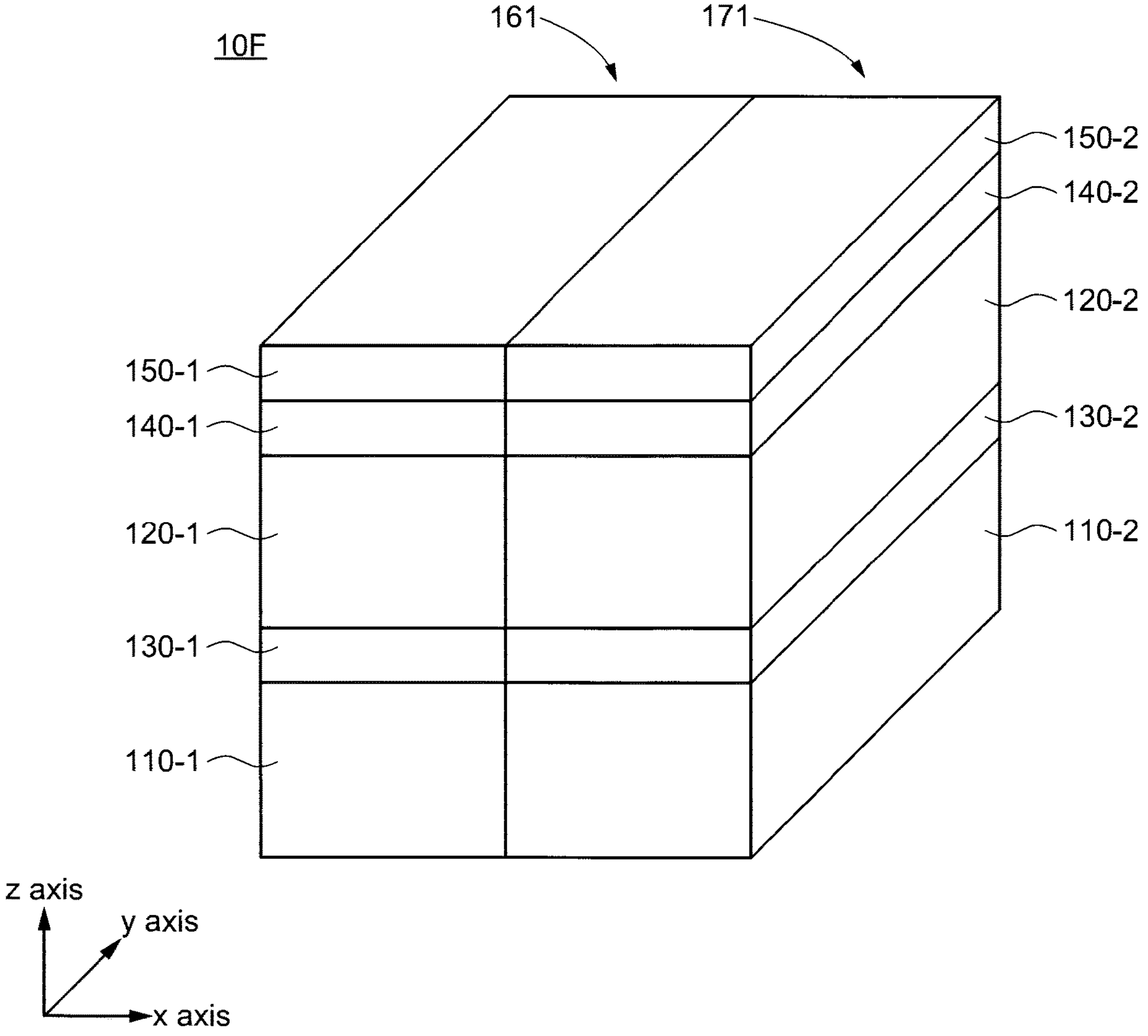
FIG. 33 is a perspective view of a liquid crystal optical element according to a sixth embodiment of the present invention.
Figure 34:
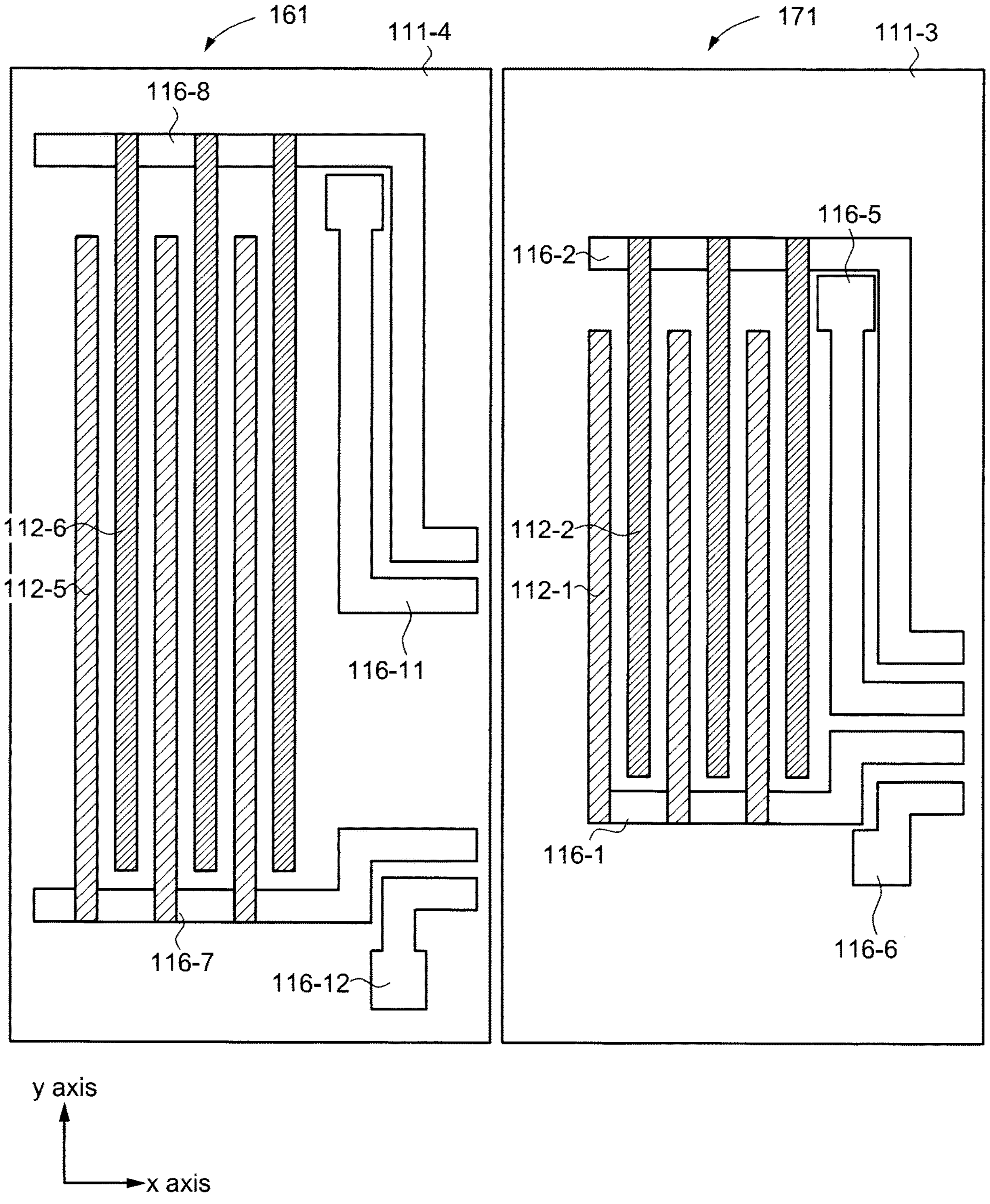
FIG. 34 is a plan view showing an arrangement of a first transparent electrode, a second transparent electrode, a fifth transparent electrode, and a sixth transparent electrode on a first substrate in a liquid crystal optical element according to the sixth embodiment of the present invention.

In a sixth embodiment, an embodiment of a liquid crystal optical element 10F in which the first region and the second region are formed by different elements and arranged in tiles will be described. FIG. 33 is a perspective view of the liquid crystal optical element 10F according to the sixth embodiment of the present invention. FIG. 34 is a plan view showing the arrangement of the first transparent electrode 112-1 on a first substrate 111-3, the fifth transparent electrode 112-5 on a first substrate 111-4, and the sixth transparent electrode 112-6 in the liquid crystal optical element 10F. The embodiments shown in FIG. 33 and FIG. 34 are examples, and the embodiment of the liquid crystal optical element 10F according to the sixth embodiment is not limited to the embodiments shown in FIG. 33 and FIG. 34. The same description as in the first embodiment to the fifth embodiment may be omitted in the description of the sixth embodiment.

The liquid crystal optical element 10F is an element configured by arranging a first element 161 and a second element 171, as shown in FIG. 33. The first element 161 and the second element 171 correspond to the element constituting the first region 160 and the element constituting the second region 170 of the liquid crystal optical element 10 according to the first embodiment. Since the other configurations are the same as the element constituting the first region 160 and the element constituting the second region 170 of the liquid crystal optical element 10 according to the first embodiment, a transparent electrode formed on the first substrate 111-3 of the first liquid crystal cell 110-1 and a transparent electrode formed on the first substrate 111-4 of a first liquid crystal cell 110-2 will be described as an example, and detailed explanations thereof will be omitted.

For example, the first element 161 includes the first liquid crystal cell 110-1, a second liquid crystal cell 120-1, a first transparent adhesive layer 130-1, a second transparent adhesive layer 140-1, and the first optical element 150-1. For example, the first element 161 includes the first liquid crystal cell 110-2, a second liquid crystal cell 120-2, a first transparent adhesive layer 130-2, a second transparent adhesive layer 140-2, and the second optical element 150-2.

As shown in FIG. 34, the first substrate 111-4 of the first liquid crystal cell 110-1 arranged in the first element 161 includes the fifth transparent electrode 112-5 and the sixth transparent electrode 112-6. In addition, the fifth transparent electrode 112-5 and the sixth transparent electrode 112-6 are electrically connected to the seventh wiring 116-7 and the eighth wiring 116-8 formed on the first substrate 111-1, respectively.

The first substrate 111-3 of the first liquid crystal cell 110-1 arranged in the second element 171 includes the first transparent electrode 112-1 and the second transparent electrode 112-2. In addition, the first transparent electrode 112-1 and the second transparent electrode 112-2 are electrically connected to the first wiring 116-1 and the second wiring 116-2 formed on the first substrate 111-3, respectively.

In addition, the fifth wiring 116-5, the sixth wiring 116-6, the eleventh wiring 116-11, and the twelfth wiring 116-12 are formed in the first substrate 111-1. When the first substrate 111-1 is bonded to the second substrate (not shown), the third transparent electrode (not shown) and the fourth transparent electrode (not shown) formed on the second substrate are electrically connected to the fifth wiring 116-5 and the sixth wiring 116-6 arranged in the first substrate 111-1, respectively. Similarly, the seventh transparent electrode (not shown) formed on the second substrate and the eighth transparent electrode (not shown) are electrically connected to the eleventh wiring 116-11 and the twelfth wiring 116-12 arranged on the first substrate 111-1, respectively.

For example, the third wiring 116-3 and the fifth wiring 116-5, the fourth wiring 116-4 and the sixth wiring 116-6, the ninth wiring 116-9 and the eleventh wiring 116-11, and the tenth wiring 116-10 and the 12th wiring 116-12 may be electrically connected using silver paste or conductive particles. In addition, the conductive particles include metal-coated particles.

As shown in the sixth embodiment, the liquid crystal optical element 10F has a form in which the first region and the second region are formed by different elements and are arranged in tiles. Since a plurality of elements in the liquid crystal optical element 10F can be formed by arranging it in tiles, the size of the liquid crystal optical element 10F can be appropriately adjusted depending on a target to be irradiated with diffused light or spotted light. Therefore, the liquid crystal optical element 10F according to the sixth embodiment is excellent in versatility.

Seventh Embodiment

Figure 35:
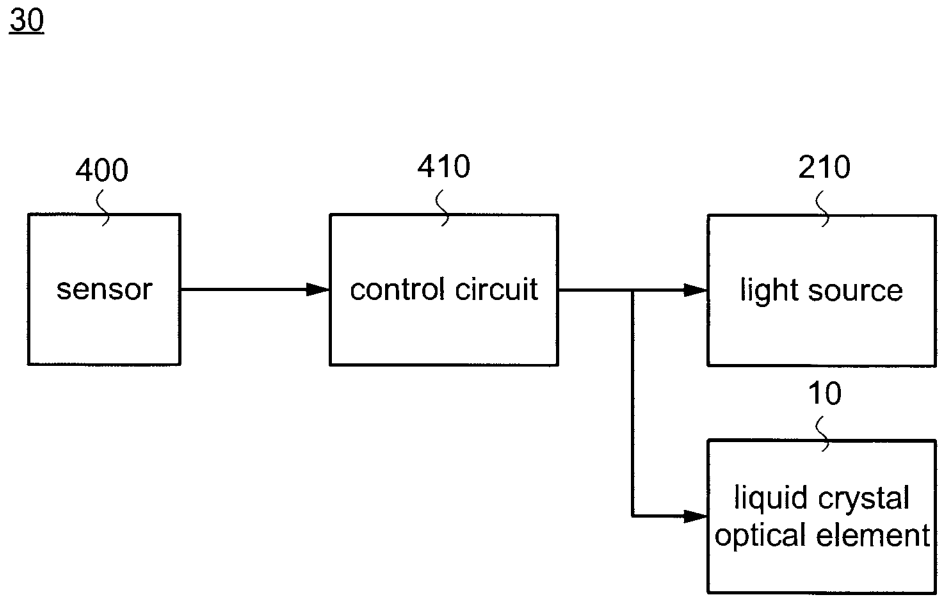
FIG. 35 is a schematic diagram showing a configuration of a lighting device according to a seventh embodiment of the present invention.
Figure 36:
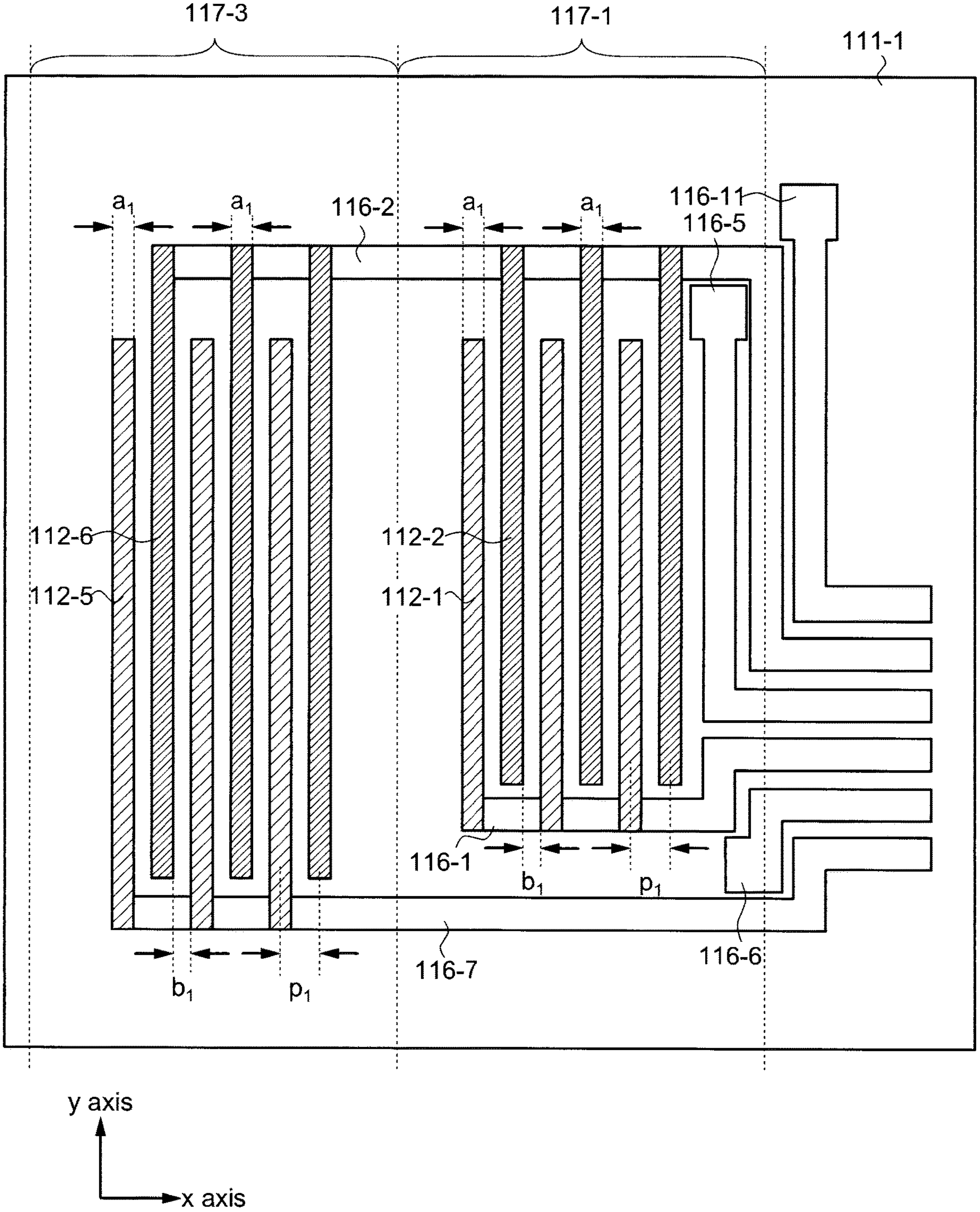
FIG. 36 is a plan view showing an arrangement of a first transparent electrode, a second transparent electrode, a fifth transparent electrode, and a sixth transparent electrode on a first substrate in a liquid crystal optical element according to the seventh embodiment of the present invention.
Figure 37:
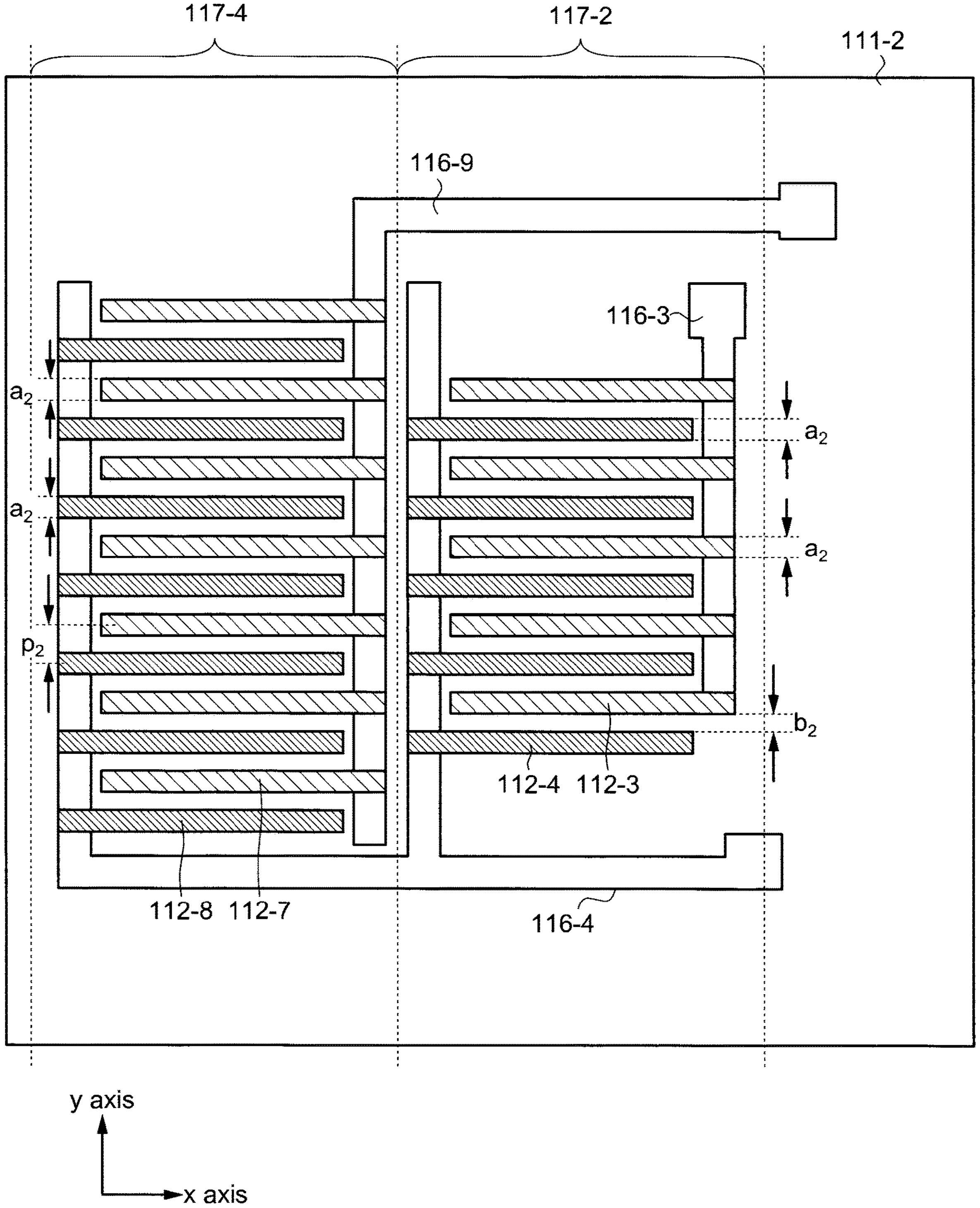
FIG. 37 is a plan view showing an arrangement of a third transparent electrode, a fourth transparent electrode, a seventh transparent electrode, and an eighth transparent electrode on a second substrate in a liquid crystal optical element according to the seventh embodiment of the present invention.
Figure 38:
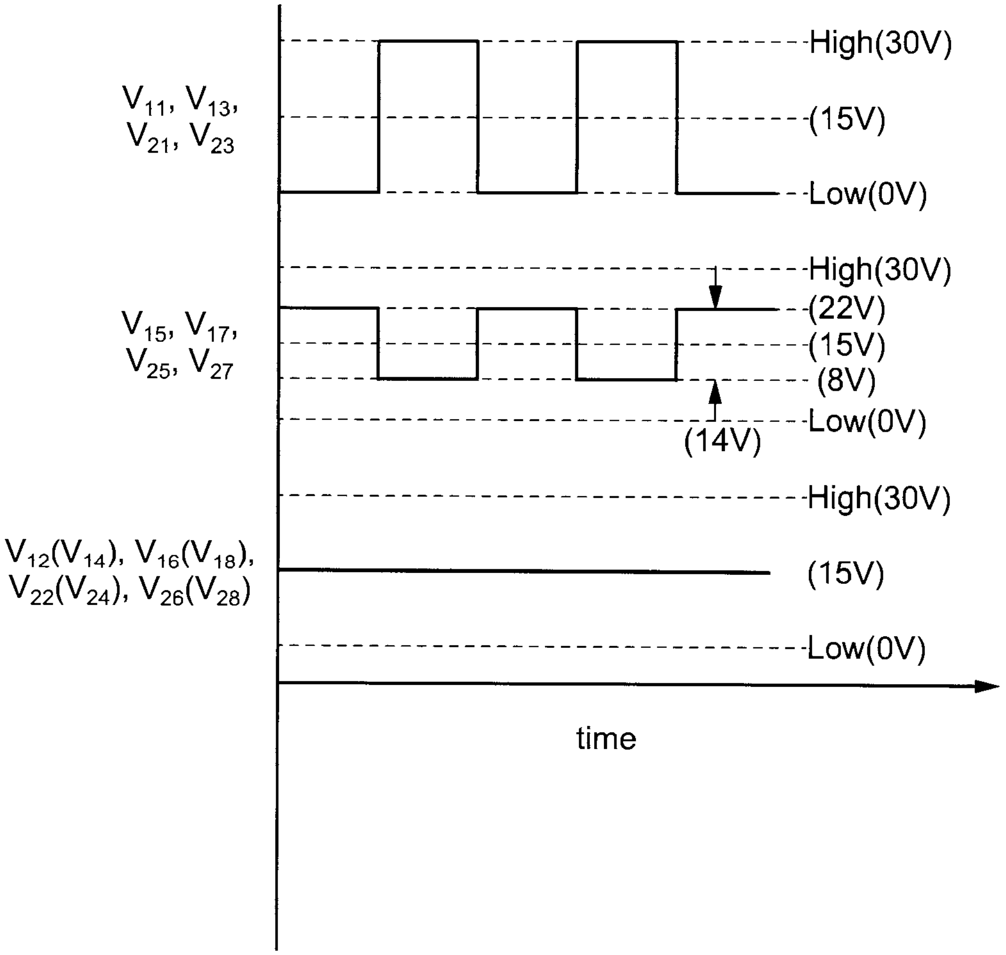
FIG. 38 is a timing chart showing voltages supplied to each transparent electrode included in a liquid crystal optical element according to the seventh embodiment of the present invention.

In a seventh embodiment, an embodiment of a lighting device 30 of the present invention will be described. FIG. 35 is a schematic diagram showing a configuration of the lighting device 30 according to the seventh embodiment of the present invention. FIG. 36 is a plan view showing the arrangement of the first transparent electrode 112-1, the second transparent electrode 112-2, the fifth transparent electrode 112-5, and the sixth transparent electrode 112-6 on the first substrate 111-1 in the liquid crystal optical element 10 according to the seventh embodiment of the present invention. FIG. 37 is a plan view showing the arrangement of the third transparent electrode 112-3, the fourth transparent electrode 112-4, the seventh transparent electrode 112-7, and the eighth transparent electrode 112-8 on the second substrate 111-2 in the liquid crystal optical element 10 according to the seventh embodiment of the present invention. FIG. 38 is a timing chart showing voltages supplied to each transparent electrode included in the liquid crystal optical element 10 according to the seventh embodiment of the present invention. The embodiments of the lighting device 30 shown in FIG. 35 to FIG. 38 are examples, and the embodiment of the lighting device 30 according to the seventh embodiment is not limited to the embodiments shown in FIG. 35 to FIG. 38. Descriptions similar to those of the first embodiment to the sixth embodiment may be omitted in the description of the seventh embodiment.

As shown in FIG. 35, the lighting device 30 includes a sensor 400, a control circuit 410, the light source 210, and the liquid crystal optical element 10. The same light source as in the second embodiment can be used as the liquid crystal optical element 10 and the light source 210. The sensor 400 is electrically connected to the control circuit 410. The control circuit 410 is electrically connected to the light source 210 and the liquid crystal optical element 10.

The sensor 400 is a sensor that detects the temperature of the human body, and is, for example, an infrared sensor. For example, the sensor 400 detects a person in the vicinity of the sensor, a person seated on a chair, or the like, and outputs a detection signal to the control circuit 410.

The control circuit 410 includes a circuit for driving the liquid crystal optical element 10 and the light source 210. For example, upon receiving the detection signal from the sensor 400, the control circuit 410 outputs a control signal for controlling the orientation state of the liquid crystal to the first liquid crystal cell 110 (see FIG. 1) and the second liquid crystal cell 120 via a flexible wiring substrate (not shown). In addition, upon receiving the detection signal from the sensor 400, the control circuit 410 outputs the control signal to the light source 210 to control the ON or OFF state of the LED included in the light source 210 via the flexible wiring substrate (not shown).

The first substrate 111-1 shown in FIG. 36 is different from the first substrate 111-1 shown in FIG. 5 in that the second transparent electrode 112-2 and the sixth transparent electrode 112-6 are electrically connected to the second wiring 116-2 and do not have the eighth wiring 116-8 and the 12th wiring 116-12. Since the other configurations are the same as those of the first substrate 111-1 shown in FIG. 5, descriptions thereof will be omitted here.

The second substrate 111-2 shown in FIG. 37 is different from the second substrate 111-2 shown in FIG. 6 in that the fourth transparent electrode 112-4 and the eighth transparent electrode 112-8 are electrically connected to the fourth wiring 116-4 and do not have the tenth wiring 116-10. Since other configurations are the same as those of the second substrate 111-2 shown in FIG. 6, descriptions thereof will be omitted here.

As shown in FIG. 38, potentials similar to those shown in FIG. 13 are supplied to the first transparent electrode 112-1, the third transparent electrode 112-3, the first transparent electrode 122-1, and the third transparent electrode 122-3. The third potential is supplied to the second transparent electrode 112-2, the fourth transparent electrode 112-4, the sixth transparent electrode 112-6, the eighth transparent electrode 112-8, the second transparent electrode 122-2, the fourth transparent electrode 122-4, the sixth transparent electrode 122-6, and the eighth transparent electrode 122-8.

In addition, as shown in FIG. 38, the fifth transparent electrode 112-5, the seventh transparent electrode 112-7, the fifth transparent electrode 122-5, and the seventh transparent electrode 122-7 are different from the timing chart shown in FIG. 20 in that the Low potential of the first potential and the second potential (variable potentials) is 8 V, and the High potential is 22 V, that is, the potential difference is 14V, and the phase of the second potential is inverted with respect to the phase of the first potential.

In the liquid crystal optical element 10 according to the seventh embodiment, the second transparent electrode 112-2, the sixth transparent electrode 112-6, the fourth transparent electrode 112-4, the eighth transparent electrode 112-8, the second transparent electrode 122-2, the fourth transparent electrode 122-4, the sixth transparent electrode 122-6, and the eighth transparent electrode 122-8 are collectively supplied with the potential from one electrode with respect to the liquid crystal optical element 10 according to the first embodiment. As a result, the liquid crystal optical element 10 according to the first embodiment is configured to supply the potential from four electrodes, and the liquid crystal optical element 10 according to the seventh embodiment is configured to supply the potential from three electrodes.

In the liquid crystal optical element 10 according to the seventh embodiment, it is possible to control the degree of diffusivity of the light emitted from the first region 160 and the second region 170 with a simpler configuration by reducing the electrodes for supplying the potential.

Eighth Embodiment

Figure 39:
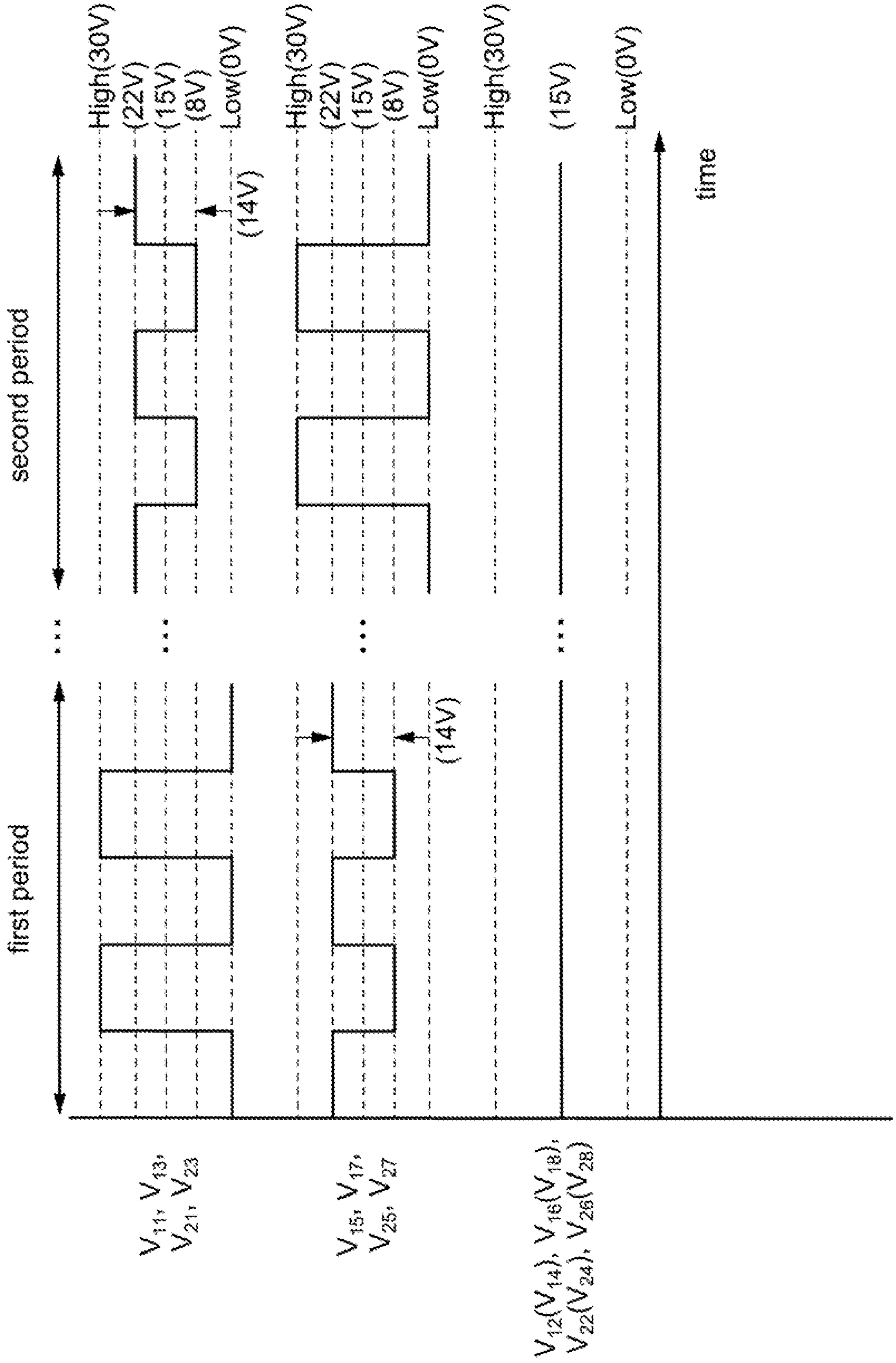
FIG. 39 is a timing chart showing voltages supplied to each transparent electrode included in a liquid crystal optical element according to an eighth embodiment of the present invention.

A modification of the seventh embodiment will be described in the eighth embodiment. The lighting device 30 shown in FIG. 35 and the electrodes and the electrode arrangement shown in FIG. 36 and FIG. 37 can operate based on the timing chart according to the eighth embodiment of the present invention shown in FIG. 39. The timing chart shown in FIG. 39 is an example, and the timing chart according to the eighth embodiment is not limited to the embodiment shown in FIG. 39. Descriptions similar to those of the first embodiment to the seventh embodiment may be omitted in the description of the eighth embodiment.

In the timing chart shown in FIG. 39, an operation of the lighting device 30 shown in FIG. 35 in a first period is different from an operation of the lighting device 30 shown in FIG. 35 in a second period.

In the first period, the potentials indicated by the timing chart shown in FIG. 38 are supplied to the first transparent electrode 112-1, the third transparent electrode 112-3, the third transparent electrode 122-3, the fifth transparent electrode 112-5, the seventh transparent electrode 112-7, the fifth transparent electrode 122-5, the seventh transparent electrode 122-7, the fourth transparent electrode 112-4, the sixth transparent electrode 112-6, the eighth transparent electrode 112-8, the second transparent electrode 122-2, the fourth transparent electrode 122-4, the sixth transparent electrode 122-6, and the eighth transparent electrode 122-8.

In the second period, the potentials supplied to the fifth transparent electrode 112-5, the seventh transparent electrode 112-7, the fifth transparent electrode 122-5, and the seventh transparent electrode 122-7 in the first period are supplied to the first transparent electrode 112-1, the third transparent electrode 112-3, the first transparent electrode 122-1, and the third transparent electrode 122-3. In addition, in the second period, the potentials supplied to the first transparent electrode 112-1, the third transparent electrode 112-3, the first transparent electrode 122-1, and the third transparent electrode 122-3 in the first period are supplied to the fifth transparent electrode 112-5, the seventh transparent electrode 112-7, the fifth transparent electrode 122-5, and the seventh transparent electrode 122-7. Further, the potentials supplied in the first period are supplied to the second transparent electrode 112-2, the fourth transparent electrode 112-4, the sixth transparent electrode 112-6, the eighth transparent electrode 112-8, the second transparent electrode 122-2, the fourth transparent electrode 122-4, the sixth transparent electrode 122-6, and the eighth transparent electrode 122-8.

For example, it is assumed that in a first time period, a person is at a first location and in a second time period, a person moves from the first location to a second location and is at the second location.

In the first period, the sensor 400 detects a person at the first location. The sensor 400 transmits a first detection signal indicating that a person at the first location is detected to the control circuit 410. The control circuit 410 receives the first detection signal and supplies the potential shown in the first period of FIG. 39 to the electrodes of the first liquid crystal cell 110 (see FIG. 1) and the second liquid crystal cell 120. In addition, the control circuit 410 receives the first detection signal and outputs a control signal to the light source 210 for switching ON the LED of the light source 210 via the flexible wiring substrate (not shown). As a result, in the first period, the sensor 400 can illuminate a person at the first location.

Subsequently, in the second period, when a person moves from the first location to the second location, the sensor 400 detects a person at the second location. The sensor 400 transmits a second detection signal indicating that a person at the second location is detected to the control circuit 410. The control circuit 410 receives the second detection signal and supplies the potential shown in the second period of FIG. 39 to the electrodes of the first liquid crystal cell 110 (see FIG. 1) and the second liquid crystal cell 120. In addition, the control circuit 410 receives the second detection signal and outputs a control signal to the light source 210 for switching ON the LED of the light source 210 via the flexible wiring substrate (not shown). As a result, in the second period, the sensor 400 can illuminate a person at the second location.

The lighting device 30 shown in the eighth embodiment can detect the movement of a person using the sensor 400 and use the control circuit 410 to control the voltage supplied to each electrode included in the first region 160 and the voltage supplied to each electrode included in second region 170. Specifically, the lighting device 30 can change the voltage supplied to each electrode included in the first region 160 and the voltage supplied to each electrode included in the second region 170 by using the control circuit 410 between the first period and the second period associated with the movement of a person. As a result, in the lighting device 30, the irradiation region can be moved depending on the movement of a person detected by the sensor 400.

The configuration of the liquid crystal optical element and the configuration of the lighting device described above as an embodiment of the present invention can be appropriately combined and implemented as long as no contradiction is caused. Further, the addition, deletion, or design change of components, or the addition, deletion, or condition change of processes as appropriate by those skilled in the art based on the configuration of the liquid crystal optical element and the configuration of the lighting device are also included in the scope of the present invention as long as they are provided with the gist of the present invention.

Further, it is understood that, even if the effect is different from those provided by each of the above-described embodiments, the effect obvious from the description in the specification or easily predicted by persons ordinarily skilled in the art is apparently derived from the present invention.

What is claimed is:

1. A liquid crystal optical element comprising:

a first liquid crystal cell;

a second liquid crystal cell overlapping the first liquid crystal cell; and an optical element overlapping the second liquid crystal cell and refracting light, each of the first liquid crystal cell and the second liquid crystal cell including a first substrate, a second substrate arranged to face the first substrate, and a liquid crystal layer arranged between the first substrate and the second substrate, the first substrate comprising:

a first electrode group arranged alternately in parallel to a first direction with a first transparent electrode and a second transparent electrode; and a second electrode group arranged alternately in parallel to the first direction with a fifth transparent electrode and a sixth transparent electrode and adjacent to the first electrode group, and the second substrate comprising:

a third electrode group arranged alternately in parallel to a second direction intersecting the first direction with a third transparent electrode and a fourth transparent electrode and facing the first electrode group; and a fourth electrode group arranged alternately in parallel to the second direction with a seventh transparent electrode and an eighth transparent electrode adjacent to the third electrode group, and facing the second electrode group wherein the optical element includes a first optical conversion part overlapping the first electrode group and a second optical conversion part facing and overlapping the second electrode group, wherein, in each of the first liquid crystal cell and the second liquid crystal cell, the liquid crystal layer includes a first portion arranged between the first electrode group and the third electrode group, and a second portion arranged between the second electrode group and the fourth electrode group, and wherein the liquid crystal optical element is configured, in response to voltages supplied to the first transparent electrode, the second transparent electrode, the third transparent electrode, the fourth transparent electrode, the fifth transparent electrode, the sixth transparent electrode, the seventh transparent electrode, and the eighth transparent electrode, to selectively operate in:

a first light distribution mode in which light passing through the first portion of the liquid crystal layer is diffused by the liquid crystal layer and is incident on the first optical conversion part to form diffused light, light passing through the second portion of the liquid crystal layer passes through the liquid crystal layer without being diffused by the liquid crystal layer and is incident on the second optical conversion part to form refracted light, and emitted light is obtained by combining the diffused light and the refracted light; and a second light distribution mode in which light passing through the first portion of the liquid crystal layer passes through the liquid crystal layer without being diffused by the liquid crystal layer and is incident on the first optical conversion part to form refracted light, light passing through the second portion of the liquid crystal layer is diffused by the liquid crystal layer and is incident on the second optical conversion part to form diffused light, and emitted light is obtained by combining the refracted light and the diffused light.

2. The liquid crystal optical element according to claim 1, wherein the second direction is orthogonal to the first direction.

3. The liquid crystal optical element according to claim 1, wherein a second pitch between the third transparent electrode and the fourth transparent electrode is narrower than a first pitch between the first transparent electrode and the second transparent electrode.

4. The liquid crystal optical element according to claim 1, wherein a second pitch between the seventh transparent electrode and the eighth transparent electrode is narrower than a first pitch between the fifth transparent electrode and the sixth transparent electrode.

5. The liquid crystal optical element according to claim 1, further comprising a control circuit configured to supply the same voltage to each of the first transparent electrode, the second transparent electrode, the third transparent electrode, the fourth transparent electrode, the fifth transparent electrode, the sixth transparent electrode, the seventh transparent electrode and the eighth transparent electrode.

6. The liquid crystal optical element according to claim 1, further comprising a control circuit configured to supply a first voltage to each of the first transparent electrode, the second transparent electrode, the third transparent electrode and the fourth transparent electrode, to supply a second voltage different from the first voltage to the fifth transparent electrode and the seventh transparent electrode, and to supply a third voltage different from the first and second voltages to the sixth transparent electrode and the eighth transparent electrode.

7. The liquid crystal optical element according to claim 1, further comprising a control circuit configured to supply a first voltage to each of the fifth transparent electrode, the sixth transparent electrode, the seventh transparent electrode and the eighth transparent electrode, to supply a second voltage different from the first voltage to the first transparent electrode and the third transparent electrode, and to supply a third voltage different from the first and second voltages to the second transparent electrode and the fourth transparent electrode.

8. The liquid crystal optical element according to claim 1, further comprising a control circuit configured to supply a first voltage to each of the second transparent electrode, the fourth transparent electrode, the sixth transparent electrode and the eighth transparent electrode, to supply a second voltage different from the first voltage to the first transparent electrode and the third transparent electrode, and to supply a third voltage different from the first and second voltages to the fifth transparent electrode and the seventh transparent electrode.

9. The liquid crystal optical element according to claim 1, wherein in a plan view, the first transparent electrode of the first liquid crystal cell and the first transparent electrode of the second liquid crystal cell overlap in an extending direction, the second transparent electrode of the first liquid crystal cell and the second transparent electrode of the second liquid crystal cell overlap in the extending direction, the third transparent electrode of the first liquid crystal cell and the third transparent electrode of the second liquid crystal cell overlap in the extending direction, the fourth transparent electrode of the first liquid crystal cell and the fourth transparent electrode of the second liquid crystal cell overlap in the extending direction, the fifth transparent electrode of the first liquid crystal cell and the fifth transparent electrode of the second liquid crystal cell overlap in the extending direction, the sixth transparent electrode of the first liquid crystal cell and the sixth transparent electrode of the second liquid crystal cell overlap in the extending direction, the seventh transparent electrode of the first liquid crystal cell and the seventh transparent electrode of the second liquid crystal cell overlap in the extending direction, and the eighth transparent electrode of the first liquid crystal cell and the eighth transparent electrode of the second liquid crystal cell overlap in the extending direction.

10. The liquid crystal optical element according to claim 1, further comprising a third electrode group arranged between the first electrode group and the second electrode group.

11. The liquid crystal optical element according to claim 1, wherein the optical element is a prism.

12. The liquid crystal optical element according to claim 1, wherein the liquid crystal included in the liquid crystal layer is a twisted nematic liquid crystal.

13. A lighting device comprising:

a light source; and a liquid crystal optical element including a first liquid crystal cell, a second liquid crystal cell overlapping the first liquid crystal cell, and an optical element overlapping the second liquid crystal cell and refracting light; and a control circuit configured to control voltages supplied to transparent electrodes included in the first liquid crystal cell and the second liquid crystal cell, wherein each of the first liquid crystal cell and the second liquid crystal cell includes a first substrate, a second substrate arranged to face the first substrate, and a liquid crystal layer arranged between the first substrate and the second substrate, wherein the first substrate includes a first electrode group arranged alternately in parallel to a first direction with a first transparent electrode and a second transparent electrode, and a second electrode group arranged alternately in parallel to the first direction with a fifth transparent electrode and a sixth transparent electrode and adjacent to the first electrode group, and wherein the second substrate includes a third electrode group arranged alternately in parallel to a second direction intersecting the first direction with a third transparent electrode and a fourth transparent electrode, and arranged to face the first electrode group, and a fourth electrode group arranged alternately in parallel to the second direction with a seventh transparent electrode and an eighth transparent electrode, and adjacent to the third electrode group, and arranged to face the second electrode group, wherein the optical element includes a first optical conversion part overlapping the first electrode group and a second optical conversion part overlapping the second electrode group, and wherein the control circuit is configured to switch between:

a first light distribution mode in which light emitted from the light source and passing through a portion of the liquid crystal layers corresponding to the first electrode group and the third electrode group is diffused by the liquid crystal layers, is incident on the first optical conversion part, and is emitted from the first optical conversion part as diffused light, light emitted from the light source and passing through a portion of the liquid crystal layers corresponding to the second electrode group and the fourth electrode group passes through the liquid crystal layers without being diffused by the liquid crystal layers, is incident on the second optical conversion part, and is emitted from the second optical conversion part as refracted light, and emitted light from the lighting device is obtained by combining the diffused light and the refracted light; and a second light distribution mode in which light emitted from the light source and passing through the portion of the liquid crystal layers corresponding to the first electrode group and the third electrode group passes through the liquid crystal layers without being diffused by the liquid crystal layers, is incident on the first optical conversion part, and is emitted from the first optical conversion part as refracted light, light emitted from the light source and passing through the portion of the liquid crystal layers corresponding to the second electrode group and the fourth electrode group is diffused by the liquid crystal layers, is incident on the second optical conversion part, and is emitted from the second optical conversion part as diffused light, and emitted light from the lighting device is obtained by combining the refracted light and the diffused light.

14. The lighting device according to claim 13, further comprising a Fresnel lens arranged between the light source and the liquid crystal optical element.

15. The lighting device according to claim 13, further comprising a Fresnel lens arranged on a side opposite to a side on which the light source is arranged with respect to the liquid crystal optical element.

16. The lighting device according to claim 13, further comprising a convex lens arranged between the light source and the liquid crystal optical element.

17. The lighting device according to claim 13, further comprising a reflector reflecting light emitted from the light source so as to enter the liquid crystal optical element.

* * * * *